(12) United States Patent
Parker et al.

(10) Patent No.: US 12,315,376 B1
(45) Date of Patent: May 27, 2025

(54) AIRCRAFT DETECTION, SUPERHIGHWAY AND TRANSIT ZONE SYSTEM

(71) Applicant: Altitude Angel Limited, Reading (GB)

(72) Inventors: Richard Steven Parker, Reading (GB); Christopher James Forster, Reading (GB)

(73) Assignee: Altitude Angel Limited, Reading (GB)

( * ) Notice: Subject to any disclaimer, the term of this patent is extended or adjusted under 35 U.S.C. 154(b) by 105 days.

(21) Appl. No.: 18/023,690

(22) PCT Filed: Jun. 4, 2021

(86) PCT No.: PCT/GB2021/051387
§ 371 (c)(1),
(2) Date: Feb. 27, 2023

(87) PCT Pub. No.: WO2022/043648
PCT Pub. Date: Mar. 3, 2022

(30) Foreign Application Priority Data

Aug. 27, 2020 (GB) ...................................... 2013495

(51) Int. Cl.
*G08G 5/00* (2006.01)
*G08G 5/22* (2025.01)
(Continued)

(52) U.S. Cl.
CPC ................. *G08G 5/22* (2025.01); *G08G 5/26* (2025.01); *G08G 5/32* (2025.01); *G08G 5/56* (2025.01); *G08G 5/727* (2025.01)

(58) Field of Classification Search
CPC .. G08G 5/0043; G08G 5/0026; G08G 5/0013; G08G 5/006; G08G 5/0034;
(Continued)

(56) References Cited

U.S. PATENT DOCUMENTS

2017/0069214 A1 3/2017 Dupray et al.
2018/0233054 A1 8/2018 Woon et al.
(Continued)

FOREIGN PATENT DOCUMENTS

WO 2019/148188 A1 8/2019
WO 2019/210962 A1 11/2019

OTHER PUBLICATIONS

Examination Report received for Great Britain Patent Application No. 2013495.3, mailed on Oct. 5, 2021, 7 pages.
(Continued)

*Primary Examiner* — Kenneth J Malkowski
(74) *Attorney, Agent, or Firm* — ArentFox Schiff LLP

(57) ABSTRACT

Methods, apparatus, and systems are provided for an aircraft superhighway system comprising: at least one superhighway node and/or a plurality of spaced apart superhighway nodes/towers, wherein each superhighway node/tower has an overlapping coverage area (e.g. wireless communication coverage area and/or surveillance coverage area) with the coverage area of another adjacent superhighway node/tower and the airspace within each of the coverage areas forming a continuous airspace corridor or aircraft superhighway; and a superhighway controller in communication with at least one of the superhighway nodes/towers; wherein the superhighway controller is configured to use the superhighway nodes/towers for authorising, monitoring and controlling air traffic permitted to transit a flight path within one or more portions of the airspace corridor or aircraft superhighway.

20 Claims, 17 Drawing Sheets

(51) Int. Cl.
  *G08G 5/26* (2025.01)
  *G08G 5/32* (2025.01)
  *G08G 5/56* (2025.01)
  *G08G 5/72* (2025.01)

(58) Field of Classification Search
  CPC .. G08G 5/0039; G08G 5/0082; G08G 5/0069; G08G 5/0086; G08G 5/045; H04B 7/18506
  See application file for complete search history.

(56) References Cited

U.S. PATENT DOCUMENTS

| | | | |
|---|---|---|---|
| 2018/0247544 A1* | 8/2018 | Mustafic | H04W 48/04 |
| 2018/0253979 A1 | 9/2018 | Rey et al. | |
| 2018/0375568 A1* | 12/2018 | De Rosa | G08G 5/0034 |
| 2019/0139421 A1 | 5/2019 | Nilsson et al. | |
| 2019/0239134 A1 | 8/2019 | Hyslop | |
| 2020/0035110 A1 | 1/2020 | Priest | |
| 2022/0028279 A1* | 1/2022 | Faccin | G08G 5/0013 |
| 2022/0319340 A1* | 10/2022 | Tamura | G08G 5/0013 |

OTHER PUBLICATIONS

International Search Report and Written Opinion received for PCT Patent Application No. PCT/GB2021/051387, mailed on Sep. 30, 2021, 12 pages.
Examination Report received for Great Britain Patent Application No. 2013495.3, mailed on Oct. 26, 2022, 6 pages.

* cited by examiner

AIRCRAFT DETECTION, SUPERHIGHWAY AND TRANSIT ZONE SYSTEM

CROSS-REFERENCE TO RELATED APPLICATION

This is a U.S. National Stage Application, filed under 35 U.S.C. § 371, of International Patent Application Number PCT/GB2021/051387, filed on Jun. 4, 2021, which claims priority to GB Patent Application No. 2013495.3 filed on Aug. 27, 2020, the disclosures of which are incorporated herein by reference in their entireties.

The present application relates to aircraft detection, superhighway and transit zone system(s), apparatus, method(s) and applications thereto.

BACKGROUND

The widespread, routine integration of unmanned/optionally-piloted aerial vehicles (UAVs) into controlled airspace is not yet commonplace. The primary reason for this is safety; UAVs do not have a mechanism through which they can safely avoid everything in the airspace that they may cause harm to (such as manned aircraft), or that may harm them (other hazards, including other aircraft). This is the principle reason that there is a visual line-of-sight rule when piloting or remotely piloting said UAVs.

Some expensive aircraft have onboard sensors which are capable, usually at short range, of detecting hazards and 'reacting' to them. This is not ubiquitous or easily accessible technology for most aircraft, including lightweight, small unmanned aircraft systems ('UAS' or 'UAVs'). Thus, there is a risk that current aircraft that are permitted to operate within an airspace may not be able to avoid UAVs operating in the same airspace. Another key blocker is the robustness of communication links: in order to ensure that a UAV remains controllable throughout a flight, a robust communication service needs to be provided.

Although there are many ways to achieve robust communication services such as, without limitation, cellular technologies, long-range radio, and/or satellite-based links, typically specific and costly equipment is required to be carried onboard a UAV, which substantially increases the cost and weight of a UAV aircraft. This not only raises the barrier-to-entry for many UAV operators but also severely restricts the application, service and innovation of UAV technology that could otherwise be provided and/or efficiently performed by lighter weight UAVs and their operators.

Although some existing UAV systems focus on the provision of on-board hardware to equip a single UAV with 'detect and avoid capability', such capability is usually not ubiquitous (to include any form of hazard) and is typically proprietary. Although surveillance technologies exist that assist with the detection of manned and/or unmanned aircraft, other hazards and UAVs, not all surveillance technologies are created equally or have the same level of performance. For example, one type of sensor is usually better for detecting one specific type of object, while another will be better for another type of object in an airspace.

There is a desire for providing a mechanism and/or system for improving the detection, navigation, communication capabilities, and safety of operating any unmanned aircraft, UAV and/or drone for beyond line-of-sight flight whilst minimising the requirement and associated expense of specialist equipment currently required that enables such aircraft to operate safely in the airspace.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides method(s), apparatus and system(s) for an aircraft detection, superhighway and transit system and one or more mechanisms that can deliver beyond-line-of-sight (and automated) flight capability for any unmanned aerial vehicle or aircraft (UAV) that desires to fly within an area of coverage within a defined air corridor or 'zone', or 'aircraft superhighway' (a linkage of two or more zones). The air corridor or aircraft superhighway uses at least one superhighway node and/or a plurality of spaced apart superhighway nodes, each superhighway node including a communication node and/or a surveillance node (e.g. superhighway tower, air tower, communication/surveillance stations/towers), spaced apart along a path or route, in which each of the superhighway nodes provide at least one of a wireless communication coverage area and/or a surveillance coverage area. The volume of airspace defined by the wireless communication coverage areas of the superhighway nodes and/or surveillance coverage areas of the superhighway nodes may be used to form an aircraft superhighway or air corridor. The aircraft superhighway system is configured to, without limitation, for example authorise, control and/or monitor one or more aircraft such as, without limitation, for example UAVs and/or a plurality of UAVs permitted to traverse the aircraft superhighway route through the volume of airspace defined by the overlapping wireless communication coverage areas or cells and/or overlapping surveillance coverage areas of the plurality of superhighway nodes. Each of the superhighway nodes may include either a) a communication node configured to provide wireless communication functionality and/or wireless communications over a wireless communication coverage area or cell; b) a surveillance/detection node configured to provide aircraft surveillance and/or detection functionality over a surveillance coverage area or cell; c) both a) and b).

For example, a plurality of spaced apart superhighway nodes with only communication functionality may be used to form an aircraft superhighway system in which adjacent superhighway nodes of the plurality of superhighway nodes have wireless communication coverage areas or cells that overlap and the airspace of the wireless communication coverage areas or cells form a continuous airspace corridor along the path or route of the plurality of spaced apart superhighway nodes. The aircraft superhighway comprises a volume of airspace defined by the wireless communication coverage areas or cells of the plurality of superhighway nodes. The aircraft superhighway system is configured to, without limitation, for example authorise, control and/or monitor one or more UAVs and/or a plurality of UAVs permitted to traverse the aircraft superhighway route through the airspace defined by the overlapping wireless communication coverage areas or cells of the plurality of superhighway nodes.

In another example, a plurality of spaced apart superhighway nodes with only aircraft surveillance and/or detection functionality may be used to form another aircraft superhighway system in which adjacent superhighway nodes of the plurality of superhighway nodes may have surveillance coverage areas that overlap and the airspace of the surveillance coverage areas forms a continuous airspace corridor along the path or route of the plurality of spaced apart superhighway nodes. The aircraft superhighway may include a volume of airspace defined by the surveillance coverage areas or cells of the plurality of superhighway nodes. The aircraft superhighway system is configured to, without limitation, for example authorise, control and/or monitor one or more UAVs and/or a plurality of UAVs permitted to traverse the aircraft superhighway route through the airspace defined by the overlapping surveillance coverage areas or cells of the plurality of superhighway nodes.

In another example, a plurality of spaced apart superhighway nodes may be used to form a further example aircraft superhighway system in which one or more of the superhighway nodes only include wireless communication functionality, one or more of the superhighway nodes include only aircraft surveillance/detection functionality, one or more of the superhighway nodes include both wireless communication functionality and aircraft surveillance/detection functionality. The plurality of superhighway nodes may be spaced part along a superhighway route such that the communication and/or surveillance coverage areas of adjacent superhighway nodes overlap with each other. The airspace of the plurality of overlapping wireless communication coverage areas and/or surveillance coverage areas of the plurality of spaced apart superhighway nodes forms a continuous airspace corridor along the path or route of the plurality of spaced apart superhighway nodes. The aircraft superhighway may include a volume of airspace defined by the overlapping wireless communication coverage areas and/or surveillance coverage areas of the plurality of superhighway nodes. The aircraft superhighway system is configured to, without limitation, for example authorise, control and/or monitor one or more UAVs and/or a plurality of UAVs permitted to traverse the aircraft superhighway route through the airspace defined by the overlapping communication and/or surveillance coverage areas of the plurality of superhighway nodes.

In an first aspect, the present disclosure provides a an aircraft superhighway system comprising: a plurality of spaced apart superhighway nodes, wherein each superhighway node has a coverage area that overlaps with a coverage area of another adjacent superhighway node and the airspace of each of the areas of coverage form a continuous airspace corridor or aircraft superhighway; and a superhighway controller in communication over a communication network with at least one of the superhighway nodes; wherein the superhighway controller is configured to use the superhighway nodes for authorising, monitoring and/or controlling air traffic transiting airspace of the airspace corridor or aircraft superhighway.

In an second aspect, the present disclosure provides an aircraft superhighway system comprising: a superhighway node, wherein the superhighway node has a coverage area and the airspace of the coverage area forming an airspace superhighway zone spot; and a superhighway controller in communication over a communication network with the superhighway node; wherein the superhighway controller is configured to use the superhighway node for authorising, monitoring and/or controlling air traffic transiting the airspace of the airspace superhighway zone spot.

As an option, the aircraft superhighway system according to the first aspect and/or second aspect, wherein one or more of the superhighway node(s) further comprises a communication node with wireless communication functionality configured for wireless communication over a wireless communication coverage area or cell, wherein the coverage area of each of the one or more superhighway node(s) is the wireless communication coverage area of said communication node.

As another option, the aircraft superhighway system according to the first aspect and/or second aspect, wherein: each of the one or more superhighway node(s) are further configured to wirelessly receive aircraft positional information or data from air traffic transiting the coverage area of said each superhighway node, and relay any received aircraft positional information or data to the superhighway controller; and the superhighway controller further configured to use the received aircraft positional information or data of said air traffic for authorising, monitoring and/or controlling air traffic transiting airspace of the airspace corridor or aircraft superhighway.

As a further option, the aircraft superhighway system according to the first aspect and/or second aspect, wherein one or more of the superhighway node(s) further comprises a surveillance node with aircraft surveillance and/or detection functionality configured to perform surveillance/detection/and/or monitoring of air traffic within a surveillance coverage area or cell, wherein the coverage area of each of the one or more superhighway node(s) is the surveillance coverage area of said surveillance node.

As an option, the aircraft superhighway system according to the first aspect and/or second aspect, wherein said surveillance comprises one or more from the group of: detecting manned aircraft; detecting unmanned aircraft, unmanned aerial vehicles and/or drones; detecting other air hazards and/or obstacles; and/or detecting any other hazard, objects or obstacles that may affect the safe transit of aircraft via the aircraft superhighway.

As another option, the aircraft superhighway system according to the first aspect and/or second aspect, wherein: said one or more superhighway node(s) are further configured to relay any air traffic surveillance data of the air traffic over a communication connection to the superhighway controller; and the superhighway controller further configured to use the air traffic surveillance data of said air traffic for authorising, monitoring and/or controlling air traffic transiting airspace of the airspace corridor or aircraft superhighway.

As a further option, the aircraft superhighway system according to the first aspect and/or second aspect, further comprising a superhighway node including a surveillance node communicatively connected to a superhighway node including a communication node or to the superhighway controller. As an option, the aircraft superhighway system according to the first aspect and/or second aspect, wherein the superhighway controller is configured to use the superhighway nodes with communication node functionality for authorising, monitoring and/or controlling air traffic permitted to transit a flight path within one or more portions of the airspace corridor or aircraft superhighway.

As another option, the aircraft superhighway system according to the first aspect and/or second aspect, wherein, for each superhighway node with communication node functionality, the volume airspace of the communication coverage area provided by said communication node functionality forms an airspace superhighway zone spot. As another option, the aircraft superhighway system according to the first aspect and/or second aspect, wherein, for each superhighway node with surveillance node functionality, the volume airspace of the surveillance coverage area provided by said surveillance node functionality forms an airspace superhighway zone spot.

As an option, the aircraft superhighway system according to the first aspect and/or second aspect, wherein at least a portion of the aircraft superhighway comprises multiple consecutive airspace superhighway zone spots forming an airspace superhighway zone. As another option, the aircraft superhighway system according to the first aspect and/or second aspect, wherein the superhighway controller is further configured to: receive one or more requests for flights or flight plans of aircraft using the aircraft superhighway; approve those flights or flight plans using the aircraft superhighway ensuring safe transit of air traffic; and issuing flight certificates to those aircraft with approved flights or flight plans for using the aircraft superhighway, wherein the aircraft uses said flight certificates for gaining authorisation for transiting the airspace of one or more coverage areas of corresponding superhighway nodes, one or more airspace superhighway zone spots of corresponding superhighway nodes, or one or more airspace superhighway zones of corresponding superhighway nodes. As a further option, the aircraft superhighway system according to the first aspect and/or second aspect wherein the each flight certificate is digitally signed.

As an option, the aircraft superhighway system according to the first aspect and/or second aspect, wherein the superhighway controller is further configured to approve those flights or flight plans using a flight check or evaluation process of the requested flight or flight plans for a desired route based on verifying the flight plan and evaluating flight conditions and route associated with weather forecast and other authorised flight plans/routes of other aircraft. As another option, the aircraft superhighway system according to the first aspect and/or second aspect, wherein the superhighway controller is further configured to receive approval for those flights or flight plans from a flight management system configured to perform a flight check or evaluation process of the requested flight or flight plans over the desired route based on: verifying the flight plan; evaluating the flight or flight plans in relation to one or more from the group of: flight conditions; any flight conflicts with other aircraft and/or flight plans/routes of other aircraft; weather forecasts and other authorised or approved flight plans/routes of other aircraft.

As an option, the aircraft superhighway system according to the first aspect and/or second aspect, wherein the superhighway controller is further configured to: monitor aircraft in-flight within the airspace of the aircraft superhighway, airspace of the coverage area of corresponding superhighway nodes, or an airspace superhighway zone spot of corresponding superhighway nodes; determine control information associated with the transit of said one or more of the aircraft based on said monitoring; and transmit control information to said one or more aircraft and/or one or more operators of said aircraft transiting the airspace of the aircraft superhighway to ensure safe transit of air traffic within airspace of the aircraft superhighway.

As another option, the aircraft superhighway system according to the first aspect and/or second aspect, wherein the superhighway controller is further configured to transmit flight information of at least air traffic within the aircraft superhighway on regular aviation frequencies to manned aircraft operating within the vicinity of the aircraft superhighway. As a further option, the aircraft superhighway system according to the first aspect and/or second aspect wherein the superhighway controller is further configured to: receive data representative of one or more flight certificate(s) from corresponding one or more aircraft requesting to gain access and transit the airspace associated with a coverage area of a superhighway node; determine whether the flight certificate(s) of the corresponding aircraft are valid in relation to transiting the airspace associated with the superhighway node; and providing authorisation for those aircraft with a valid flight certificate to access and transit the airspace defined by the coverage area of said each superhighway node.

As an option, the aircraft superhighway system according to the first aspect and/or second aspect, wherein each superhighway node of the plurality of superhighway nodes with a surveillance node and corresponding coverage area including a surveillance coverage area is further configured to: detect and monitor air traffic in the airspace defined by the surveillance coverage area of said each superhighway node; and send surveillance data representative of the detected and/or monitored air traffic to the superhighway controller.

As another option, the aircraft superhighway system according to the first aspect and/or second aspect, wherein each superhighway node of the plurality of superhighway nodes with a communication node and corresponding coverage area including a wireless communication coverage area associated with the communication node is further configured to: receive aircraft data from air traffic in communication with said each superhighway node, wherein said air traffic is transiting the airspace defined by the wireless communication coverage area of said each superhighway node; and send the received aircraft data to the superhighway controller.

As a further option, the aircraft superhighway system according to the first aspect and/or second aspect, wherein each superhighway node of the plurality of superhighway nodes with a communication node and corresponding coverage area including a wireless communication coverage area associated with the communication node is further configured to: receive one or more flight certificate(s) from corresponding one or more aircraft requesting to gain access and transit the airspace defined by the wireless communication coverage area of said each superhighway node; send said flight certificates to the superhighway controller for determining whether the flight certificate(s) of the corresponding aircraft are valid; and authorise those aircraft with a valid flight certificate to access and transit the airspace defined by the wireless communication coverage area of said each superhighway node.

As an option, the aircraft superhighway system according to the first aspect and/or second aspect, wherein each aircraft using the aircraft superhighway system is further configured to: send, to the superhighway controller, data representative of an access request for a flight certificate based on a flight or flight plan using the aircraft superhighway; receive, from the superhighway controller, data representative of a valid flight certificate authorising use of the aircraft superhighway in accordance with the flight or flight plan.

As an option, the aircraft superhighway system according to the first aspect and/or second aspect, wherein during flight of the aircraft using the aircraft superhighway by transiting an airspace defined by the coverage area of a superhighway node with a communication node and the corresponding coverage area including a wireless communication coverage area associated with the communication node, the aircraft is further configured to: send aircraft data representative of positional information of the aircraft to the superhighway controller via the superhighway node; and receive commands and/or instructions from the superhighway controller based on said aircraft data and actioning said received commands and/or instructions.

As an option, the aircraft superhighway system according to the first aspect and/or second aspect, wherein during flight of the aircraft using the aircraft superhighway by transiting an airspace defined by the coverage area of a superhighway node with a surveillance node and the corresponding coverage area including a surveillance communication coverage area associated with the surveillance node, the aircraft is further configured to: send aircraft data representative of positional information of the aircraft to the superhighway controller; and receive commands and/or instructions from the superhighway controller based on said aircraft data and actioning said received commands and/or instructions.

As another option, the aircraft superhighway system according to the first aspect and/or second aspect, wherein during flight of the aircraft using the aircraft superhighway by transiting an airspace defined by the coverage area of a superhighway node with a communication node and the corresponding coverage area including a wireless communication coverage area associated with the communication node, the aircraft is further configured to: send a request to gain authorisation to transit the airspace defined by the area of wireless communication coverage of another superhighway node adjacent to said superhighway node according to the flight certificate or flight plan, wherein the other superhighway node includes a communication node with another wireless communication coverage area and the wireless communication coverage areas of the superhighway nodes overlap each other; and receive authorisation, based on the flight certificate being valid, access for transiting the airspace defined by the wireless communication coverage area of said other superhighway node; and receiving commands and/or instructions from the superhighway controller and actioning said received commands and/or instructions.

As an option, the aircraft superhighway system according to the first aspect and/or second aspect, wherein: at least one of the superhighway nodes is coupled to the superhighway controller via a first communication network; two or more of the plurality of superhighway nodes, each superhighway node including a communication node with a corresponding coverage area including a wireless communication coverage area associated with the communication node further including communication functionality to form a mesh communication network for communicating with each other or acting as a relay in communications directed to the superhighway controller; each of the plurality of superhighway nodes with a communication node including further communication functionality for communicating with one or more aircraft; and at least one other of the superhighway nodes is coupled to the superhighway controller via another backup communication network.

Optionally, the aircraft superhighway system according to the first aspect and/or second aspect, wherein: the first communication network comprises a telecommunication network including access to the Internet; the backup communication network comprises another telecommunication network including access to the Internet; the mesh communication network comprising Wi-Fi or short-range communication mesh network technologies; and the further communication functionality for communicating with one or more aircraft comprising Wi-Fi or short-range communication technologies.

As an option, the aircraft superhighway system according to the first aspect and/or second aspect, wherein the aircraft may communicate with the superhighway controller on a communications link via long-range cellular, satellite and/or radio technologies from the aircraft and/or a control station associated with the aircraft. As another option, the aircraft superhighway system according to the first aspect and/or second aspect, wherein the surveillance coverage area has a greater range than the communication coverage area. For example, superhighway nodes with surveillance/detection functionalities/capabilities the may have surveillance/detection capabilities will have a greater range than the communication capabilities of each superhighway node (e.g. Wi-Fi may only be 90 metres; but drone radar may be, without limitation, in the range of 5 to 10 km).

In a third aspect, the present disclosure provides a computer-implemented method of operating an aircraft superhighway system according to the first and/or second aspects and/or any of the features thereof, the method, performed by a superhighway controller, comprising: receiving one or more requests for flights or flight plans of aircraft using the aircraft superhighway; and issuing flight certificates to those aircraft with approved flights for using the aircraft superhighway.

As an option, the computer-implemented method of the third aspect, the method further comprising: monitoring aircraft in-flight using the airspace of the aircraft superhighway; receiving control information associated with the transit of one or more aircraft based on said monitoring; and transmitting control information to said one or more aircraft via said superhighway nodes using the airspace of the aircraft superhighway to ensure safe transit of air traffic within airspace of the aircraft superhighway.

As another option, the computer-implemented method of the third aspect, the method further comprising: receiving one or more requests for flights or flight plans of aircraft using the aircraft superhighway; approving those flights or flight plans using the aircraft superhighway ensuring safe transit of air traffic; and issuing flight certificates to those aircraft with approved flights or flight plans for using the aircraft superhighway, wherein the aircraft uses said flight certificates for gaining authorisation for transiting the airspace of one or more coverage areas of corresponding superhighway nodes, one or more airspace superhighway zone spots of corresponding superhighway nodes, or one or more airspace superhighway zones of corresponding superhighway nodes. As an option, the computer-implemented method of the third aspect, wherein the each flight certificate is digitally signed.

As another option, the computer-implemented method of the third aspect, wherein approving those flights or flight plans further comprising using a flight check or evaluation process of the requested flight or flight plans for a desired route based on verifying the flight plan and evaluating flight conditions and route associated with weather forecast and other authorised flight plans/routes of other aircraft.

As another option, the computer-implemented method of the third aspect, the method further comprising receiving approval for those flights or flight plans from a flight management system configured to perform a flight check or evaluation process of the requested flight or flight plans over the desired route based on: verifying the flight plan; evaluating the flight or flight plans in relation to one or more from the group of: flight conditions; any flight conflicts with other aircraft and/or flight plans/routes of other aircraft; weather forecasts and other authorised or approved flight plans/routes of other aircraft.

As an option, the computer-implemented method of the third aspect, the method further comprising: monitoring aircraft in-flight within the airspace of the aircraft superhighway, airspace of the coverage area of corresponding superhighway nodes, or an airspace superhighway zone spot of corresponding superhighway nodes; determining control information associated with the transit of said one or more of the aircraft based on said monitoring; and transmitting control information to said one or more aircraft and/or one or more operators of said aircraft transiting the airspace of the aircraft superhighway to ensure safe transit of air traffic within airspace of the aircraft superhighway.

As another option, the computer-implemented method of the third aspect, the method further comprising transmitting flight information of at least air traffic within the aircraft superhighway on regular aviation frequencies to manned aircraft operating within the vicinity of the aircraft superhighway.

As an option, the computer-implemented method of the third aspect, the method further comprising: receiving data representative of one or more flight certificate(s) from corresponding one or more aircraft requesting to gain access and transit the airspace associated with a coverage area of a superhighway node; determining whether the flight certificate(s) of the corresponding aircraft are valid in relation to transiting the airspace associated with the superhighway node; and providing authorisation for those aircraft with a valid flight certificate to access and transit the airspace defined by the coverage area of said each superhighway node.

In a fourth aspect, the present disclosure provides a computer-implemented method of operating an superhighway node of an aircraft superhighway system according to the first and/or second aspects and/or any of the features thereof, the method, performed by the superhighway node with a surveillance node and a surveillance coverage area, comprising: monitoring air traffic in the airspace defined by the area of surveillance coverage of said superhighway node; and sending data representative of the monitored air traffic to the superhighway controller.

As another option, the computer-implemented method of the fourth aspect, wherein the superhighway node further includes a communication node with a wireless communication coverage area, the method further comprising: receiving aircraft data from air traffic in the airspace defined by the area of communication coverage of said superhighway node; and sending data representative of the received aircraft data to the superhighway controller.

In a fifth aspect, the present disclosure provides a computer-implemented method of operating an superhighway node of an aircraft superhighway system according the first and/or second aspects and/or any of the features thereof, the method, performed by the superhighway node with a surveillance node and a surveillance coverage area, comprising: monitoring air traffic in the airspace defined by the area of surveillance coverage of said superhighway node; and sending data representative of the monitored air traffic to the superhighway controller.

As another option, the computer-implemented method of the fifth aspect, wherein superhighway node further includes a surveillance node with a surveillance coverage area, comprising: monitoring air traffic in the airspace defined by the area of surveillance coverage of said superhighway node; and sending data representative of the monitored air traffic to the superhighway controller.

As another option, the computer-implemented method of the fourth and/or fifth aspects, wherein the superhighway node includes a communication node with a wireless communication coverage area, the method further comprising: receiving, from the superhighway controller, commands and/or instructions associated with an aircraft in transit in the airspace defined by the area of communication coverage of said superhighway node; and sending data representative of the received commanded and/or instructions to said aircraft for actioning during transit in said airspace.

As another option, the computer-implemented method of the fourth and/or fifth aspects, the method further comprising: receiving one or more flight certificate(s) from corresponding one or more aircraft requesting to gain access and transit the airspace defined by the area of wireless communication coverage of said each superhighway node; sending said flight certificates to the superhighway controller for determining whether the flight certificate(s) of the corresponding aircraft are valid; and authorising those aircraft with a valid flight certificate access for transiting the airspace defined by the area of wireless communication coverage of said each superhighway node.

In a sixth aspect, the present disclosure provides a computer-implemented method of operating an aircraft in an aircraft superhighway system according to the first and/or second aspects and/or any of the features thereof, performed by the aircraft, comprising: sending, to the superhighway controller, data representative of an access request for a flight certificate based on a flight or flight plan using the aircraft superhighway; and receiving, from the superhighway controller, data representative of a valid flight certificate authorising use of the aircraft superhighway in accordance with the flight or flight plan.

As another option, the computer-implemented method of the sixth aspect wherein the method, performed by the aircraft during flight of the aircraft using the aircraft superhighway by transiting an airspace defined by the coverage area of a superhighway node with a communication node and the corresponding coverage area including a wireless communication coverage area associated with the communication node, further comprising: sending aircraft data representative of positional information of the aircraft to the superhighway controller via the superhighway node; and receiving commands and/or instructions from the superhighway controller based on said aircraft data and actioning said received commands and/or instructions.

In a seventh aspect, the present disclosure provides a computer-implemented method of operating an aircraft in a aircraft superhighway system according to the first and/or second aspects and/or any of the features thereof, the method, performed by the aircraft during flight of the aircraft using the aircraft superhighway by transiting an airspace defined by the coverage area of a superhighway node with a communication node and the corresponding coverage area including a wireless communication coverage area associated with the communication node, further comprising: sending aircraft data representative of positional information of the aircraft to the superhighway controller via the superhighway node; and receiving commands and/or instructions from the superhighway controller based on said aircraft data and actioning said received commands and/or instructions.

As another option, the computer-implemented method of the seventh aspect wherein the method, during flight of the aircraft using the aircraft superhighway by transiting an airspace defined by the coverage area of a superhighway node with a surveillance node and the corresponding coverage area including a surveillance communication coverage area associated with the surveillance node, further comprising: sending aircraft data representative of positional information of the aircraft to the superhighway controller; and receiving commands and/or instructions from the superhighway controller based on said aircraft data and actioning said received commands and/or instructions.

As another option, the computer-implemented method of the sixth and/or seventh aspects, wherein the method, during flight of the aircraft using the aircraft superhighway by transiting an airspace defined by the coverage area of a superhighway node with a communication node and the corresponding coverage area including a wireless communication coverage area associated with the communication node, further comprising: sending a request to gain authorisation to transit the airspace defined by the area of wireless communication coverage of another superhighway node adjacent to said superhighway node according to the flight certificate or flight plan, wherein the other superhighway node includes a communication node with another wireless communication coverage area and the wireless communication coverage areas of the superhighway nodes overlap each other; and receiving authorisation, based on the flight certificate being valid, access for transiting the airspace defined by the wireless communication coverage area of said other superhighway node; and receiving commands and/or instructions from the superhighway controller and actioning said received commands and/or instructions.

As another option, the system or computer-implemented method according to the first, second, third, fourth, fifth, sixth and/or seventh aspects, wherein each of the communication towers have overlapping areas of communication coverage and form a second communication network for use in communicating with the superhighway controller and/or the aircraft transiting the aircraft superhighway.

As another option, the system or computer-implemented method according to the first, second third, fourth, sixth and/or seventh aspects, the system or computer-implemented method further comprising using a flight management system for processing and analysing data representative of air traffic positional information transiting the aircraft superhighway for detecting air traffic compliance and/or conflicts and sending commands/instructions to said air traffic, via the superhighway controller, for managing and/or controlling said air traffic to ensure compliance and/or avoid conflicts.

As an option, the system or computer-implemented method according to the first, second third, fourth, sixth and/or seventh aspects, wherein the aircraft using the aircraft superhighway system according to any of the first, second third, fourth, sixth and/or seventh aspects are unmanned aircraft, unmanned aerial vehicles, UAVs, or drones.

As an option, wherein the airspace defined by each area of communication coverage of a superhighway node is called a UAV/drone Spot, and multiple consecutive overlapping UAV/drone Spots are called a UAV/drone Zone, and each communication tower is called an air tower. Optionally, each superhighway node with a communication node is further configured to perform the steps of: receiving one or more requests for flights of UAVs using the aircraft superhighway; issuing flight certificates to those UAVs with approved flights for using the aircraft superhighway; monitoring UAVs in-flight using the airspace of the aircraft superhighway; receiving control information associated with one or more UAVs based on said monitoring; and transmitting control information to said one or more UAVs via said superhighway nodes using the airspace of the aircraft superhighway to ensure safe transit of air traffic within airspace of the aircraft superhighway.

Optionally, each superhighway node is further configured to perform the steps of: monitoring air traffic in the airspace of an UAV/drone Spot hosted by said superhighway node; sending data representative of the monitored air traffic to the superhighway controller; receiving one or more flight certificate(s) from corresponding one or more UAV/drone(s) requesting to gain access and transit the UAV/drone Spot hosted by said superhighway node; sending said flight certificates to the superhighway controller for determining whether the flight certificate(s) of the corresponding UAVs/drones are valid; an authorising those UAV(s)/drone(s) with a valid flight certificate access for transiting the UAV/drone Spot hosted by said superhighway node.

As an option, the system or computer-implemented method according to the first, second third, fourth, fifth, sixth and/or seventh aspects, wherein each UAV is further configured to perform the steps of: sending, to the superhighway controller, data representative of an access request for a flight certificate based on a flight or flight plan using the aircraft superhighway; receiving, from the superhighway controller, data representative of a valid flight certificate authorising use of the aircraft superhighway in accordance with the flight or flight plan; during flight of the aircraft using the aircraft superhighway by transiting an UAV/drone Spot hosted by an superhighway node, the method further comprising: sending data representative of positional information of the aircraft to the superhighway controller via the superhighway node; sending a request to gain authorisation to transit a UAV/drone Spot hosted by another superhighway node adjacent to said superhighway node according to the flight certificate or flight plan, wherein the an UAV/drone Spots overlap each other; and receiving authorisation, based on the flight certificate being valid, access for transiting the UAV/drone Spot hosted by said other superhighway node; and receiving commands and/or instructions from the superhighway controller and actioning said received commands and/or instructions.

In other aspects, the present disclosure provides an aircraft detection, superhighway and transit zone system comprising: a plurality of spaced apart communication nodes, wherein each communication node has an area of wireless communication coverage and airborne hazard detection sensors that overlaps with an area of wireless communication and optionally detection/surveillance coverage of another adjacent tower and the airspace within each of the areas of communication coverage form a continuous airspace corridor or aircraft superhighway; and a superhighway controller in communication over a first communication network with at least one of the communication towers; wherein the superhighway controller is configured to use the communication towers for authorising, monitoring and controlling air traffic permitted to transit a flight path within one or more portions of the airspace corridor or aircraft superhighway.

As an option, wherein the superhighway controller is configured to: receive one or more requests for flights of aircraft using the aircraft superhighway; issue digitally-signed flight certificates to those aircraft with approved flights for using the aircraft superhighway; monitor aircraft in-flight using the airspace of the aircraft superhighway; receive control information associated with one or more aircraft based on said monitoring; and transmit control information to said one or more aircraft via said communication towers (or via alternative backup communications channels advertised by the drones) using the airspace of the aircraft superhighway to ensure safe transit of air traffic within airspace of the aircraft superhighway.

As another option, wherein each communication tower of the plurality of communication towers is further configured to: monitor air traffic in the airspace defined by the area of wireless communication coverage of said each communication tower; send data representative of the monitored air traffic to the superhighway controller; receive one or more digitally-signed flight certificate(s) from corresponding one or more aircraft requesting to gain access and transit the airspace defined by the area of wireless communication coverage of said each communication tower; send said flight certificates to the superhighway controller for determining whether the flight certificate(s) of the corresponding aircraft are valid; and authorise those aircraft with a valid flight certificate access for transiting the airspace defined by the area of wireless communication coverage of said each communication tower.

As a further option, wherein each aircraft using the aircraft superhighway system is further configured to: send, to the superhighway controller, data representative of an access request for a flight certificate based on a flight or flight plan using the aircraft superhighway; receive, from the superhighway controller, data representative of a valid flight certificate authorising use of the aircraft superhighway in accordance with the flight or flight plan; during flight of the aircraft using the aircraft superhighway by transiting an airspace defined by the area of wireless communication coverage of a communication tower, the aircraft is further configured to: send data representative of positional information of the aircraft to the superhighway controller via the communication tower; send a request to gain authorisation to transit the airspace defined by the area of wireless communication coverage of another communication tower adjacent to said communication tower according to the flight certificate or flight plan, wherein the areas of wireless communication coverage overlap each other; and receive authorisation, based on the flight certificate being valid, access for transiting the airspace defined by the area of wireless communication coverage of said other communication tower; and receiving commands and/or instructions from the superhighway controller and actioning said received commands and/or instructions.

In another aspect, the present disclosure provides a computer-implemented method of operating an aircraft superhighway system according to the first aspect, the method, performed by a superhighway controller, comprising: receiving one or more requests for flights of aircraft using the aircraft superhighway; issuing digitally-signed flight certificates to those aircraft with approved flights for using the aircraft superhighway; monitoring aircraft in-flight using the airspace of the aircraft superhighway; receiving control information associated with one or more aircraft based on said monitoring; and transmitting control information to said one or more aircraft via said communication towers using the airspace of the aircraft superhighway to ensure safe transit of air traffic within airspace of the aircraft superhighway.

In a further aspect, the present disclosure provides a computer-implemented method of operating a communication node of an aircraft superhighway system according to the first and second aspects, the method, performed by the air tower, comprising: monitoring air traffic in the airspace defined by the area of coverage of said each communication and surveillance tower; sending data representative of the monitored air traffic to the superhighway controller; receiving one or more flight certificate(s) from corresponding one or more aircraft requesting to gain access and transit the airspace defined by the area of wireless communication coverage of said each communication tower; sending said flight certificates to the superhighway controller for determining whether the flight certificate(s) of the corresponding aircraft are valid; and authorising those aircraft with a valid flight certificate access for transiting the airspace defined by the area of wireless communication coverage of said each communication tower.

As an optional aspect, the present disclosure provides a computer-implemented method of operating an aircraft in an aircraft superhighway system according to the first, second and/or third aspects, the method, performed by the aircraft, comprising: sending, to the superhighway controller, data representative of an access request for a flight certificate based on a flight or flight plan using the aircraft superhighway; receiving, from the superhighway controller, data representative of a valid flight certificate authorising use of the aircraft superhighway in accordance with the flight or flight plan; during flight of the aircraft using the aircraft superhighway by transiting an airspace defined by the area of wireless communication coverage of a communication tower, the method further comprising: sending data representative of positional information of the aircraft to the superhighway controller via the communication tower; sending a request to gain authorisation to transit the airspace defined by the area of wireless communication coverage of another communication tower adjacent to said communication tower according to the flight certificate or flight plan, wherein the areas of wireless communication coverage overlap each other; and receiving authorisation, based on the flight certificate being valid, access for transiting the airspace defined by the area of wireless communication coverage of said other communication tower; and receiving commands and/or instructions from the superhighway controller and actioning said received commands and/or instructions.

As an option, the system or computer-implemented method according to the first, second, third and/or fourth aspects, wherein each of the towers have overlapping areas of communication coverage and form a second communication network for use in communicating with the superhighway controller and/or the aircraft transiting the aircraft superhighway using an alternative communication medium.

As another option, the system or computer-implemented method according to the first, second, third and/or fourth aspects, the system further comprising a flight management system for processing and analysing data representative of air traffic positional information transiting the aircraft superhighway for detecting air traffic compliance and/or conflicts and sending commands/instructions to said air traffic, via the superhighway controller, for managing and/or controlling said air traffic to ensure compliance and/or avoid conflicts.

As an option, the system or computer-implemented method according to the first, second, third and/or fourth aspects wherein the aircraft using the aircraft superhighway system according to the first, second, third and/or fourth aspects are unmanned aircraft, unmanned aerial vehicles, UAVs, or drones.

As another option, the system or computer-implemented method according to the first, second, third and/or fourth aspects, wherein the airspace defined by each area of communication coverage of a communication tower is called a UAV/drone Spot, and multiple consecutive overlapping UAV/drone Spots are called a UAV/drone Zone, with multiple overlapping Zones comprising a Superhighway, and each communication tower is called an air tower.

As a further option, the system or computer-implemented method according to the first, second, third and/or fourth aspects, wherein each air tower is further configured to perform the steps of: receiving one or more requests for flights of UAVs using the aircraft superhighway; issuing flight certificates to those UAVs with approved flights for using the aircraft superhighway; monitoring UAVs in-flight using the airspace of the aircraft superhighway; receiving control information associated with one or more UAVs based on said monitoring; and transmitting control information to said one or more UAVs via said superhighway nodes using the airspace of the aircraft superhighway to ensure safe transit of air traffic within airspace of the aircraft superhighway.

As an option, the system or computer-implemented method according to the first, second, third and/or fourth aspects, wherein each superhighway node is further configured to perform the steps of: monitoring air traffic in the airspace of an UAV/drone Spot hosted by said superhighway node; sending data representative of the monitored air traffic to the superhighway controller; receiving one or more flight certificate(s) from corresponding one or more UAV/drone(s) requesting to gain access and transit the UAV/drone Spot hosted by said superhighway node; sending said flight certificates to the superhighway controller for determining whether the flight certificate(s) of the corresponding UAVs/drones are valid; and authorising those UAV(s)/drone(s) with a valid flight certificate access for transiting the UAV/drone Spot hosted by said superhighway node.

As another option, the system or computer-implemented method according to the first, second, third and/or fourth aspects, wherein each UAV is further configured to perform the steps of: sending, to the superhighway controller, data representative of an access request for a flight certificate based on a flight or flight plan using the aircraft superhighway; receiving, from the superhighway controller, data representative of a valid flight certificate authorising use of the aircraft superhighway in accordance with the flight or flight plan; during flight of the aircraft using the aircraft superhighway by transiting an UAV/drone Spot hosted by an superhighway node, the method further comprising: sending data representative of positional information of the aircraft to the superhighway controller via the superhighway node; sending a request to gain authorisation to transit a UAV/drone Spot hosted by another superhighway node adjacent to said superhighway node according to the flight certificate or flight plan, wherein the an UAV/drone Spots overlap each other; and receiving authorisation, based on the flight certificate being valid, access for transiting the UAV/drone Spot hosted by said other superhighway node; and receiving commands and/or instructions from the superhighway controller and actioning said received commands and/or instructions.

In an eighth aspect, the present disclosure provides an apparatus comprising a processor unit, a memory unit, and a communication interface, the processor unit connected to the memory unit and the communication interface, wherein the processor unit, memory unit and communication interface are adapted to implement the computer-implemented of the third aspects, modifications thereto, combinations thereof and/or as herein described.

In a ninth aspect, the present disclosure provides an apparatus comprising a processor unit, a memory unit, and a communication interface, the processor unit connected to the memory unit and the communication interface, wherein the processor unit, memory unit and communication interface are adapted to implement the computer-implemented method of the fourth and/or fifth aspects, modifications thereto, combinations thereof and/or as herein described.

In a tenth aspect, the present disclosure provides an apparatus comprising a processor unit, a memory unit, and a communication interface, the processor unit connected to the memory unit and the communication interface, wherein the processor unit, memory unit and communication interface are adapted to implement the computer-implemented method of the sixth and/or seventh aspects, modifications thereto, combinations thereof and/or as herein described.

In an eleventh aspect, the present disclosure provides a system comprising: an superhighway controller comprising an apparatus according to the eighth aspect; and an plurality of superhighway nodes, each superhighway node comprising an apparatus according to the ninth aspect, and defining an aircraft superhighway; a plurality of UAVs comprising an apparatus according to the tenth aspect; wherein the superhighway controller is communicatively coupled to at least one of the plurality of superhighway nodes and configured for authorising, monitoring and/or controlling said UAVs for transiting the aircraft superhighway.

In a twelfth aspect, the present disclosure provides a computer-readable medium comprising computer code or instructions stored thereon, which when executed on a processor, causes the processor to perform the computer implemented method according to the third aspect, modifications thereto, combinations thereof and/or as herein described.

In an thirteenth aspect, the present disclosure provides a computer-readable medium comprising computer code or instructions stored thereon, which when executed on a processor, causes the processor to perform the computer implemented method according to the fourth and/or fifth aspects, modifications thereto, combinations thereof and/or as herein described.

In an fourteenth aspect, the present disclosure provides a computer-readable medium comprising computer code or instructions stored thereon, which when executed on a processor, causes the processor to perform the computer implemented method according to the sixth and/or seventh aspects, modifications thereto, combinations thereof and/or as herein described.

In a fifteenth aspect, the present disclosure provides an aircraft superhighway system as herein described with reference to the accompanying drawings.

In a sixteenth aspect, the present disclosure provides a superhighway controller as herein described with reference to the accompanying drawings.

In a seventeenth aspect, the present disclosure provides a flight management system as herein described with reference to the accompanying drawings.

In a eighteenth aspect, the present disclosure provides an aircraft or UAV as herein described with reference to the accompanying drawings.

In a nineteenth aspect, the present disclosure provides a method as herein described with reference to the accompanying drawings.

In a twentieth aspect, the present disclosure provides an apparatus as herein described with reference to the accompanying drawings.

In a twenty first aspect, the present disclosure provides a computer program product as herein described with reference to the accompanying drawings.

In a twenty second aspect, the present disclosure provides an aircraft superhighway method as herein described with reference to the accompanying drawings.

In a twenty third aspect, the present disclosure provides a superhighway controller method as herein described with reference to the accompanying drawings.

In a twenty fourth aspect, the present disclosure provides an superhighway node operating method as herein described with reference to the accompanying drawings.

In a twenty fifth aspect, the present disclosure provides an unmanned aircraft operating method as herein described with reference to the accompanying drawings.

In a twenty sixth aspect, the present disclosure provides an apparatus as herein described with reference to the accompanying drawings.

In a twenty seventh aspect, the present disclosure provides a computer program product as herein described with reference to the above-mentioned aspects.

The methods and/or process(es) described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1A:
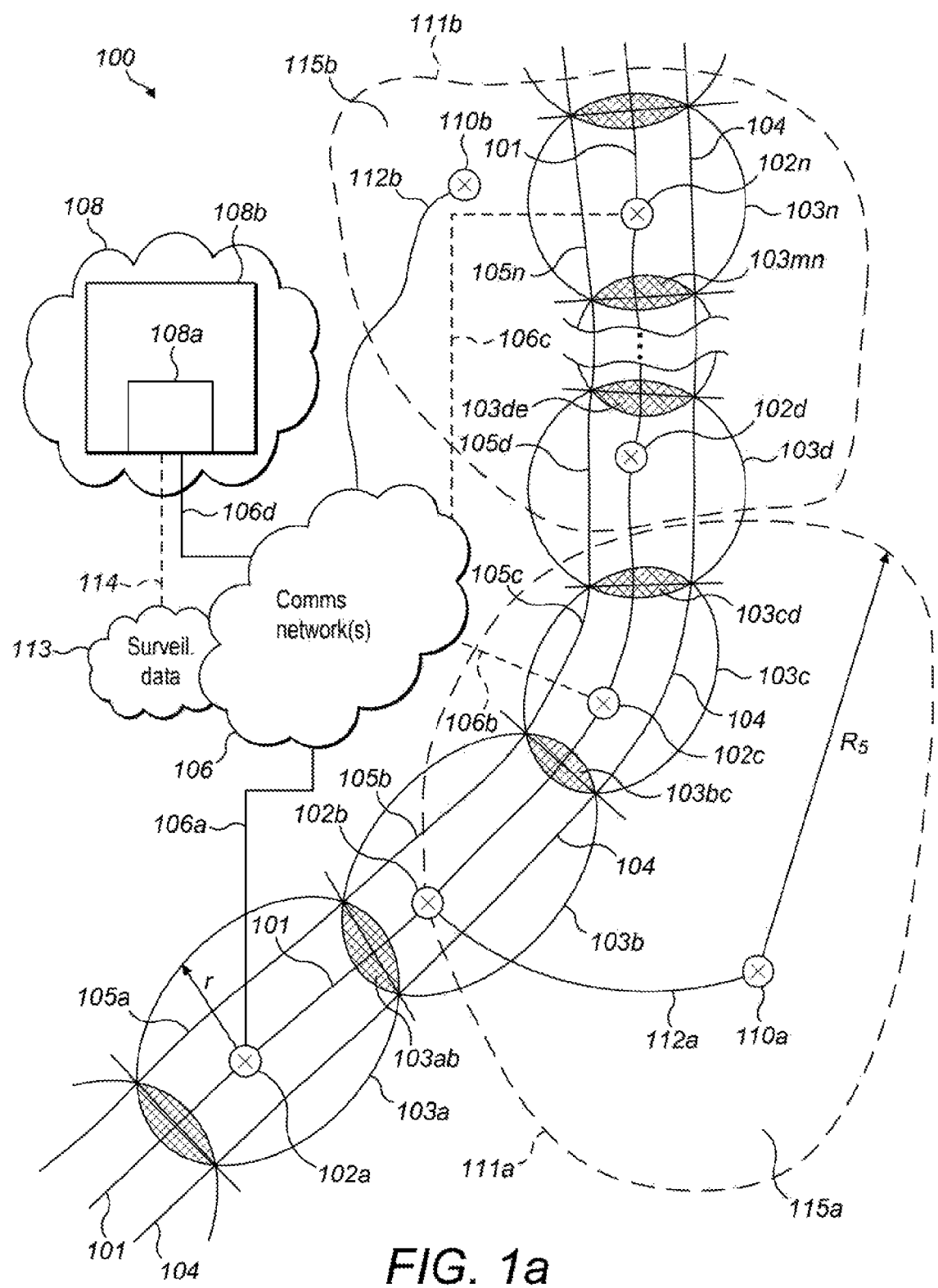
FIG. 1a is a schematic diagram illustrating an example aircraft superhighway system according to some embodiments of the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present disclosure provides method(s), apparatus and system(s) for an aircraft superhighway system for providing a mechanism that can deliver beyond-line-of-sight capability (and automated flight capability) for any unmanned aerial vehicle or aircraft (UAV) that desires to fly within an area of coverage defining a controlled air corridor, zone or superhighway. The controlled air corridor or aircraft superhighway uses a plurality of spaced apart superhighway nodes (e.g. communication and/or surveillance detection stations or towers, also known as air towers), spaced apart along a path or route, in which adjacent superhighway nodes of the plurality of superhighway nodes have coverage areas (e.g. wireless communication coverage areas or cells and/or surveillance/detection coverage areas) that overlap and the volume of airspace of the coverage areas forms a continuous airspace corridor along the path or route of the superhighway nodes. The aircraft superhighway comprises a controlled airspace defined by the coverage areas, which overlap with each other, of the plurality of superhighway nodes. The aircraft superhighway system is configured to, without limitation, for example authorise, control and/or monitor one or more UAVs and/or a plurality of UAVs permitted to traverse the aircraft superhighway route through the airspace defined by the coverage areas of the plurality of superhighway nodes.

Each of the superhighway nodes provide at least one of a wireless communication coverage area and/or a surveillance coverage area. The surveillance coverage area may have a greater range than the communication coverage area. For example, superhighway nodes with surveillance/detection functionalities/capabilities the may have surveillance/detection capabilities will have a greater range than the communication capabilities of each superhighway node (e.g. Wi-Fi may only be 90 metres; but drone radar may be, without limitation, in the range of 5 to 10 km). The volume of airspace defined by the wireless communication coverage areas of the superhighway nodes and/or surveillance coverage areas of the superhighway nodes may be used to form an aircraft superhighway or air corridor. The aircraft superhighway system is configured to, without limitation, for example authorise, control and/or monitor one or more aircraft such as, without limitation, for example UAVs and/or a plurality of UAVs permitted to traverse the aircraft superhighway route through the volume of airspace defined by the overlapping coverage areas (e.g. wireless communication coverage areas or cells and/or surveillance coverage areas) of the plurality of superhighway nodes. Each of the superhighway nodes may include either a) a communication node configured to provide wireless communication functionality and/or wireless communications over a wireless communication coverage area or cell; b) a surveillance/detection node configured to provide aircraft surveillance and/or detection functionality over a surveillance coverage area or cell; c) both a) and b). Each of the superhighway nodes of the plurality of spaced apart superhighway nodes are spaced apart from at least one other superhighway node of the plurality of spaced apart superhighway nodes to such an extent that their coverage areas still overlap to ensure the superhighway controller still has "visibility" of all aircraft using the superhighway or air corridor.

For example, a plurality of spaced apart superhighway nodes with only communication functionality may be used to form an aircraft superhighway system in which adjacent superhighway nodes of the plurality of superhighway nodes have wireless communication coverage areas or cells that overlap and the airspace of the wireless communication coverage areas or cells form a continuous airspace corridor along the path or route of the plurality of spaced apart superhighway nodes. The aircraft superhighway comprises a volume of airspace defined by the wireless communication coverage areas or cells of the plurality of superhighway nodes. The aircraft superhighway system is configured to, without limitation, for example authorise, control and/or monitor one or more UAVs and/or a plurality of UAVs permitted to traverse the aircraft superhighway route through the airspace defined by the overlapping wireless communication coverage areas or cells of the plurality of superhighway nodes.

In another example, a plurality of spaced apart superhighway nodes with only aircraft surveillance and/or detection functionality may be used to form another aircraft superhighway system in which adjacent superhighway nodes of the plurality of superhighway nodes may have surveillance coverage areas that overlap and the airspace of the surveillance coverage areas forms a continuous airspace corridor along the path or route of the plurality of spaced apart superhighway nodes. The aircraft superhighway may include a volume of airspace defined by the surveillance coverage areas or cells of the plurality of superhighway nodes. The aircraft superhighway system is configured to, without limitation, for example authorise, control and/or monitor one or more UAVs and/or a plurality of UAVs permitted to traverse the aircraft superhighway route through the airspace defined by the overlapping surveillance coverage areas or cells of the plurality of superhighway nodes.

In another example, a plurality of spaced apart superhighway nodes may be used to form a further example aircraft superhighway system in which one or more of the superhighway nodes only include wireless communication functionality, one or more of the superhighway nodes include only aircraft surveillance/detection functionality, one or more of the superhighway nodes include both wireless communication functionality and aircraft surveillance/detection functionality. The plurality of superhighway nodes may be spaced part along a superhighway route such that the communication and/or surveillance coverage areas of adjacent superhighway nodes overlap with each other. The airspace of the plurality of overlapping wireless communication coverage areas and/or surveillance coverage areas of the plurality of spaced apart superhighway nodes forms a continuous airspace corridor along the path or route of the plurality of spaced apart superhighway nodes. The aircraft superhighway may include a volume of airspace defined by the overlapping wireless communication coverage areas and/or surveillance coverage areas of the plurality of superhighway nodes. The aircraft superhighway system is configured to, without limitation, for example authorise, control and/or monitor one or more UAVs and/or a plurality of UAVs permitted to traverse the aircraft superhighway route through the airspace defined by the overlapping communication and/or surveillance coverage areas of the plurality of superhighway nodes.

The volume of airspace of each coverage area of a superhighway node between and/or including overlapping coverage areas (e.g. overlapping wireless coverage areas or overlapping surveillance areas) of the superhighway node with one or more adjacent superhighway nodes may be called an airspace segment or a UAV/Drone Spot (e.g. airspace defined by the area of communication coverage of an superhighway node). Two or more airspace segments may be called a UAV/Drone Zone and/or aircraft superhighway (e.g. airspace defined by the area of communication coverage of two or more superhighway nodes with communications functionality in which the areas of communication coverage overlap). The aircraft superhighway system establishes a plurality of UAV/Drone Spots and/or Zones connected together based on each of the coverage areas of adjacent superhighway nodes overlapping along the superhighway route (e.g. overlapping wireless communication coverage of adjacent superhighway nodes with communications functionality, overlapping wireless communication coverage and surveillance coverage of adjacent superhighway nodes with communications functionality and/or aircraft surveillance functionality, overlapping surveillance coverage of adjacent superhighway nodes with surveillance functionality). The flight of one or more UAVs beyond line-of-sight (e.g. automated or remote controlled UAVs) is made possible by the plurality of superhighway nodes forming a communication and/or surveillance network (due to, depending on whether they have wireless communications functionality or aircraft surveillance functionality or both, their overlapping wireless communication coverage areas and/or surveillance coverage areas) and further configured as a ground-based network of communication/surveillance systems that each provide aircraft/flight data of the one or more UAVs (or other aircraft) permitted to traverse the aircraft superhighway route to a superhighway controller (e.g. cloud based superhighway controller) and/or remote flight management system (e.g. a cloud-based flight management system) communicatively connected via another communication network to at least one of the superhighway nodes. The superhighway controller and/or flight management system may be configured for providing, without limitation, for example flight planning, authorisations for using the superhighway, off-board UAV/aircraft navigation, air traffic collision avoidance/resolution services and the like.

As described, the superhighway or air corridor is formed from connected UAV/Drone Spots/Zones that can be configured singularly or in a mesh. This may be achieved using a blend of software, hardware and a method of operating that, when combined, comprise a mechanism that can deliver beyond-line-of-sight capability for any UAV that wishes to fly within the coverage areas defined by the connected UAV/Drone Spots/Zones. Typically, drones and/or UAVs have limited on-board sensor capabilities and may not be able to carry all the necessary various sensor equipment to fully detect everything around them. Thus, the superhighway nodes may form a ground-based communication/surveillance network that each include various sensors and the like that can relay, without limitation, for example flight data and/or authorisations/permissions for each UAV permitted to traverse the UAV/Drone Spot of an superhighway node (e.g. airspace defined by the area of communication coverage of an superhighway node) via a superhighway node communication network and back to the flight management system (e.g. a cloud-based flight management system).

For example, the aircraft superhighway system may be used, via the UAV/Drone Spots, to effectively create 'UAV/Drone Spots or 'UAV/Drone Superhighways/UAV/Drone Zones' depending on how many are configured in a particular physical location and/or geographic area. The superhighway nodes with at least wireless communications nodes/functionality may be implemented based on using, without limitation, for example one or more from the group of: one or more equipment sites, masts, towers with capability of connecting to a communication network; telecommunication sites, masts, mobile telecommunications towers/base stations and/or mobile telecommunication infrastructure and the like; dedicated fixed and/or mobile air communication towers with complex sensor suites and/or communications transceiver(s)/relay(s) and the like for implementing the required functions of the superhighway node(s) as described herein and/or as the application demands. One or more of these superhighway nodes may be further modified to further include or implement aircraft surveillance/detection node/functionality such as, without limitation, for example one or more surveillance sensors, one or more aircraft surveillance suites, one or more cameras/CCTV cameras, one or more aircraft radar/LIDAR systems and the like, one or more motion detection systems, radio triangulation/detection systems; and/or any other type of surveillance and/or detection system useful for detecting and/or monitoring aircraft within an airspace associated with the surveillance coverage area and the like and/or as the application demands. Each of the superhighway nodes may be configured using, without limitation, for example hardware and/or software and the like to implement the required capabilities as described herein. For example, an superhighway node may serve as off-board complex sensor suites and communications relays, where data from the sensors is returned via a communication network to a superhighway controller and/or flight management system (e.g. cloud-based superhighway controller and/or flight management system/service) for providing various air traffic services such as, without limitation, for example 'air traffic control' for drones/UAVs flying within the UAV/Drone Zones/Superhighways and/or UAV/Drone Spots and the like.

Each UAV/Drone Spot of a superhighway node is open to any drone/UAV that complies with the terms of service and that implements the necessary software/hardware requirements based on one or more APIs for interfacing with the aircraft superhighway system. This is beneficial for any type of UAV and/or drone from, without limitation, for example very large drones/UAVs to very small drones/UAVs, alike.

This is unlike traditional detect-and-avoid systems, which must be on-board each UAV/drone taking up much needed payload capacity and/or power and the like.

One or more of the superhighway nodes may be configured, without limitation, for example to establish a short-range wireless-based communication (e.g. Wi Fi based communication) with the drone/UAV that is using the UAV/Drone Spot of said each superhighway node. A UAV/drone may register with the flight management system and/or superhighway node for using the aircraft superhighway system. This may be achieved by, on request from a drone/UAV operator for using the aircraft superhighway system, enabling UAV/Drone Zones/UAV/Drone Spots of the associated superhighway nodes to make extensive use of public/private key encryption in the form of issuing digital certificates to identify authorised drones/UAVs and also schedule individual flights of said drones/UAVs through each UAV/Drone Spot of said superhighway nodes in an authorised, controlled, scheduled and/or organised manner. The wireless-based communication can be used, without limitation, to supplement a UAV's/drone's own on-board communication options. This may also be used to determine absolutely independently where a drone/UAV is at any particular time by associating the registration of a drone/UAV with a known fixed superhighway node. Thus, a drone/UAV may transit a UAV/Drone Zone or Superhighway via each UAV/Drone Spot associated with a superhighway node using its set of digital certificates whilst its position can be reliably determined in a similar way to how points on a railway system work.

One or more of the superhighway nodes of an aircraft superhighway system may be configured to monitor, collect and/or send data representative of UAV flight data and/or non-flight data of UAVs using said UAV/Drone Spot of said each superhighway node to the superhighway controller/flight management system. For example, for UAVs using a UAV/Drone Spot of an superhighway node, the superhighway node 'phones home' and relays their collected UAV data back to the cloud flight management platform, which may include, without limitation, for example a superhighway controller associated with the superhighway node(s) forming the aircraft superhighway. For example, the flight management platform may be where all the aircraft or UAV telemetry data/flight data/non-flight data/sensor data aggregation and/or correlation is performed and where the central network intelligence in relation to, without limitation, authorising, controlling, maintaining, and/or conflict detection/resolution on UAVs using the aircraft superhighway system and the like is leveraged/gained. For example, a drone/UAV may sending regular 'telemetry' also referred to as UAV data/positional information via (a) the superhighway node's communications link and/or (b) via an optional backup communication mechanism to the superhighway controller and/or flight management system. The flight management system may process and combine this aircraft or UAV data/flight data/non-flight data/sensor data with other data from other superhighway nodes and/or flight data sources (e.g. radar, other aircraft, etc.) external to the aircraft superhighway system, to create a 'surveillance picture' of the surrounding airspace including the airspace associated with the aircraft superhighway. The airspace associated with the aircraft superhighway system may be designated restricted and/or controlled airspace in which UAVs and/or aircraft are required to request permission to enter and use the air corridor/superhighway of the aircraft superhighway system.

The superhighway controller and/or the flight management system can use the wireless communication and/or aircraft surveillance/detection systems of the superhighway nodes of aircraft superhighway system to provide, without limitation, for example triangulation of aircraft positions within the airspace of the aircraft superhighway/air corridor, which can be used to corroborate the aircraft/flight data transmitted from the aircraft (e.g. UAVs) using the aircraft superhighway/superhighway about its position to the superhighway controller via the superhighway nodes. This can be used for the purposes of validation and assurance by the superhighway controller, which can monitor the aircraft using the superhighway and validate they are complying with their respective authorised flight plans/flights, and if not, issue commands and/or instructions to such aircraft for complying with their authorised flight plans/flights and/or remote controlling such aircraft to ensure compliance with their authorised flight plans/flights and the like. This may also be used to issue further commands/instructions to other aircraft authorised to use the airspace of the superhighway for avoiding and/or changing flight plans/flights in relation to non-compliant aircraft (e.g. UAVs) and the like.

Essentially, the detailed 'surveillance picture' of the airspace is used to perform, without limitation, the following activities: build a real-time visual map of the sky/airspace: e.g. identify where everything is and/or where the aircraft are within the airspace including UAVs and manned aircraft (including those which are not 'cooperative' with the system); organise and/or schedule the flight paths of drones and/or UAVs/unmanned aircraft that wish to transit the air corridor/superhighway and/or area of a UAV/Drone Zone/Spot and are compliant with the flight/permission policies associated with using the air corridor/superhighway; issue conflict avoidance/resolution flight control information such as, without limitation, for example data representative of commands and/or instructions to compliant operators, pilots, and/or flight microcontrollers of drones/UAVs to avoid any conflicts detected in relation to either a) other compliant drones/UAVs using the aircraft superhighway; and/or b) another aerial hazard such as, without limitation, for example an aircraft or a change in weather conditions and the like; detect 'rogue drones/UAVs' such as, without limitation, other drones/UAVs in the vicinity of the airspace associated with the aircraft superhighway that are not compliant and/or permitted to use the airspace of the aircraft superhighway system.

The aircraft superhighway system may be used to: 1) create an 'air corridor/aircraft superhighway', either in isolation, or connecting to other 'air corridors'/'aircraft superhighways', so-called 'superhighways'; 2) establish a zone, or a perimeter, within the boundaries of which the same flight management capabilities are provided, which is useful for example at airports, where it is necessary to 'see' everything in the sky 360 degrees around a facility.

The aircraft superhighway system provides a control and permission capability that enables unmanned air traffic such as, without limitation, for example UAVs/drones and the like are to achieve mass adoption for operating, remotely operating, and/or autonomously operating in controlled airspace, where it is illegal to fly in controlled airspace without the required equipment and/or permission from air traffic controllers and/or flight management systems and the like. The aircraft superhighway system may also provide additional control and permission capability that enables manned air traffic to safely operate in controlled airspace alongside unmanned aircraft and the like.

FIG. 1a is a schematic diagram illustrating an example of an aircraft superhighway system 100 for enabling beyond line-of-sight operation of a plurality of UAVs or other unmanned aircraft according to the invention. The aircraft superhighway system 100 includes a plurality of spaced apart superhighway nodes (e.g. communication stations or towers) 102a-102n and 110a-110b (also referred to herein as air towers), spaced apart along a path or route 101. Each superhighway node 102a of the plurality of superhighway nodes 102a-102n including at least communications node/functionality that provides wireless communications over a wireless communication coverage area 103a-103n, e.g. cell or communication zone with radius r. Each superhighway node 110a of the plurality of superhighway nodes 110a-110b including at least aircraft surveillance node/functionality that provides aircraft surveillance/detection over a surveillance coverage area 111a-111b, e.g. surveillance cell or surveillance zone with radius Rs. The surveillance coverage areas 111a-111b may each have a greater range than each of the communication coverage areas 103a-103n, so Rs may be greater than r. For example, superhighway nodes 110a-110b with surveillance/detection functionalities/capabilities the may have surveillance/detection capabilities will have a greater range than the communication capabilities of each superhighway node 102a-102n with communication capabilities (e.g. Wi-Fi may only be 90 metres; but drone radar may be, without limitation, in the range of 5 to 10 km).

The superhighway nodes 102a-102n are spaced apart such that each of the plurality of wireless communication coverage areas 103a-103n overlap with at least one other of the plurality of wireless communication coverage areas 103a-103n. Thus, adjacent superhighway nodes of the plurality of superhighway nodes 102a-102n have overlapping portions 103ab, 103bc, 103cd, 103de to 103mn of the respective wireless communication coverage areas. Given that the plurality of wireless communication coverage areas 103a-103n overlap with at least one or more other adjacent areas of wireless communication coverage, then this forms a continuous wireless communication coverage area, which can be used to form superhighway node communication network or a superhighway node mesh network. The volume of airspace of each wireless communication coverage area 103a of a superhighway node 102a between and/or including each of the overlapping areas of wireless coverage 103ab of the superhighway node 102a with one or more adjacent superhighway nodes 102b may be called an airspace segment or a UAV/Drone Spot 105a. The volume of airspace of each surveillance coverage area 111a or 111b of a superhighway node 110a or 110b between one or more adjacent superhighway nodes 102b-102n and/or 110b may also be called an airspace segment or a UAV/Drone Spot 115a or 115b. The plurality of UAV/Drone Spots 105a-105n and/or 115a-115b connect together to form the aircraft superhighway 104 along which authorised UAVs/drone may traverse/fly and the like.

In this example, the aircraft superhighway system 100 establishes a plurality of UAV/Drone Spots 105a-105n connected together based on the wireless communication coverage of adjacent superhighway nodes 102a-102n that overlap to form a UAV/Drone Zone or Superhighway 104. The aircraft superhighway 104 (e.g. UAV/Drone Zone or Superhighway) comprises a controlled airspace defined by the wireless communication coverage areas 103a-103n of the plurality of superhighway nodes 102a-102n that overlap. One or more of the superhighway nodes 102a, 102c to 102n may connect via communication channels/connections 106a-106c and communication network(s) 106 to superhighway flight controller 108a and/or a flight management system 108b. One or more of the superhighway nodes 110a may connect via communication channels/connections 112a to one or more superhighway nodes 102b with communications capability and hence may connect through one or more of the superhighway nodes 102a-102n via communication network(s) 106 to superhighway flight controller 108a and/or a flight management system 108b. Thus, the superhighway flight controller 108a and/or flight management system 108b are configured to control airspace defined by the UAV/Drone Zone or Superhighway 104 (or aircraft superhighway) and receive aircraft data/flight data/sensor data/surveillance data and the like from one or more of the superhighway nodes 102a-102n and/or 110a-110b. The aircraft superhighway 104 forms a controlled air channel or controlled airspace that is defined by the areas of coverage 103a-103n of the superhighway nodes 102a-102n. The superhighway controller 108 may be configured to, without limitation, for example authorise, control and/or monitor one or more UAVs and/or a plurality of UAVs permitted to fly in the controlled airspace of the aircraft superhighway 104 following route 101.

Thus, the flight of one or more UAVs beyond line-of-sight (e.g. automated or remote controlled UAVs) is made possible by the plurality of superhighway nodes 102a-102n forming the superhighway communication network (e.g. Wi-Fi mesh network) (due to their overlapping wireless communication coverage areas 103a-103n). One or more of the superhighway nodes 102a-102n may further configured to include surveillance functionality/node and be a ground-based surveillance system and thus, the plurality of superhighway nodes 102a-102n and 110a-110b form a ground-based communication/surveillance network of communication/surveillance systems. Each superhighway node 102a may include sensors/hardware configured for providing flight data (e.g. position, speed, velocity, altitude, heading and/or attitude) of the one or more UAVs permitted to traverse the aircraft superhighway route to a remote flight management system 108b (e.g. a cloud-based flight management system) communicatively connected via the second communication network 106 to at least one of the superhighway nodes 102a-102n. In this example, the first superhighway node 102a is connected via a communication channel 106a to communication network 106. The flight management system 108b may be configured for providing, without limitation, for example flight planning, off-board UAV navigation, air traffic collision avoidance/resolution services and the like. This may also be used to relay any aircraft surveillance data from superhighway node 110a to the superhighway flight controller 108a (also called superhighway controller). As an option, surveillance data from the superhighway nodes 110a-110b may be collected via communication network in a cloud-based surveillance data storage 113, which the superhighway controller 108a and/or flight management system 108b may retrieve via communication channels 114 and the like. The superhighway flight controller 108a may be configured to provide scheduling and/or permissions of flights of UAVs through or along the superhighway 104. The superhighway controller 108a may be implemented using cloud-platform and/or cloud-based technologies as a cloud flight management/control service 108 and may also be a part of or a component of a flight management system 108b. As described, the superhighway or air corridor 104 is formed from connected UAV/Drone Spots 105a-105n, where multiple consecutively connected UAV/Drone Spots 105a-105d can be configured or arranged singularly or in a mesh to form a UAV/Drone Zone 105a-105d, which may also be referred to as an aircraft superhighway/corridor 104.

Typically, drones and/or UAVs have limited on-board sensor capabilities and may not be able, or even have the payload capacity, to carry all the necessary sensor equipment to fully detect everything in the airspace around them. Thus, the superhighway nodes 102a-102n form a ground-based network that each include various sensors and the like that can relay, without limitation, for example flight data and/or authorisations/permissions associated with each UAV permitted to traverse the UAV/Drone Spot 105a of an superhighway node 102a (e.g. airspace defined by the area of communication coverage of an superhighway node) and/or UAV/Drone Zone 105a-105d of superhighway nodes 102a-102d (e.g. airspace defined by two or more areas of communication coverage 103a-103d of consecutive superhighway nodes 102a-102d along route 101) and/or superhighway 104 via the superhighway node communication network and one or more communication channels 106a-106c connected to second communication network 106 to the superhighway controller 108a and/or flight management system 108b (e.g. a cloud-based flight management system).

Figure 1B:
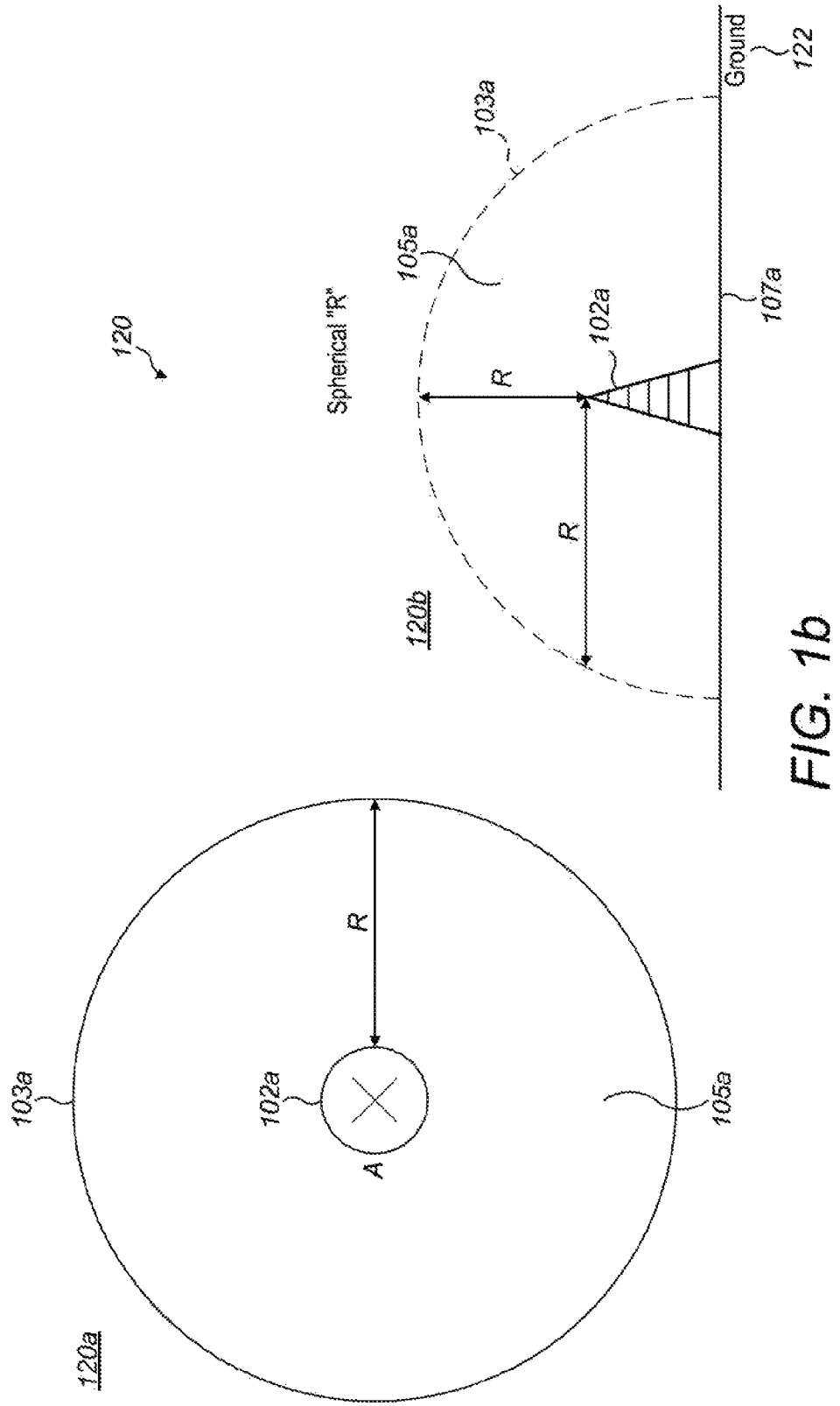
FIG. 1b is a schematic diagram illustrating an example superhighway node arrangement for use with the example aircraft superhighway system of FIG. 1a according to some embodiments of the invention.

FIG. 1b is a schematic diagram illustrating an example superhighway node arrangement 120 for use with aircraft superhighway system 100 of FIG. 1a according to the invention. FIG. 1b illustrates a plan elevation 120a of an example superhighway node 102a and a side elevation 120b of the superhighway node 102a. As described with reference to FIG. 1a, the aircraft superhighway system 100 may be used, via the superhighway nodes 102a-102n, to effectively create 'UAV/Drone Spots or 'UAV/Drone Superhighways/ UAV/Drone Zones' depending on how many are configured in a particular physical location and/or over a geographic area. In this example, the superhighway node 102a (e.g. A) in the plan elevation 120a is illustrated as having communications node/functionality with, without limitation, for example an omnidirectional communications antenna or transceiver providing an area of communication coverage 103a with a radius R. The radius R may be based on a distance from the superhighway node 102a in which a transmitter/receiver located at the radius R experiences, without limitation, for example a minimum or predetermined signal-to-noise ratio, Wi-Fi signal strength, or signal strength threshold and/or any measure of communications performance and/or threshold, but where the transmitter/ receiver can still communicate with the superhighway node 102a. For example, the radius R may be, without limitation, for example based on the distance from the superhighway node 102a in which the communication signal of a transmitter/receiver at the radius R drops to a level or a signal-to-noise ratio threshold in which the transmitter/receiver should hand-over to another superhighway node (not shown) if it is travelling in a direction away from the superhighway node 102a. Although an omnidirectional antenna is described, this is for simplicity and by way of example only and the invention is not so limited, it is to be appreciated by the person skilled in the art that any type of communications antenna may be used that provides an area of communication coverage with an antenna beam shape/coverage as the application demands such as, without limitation, for example omnidirectional, directional, directed, phased array, multiple beam lobes and the like.

In this example, in the side elevation 120b the area of communication coverage 103a of superhighway node 102a, when the superhighway node 102a uses an omnidirectional antenna, the area of communication coverage 103a forms essentially a hemispherical volume of airspace 105a with a radius R with the flat side 107a of the hemispherical volume of airspace 105a level with the ground 122 on which the superhighway node 102a is located or positioned. The superhighway node 102a is essentially located in the centre of the area of wireless communication coverage 103a in the vicinity of the flat side 107a of the hemispherical volume of airspace 105a. The volume of airspace 105a that covers each area of wireless communication coverage 103a of a superhighway node 102a forms a UAV/Drone Spot 105a. Although the volume of airspace 105a is described as being a hemispherical volume of airspace, this is for simplicity and by way of example only and the invention is not so limited, it is to be appreciated by the skilled person that the volume of airspace 105a may be any volumetric shape such as, without limitation, for example cylindrical, cuboid and/or any other volume of airspace defined by the range and/or beam pattern and the like of the communication node/ functionality (e.g. communication antennas) used by the superhighway node 102a to provide a wireless communication coverage area that may be designated as a UAV/Drone Spot 105a (or aircraft spot or superhighway node zone spot) and the like.

In this example, the superhighway node 102a may be implemented using, without limitation, for example one or more from the group of: mobile telecommunications towers/ base stations and/or mobile telecommunication infrastructure and the like; dedicated air communication towers with complex sensor suites and/or communications transceiver(s)/relay(s) and the like. The superhighway node 102a may be configured using, without limitation, for example hardware and/or software and the like to implement the required capabilities as described herein. For example, an superhighway node 102a may serve as off-board complex sensor suites and communications relays, where data from the sensors is returned via the communication network 106 to a flight management system 108b for providing various air traffic services such as, without limitation, for example 'air traffic control' for drones/UAVs flying within the UAV/ Drone Zones/Superhighways 104 and/or UAV/Drone Spots 105a-105n and the like.

The superhighway node 102a may use existing technologies or be purpose built and this may either be a physical or a 'virtual tower' such as, without limitation, for example, an existing telecoms mast that is reconfigured to perform the functions of a superhighway node 102a as described herein. The superhighway node 102a is configured to include: 1) one or more surveillance platforms such as, without limitation, for example RADAR, cameras, infrared sensors, sensors and the like with capabilities for tracking and/or detecting UAVs and/or other aircraft at least within the area of communication coverage 103a of the superhighway node 102a; 2) one or more pieces of communications equipment for either communicating with, without limitation, for example at least one or more from the group of: one or more UAVs/drones within the UAV/Drone Spot 105a of the superhighway node 102a; one or more other superhighway nodes, at least one of which may be connected via a second communication network 106 to a superhighway controller 108a or flight management system 108b; or directly connected to a superhighway controller 108a or flight management system 108b via a second communication network 106.

For example, an superhighway node 102a may include at least one or more pieces of communications equipment including, without limitation, for example: (i) communications equipment providing a communications link between the superhighway node 102a and one or more other superhighway nodes, for example, at least one piece of communication equipment is dedicated to communication with adjacent towers over, without limitation, short-range Wi-Fi or other short-range wireless communication standard/signal; (ii) communications equipment providing a robust communications uplink to the Internet or second communication network 106, and/or via satellite serving as a backup, or a link to at least one of the other superhighway nodes participating the superhighway or UAV/Drone Zone with such communications equipment; (iii) a dedicated, wired or wireless internet connection to said second communication network 106 for use in communicating with the superhighway controller 108*a* and/or the flight management system 108*b*.

One or more of the superhighway nodes 102*a*-102*n* may initially be a physical deployment of communications/sensing equipment on, without limitation, for example lattice metal towers, attached to buildings, and/or on portable or temporary structures. Additionally or alternatively, one or more of the superhighway nodes 102*a*-102*n* may be designed to be deployed 'logically' as software-defined-radios that are configured to operate on existing cell tower/mobile telecommunications infrastructure such as those used by telecommunications companies and the like. In any event, an superhighway node 102*a* include the necessary hardware and/or software functionalities for implementing the aircraft superhighway system 100 as described with reference to FIGS. 1*a* to 5, combinations thereof, modifications thereto and/or as described herein and/or as the application demands.

Figure 1C:
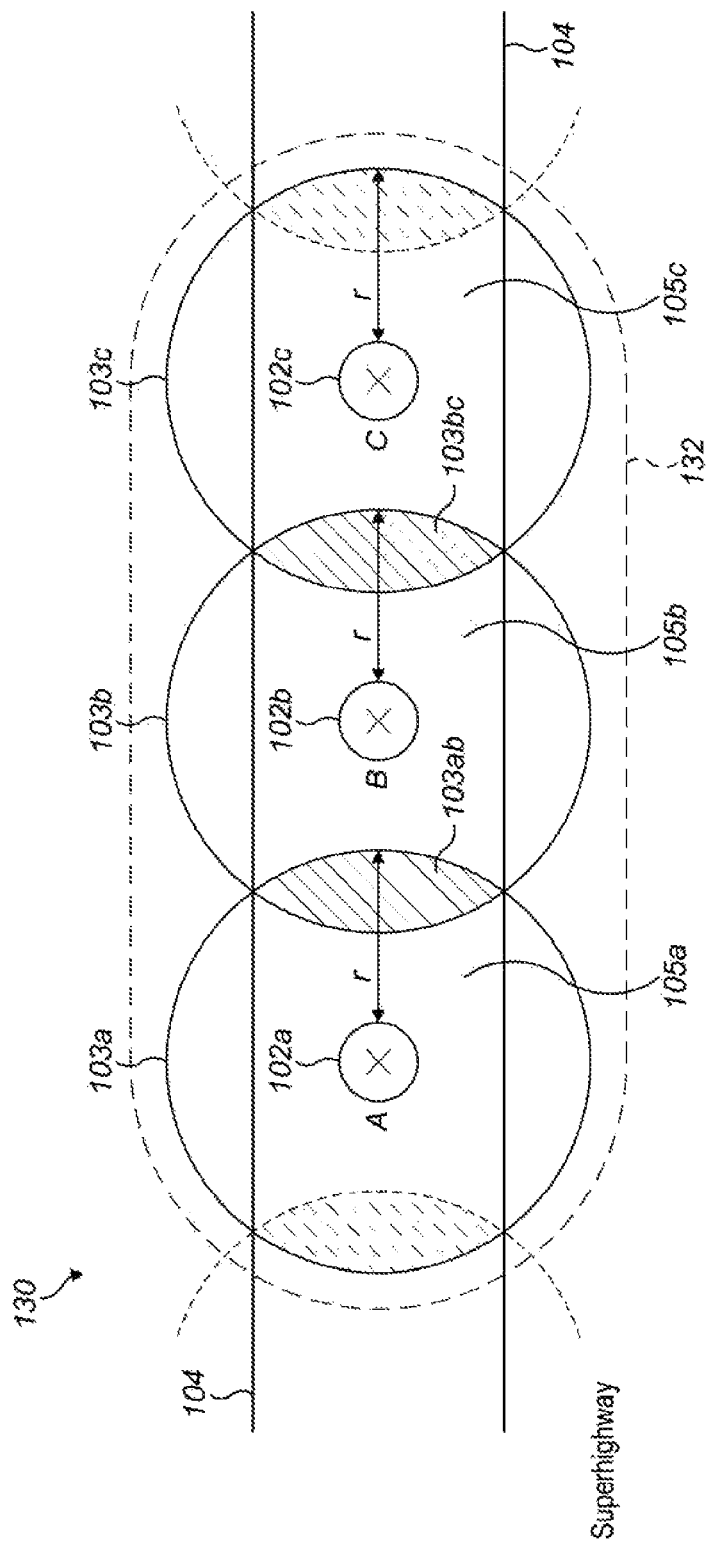
FIG. 1c is a schematic diagram illustrating an example UAV/Drone Zone for use with the example aircraft superhighway system of FIG. 1a according to some embodiments of the invention.

FIG. 1*c* is a schematic diagram illustrating an UAV/Drone Zone 130 for an aircraft superhighway 104 based on using overlapping UAV/Drone Spots 105*a*-105*b* of multiple superhighway nodes 102*a*-102*c* according to the invention. In this example, the UAV/Drone Zone 130 for the aircraft superhighway 104 is formed by placement of multiple superhighway nodes 102*a*-102*c* such that the areas of communication coverage 103*a*-103*c* overlap forming an overlapping set of UAV/Drone Spots 105*a*-105*c*. The overlapping set of UAV/Drone Spots 105*a*-105*c* form the UAV/Drone Zone 130 of the aircraft superhighway 104. The overlapping set of UAV/Drone Spots 105*a*-105*c* may also form a superhighway node communication network 132 (e.g. Wi-Fi mesh network), that can be used, when at least one of the corresponding superhighway nodes 102*a* is connected to communication network 106 (not shown), by superhighway nodes 102*a*-102*c* to connect as well to communication network 106 (not shown) via the superhighway node communication network 132. The aircraft superhighway 104 route follows the communication coverage areas 103*a*-103*c* that overlap, and is seen to intersect each of the overlapping areas of communication coverage 103*ab* and 103*bc* to ensure that the drones/UAVs in flight along the route of the aircraft superhighway 104 always are in communication with at least one of the superhighway nodes 102*a*-102*c* and hence the superhighway controller may continuously monitor, control and/or authorise transit of the aircraft/UAVs/drones along the aircraft superhighway 104. This means that the drones/UAVs can be controlled, monitored, (e.g. via the superhighway controller and/or flight management system) for compliance with their flight plans within the aircraft superhighway 104 and that they are able to be controlled via the superhighway nodes 102*a*-102*c* beyond line of sight and the like.

Referring to FIGS. 1*a* to 1*c*, each of the superhighway nodes 102*a*-102*n* and/or 110*a*-110*b* may be configured, without limitation, for example to act as: (a) aggregators of surveillance UAV/drone data (e.g. one or more of superhighway nodes 102-102*n* and/or 110*a*-110*b*); (b) communications relays to/from UAVs/Drones and/or other unmanned aircraft and/or aircraft in flight and/or travelling through the aircraft superhighway 104 and/or UAV/Drone Spots 105*a*-105*n* and/or UAV/Drone Zones and the like (e.g. one or more of superhighway nodes 102-102*n*); (c) relays of the surveillance UAV/Drone data to the superhighway controller 108*a* and/or flight management system 108*b* and the like (e.g. one or more of superhighway nodes 102*a*-102*n* and/or 110*a*-110*b*). Each of the superhighway nodes 102*a*-102*b* are configured to not perform any flight management and/or scheduling tasks or other tasks that affect the flight of UAVs/Drones and/or other aircraft. Instead, this functionality is performed by the superhighway controller 108*a* and/or the flight management system 108*b*. The superhighway controller 108*a* may be a component and/or part of the flight management system 108*b*. Alternatively or additionally, the functionality of the superhighway controller 108*a* as described with reference to FIGS. 1*a* to 5 and/or as herein described may be included within the functionality of the flight management system 108*b*. The superhighway controller 108*a* and/or flight management system 108*b* may be implemented, without limitation, for example as a cloud-based platform and/or using cloud-based technologies/services and the like to form a superhighway cloud-based service 108.

Each of the superhighway nodes 102*a*-102*n* and/or 110*a*-110*b* form a physical/virtual 'infrastructure' within which aircraft data (e.g. UAV flight data, UAV non-flight data, UAV permissions data and the like) may be detected, received, and/or obtained by the hardware/software capabilities of each of the superhighway nodes 102*a*-102*n* and/or 110*a*-110*b* and transmitted over communications network 106 for processing by the superhighway controller 108*a* and/or flight management system 108*b* in real-time in order to provide authorisation and/or navigation capability for automated aerial transport or flights of the UAVs/Drones and/or other unmanned aircraft that may use the controlled airspace of the aircraft superhighway 104. In essence, each superhighway node 102*a* and/or 110*a* forms part of a cooperative or compliant UAV's/drone's "eyes and ears" and relay data representative of UAV flight data and/or other UAV data of these UAVs based on what the superhighway node 102*a* and/or 110*a* senses, "sees", detects using its communications/surveillance sensing equipment via communication network(s) 106 over communications link 106*a*/112*a* (and/or back-up communications links 106*b*-106*c*) to the flight management system 108*b*. The controller/flight management system 108*a*/108*b* processes this data to determine whether each UAV is complying with their agreed use of the superhighway 104 and/or detecting conflicts in relation to any of the UAVs and other UAVs and/or aircraft in the airspace each UAV is operating. Based on this analysis, the flight management system 108*b* may determine conflict resolutions and send flight control information including data representative of commands and/or instructions for the UAV/drone to avoid any detected collisions and the like. Thus, the superhighway node 102*a* further relays to those UAVs/drones that have detected conflicts and resolutions thereto the flight control information including, without limitation, for example data representative of avoiding instructions to said UAVs/vehicles to avoid collisions.

The superhighway controller 108*a* and/or flight management system 108*b* are configured to authorise and/or control the use of the controlled airspace of the superhighway 104 by each of a plurality of UAVs/drones or other unmanned aircraft wishing to traverse or fly a route along the superhighway 104. For example, in order for a drone or UAV to be permitted to use the aircraft superhighway 104 and/or a UAV/Drone Spot 105*a* and/or a specified UAV/Drone Zone 105*a*-105*c* (i.e. multiple consecutive overlapping UAV/Drone Spots 105*a*-105*c*), the operator of the drone or UAV, or even the drone/UAV may send a request for permission and/or submit a flight plan for transiting and/or using the aircraft superhighway 104 over communication network 106 to superhighway controller 108*a*. Thus, any UAV/drone that wishes to fly within an UAV/Drone Spot 105*a*, UAV/Drone Zone 105*a*-105*c*, and/or within the controlled airspace along the route 101 of aircraft superhighway 104 must comply with the policies, rules and/or regulations/instructions implemented by the superhighway controller 108*a* and/or flight management system 108*b*.

In this regard, the UAV/drone must be capable of being configured to provide its own UAV position data to the superhighway controller 108*a*/flight management system 108*b* via the superhighway nodes 102*a*-102*n*. For example, an superhighway application programming interface (API) may be installed as part of the UAV/drone operating software and be capable of providing Alternatively of additionally, the UAV/drone may include, without limitation, for example (i) capability for communicating position updates and other information via an superhighway node 102*a* (e.g. ground station relay) that may be proprietary to the manufacturer of the UAV/drone; (ii) capability for communicating with the communication hardware (e.g. Wi-Fi communications) on board an superhighway node 102*a*, which may require the UAV/drone to have, without limitation, for example a simple Wi-Fi chip; and/or (iii) capable of communicating via cellular and/or satellite communications hardware with superhighway nodes 102*a*-102*n* and/or directly with flight controller 108*a*/flight management system 108*b* and the like.

The superhighway controller 108*a* coordinates the activities, operations and/or tasks of the superhighway nodes 102*a*-102*n* of the superhighway 104, whether operating singularly or across a network of superhighway nodes 102*a*-102*n* of the superhighway 104. Initially, all UAV/drone flights or other aircraft (e.g. includes manned aircraft) within the UAV/Drone Spots 105*a*, UAV/Drone Zones 105*a*-105*c* and/or superhighway 104 provided by the superhighway nodes 102*a*-102*n* are considered to be non-cooperative unless otherwise authorised by the superhighway controller 108*a*. For example, a cooperative UAV/drone is one that at least has the capabilities to fly and/or operate with the superhighway nodes 102*a*-102*n* and that is at least compliant with, without limitation, for example any instructions, certificates authorise the UAV transit between superhighway nodes 102*a*-102*n*, and/or flight plans of the UAV approved by the superhighway controller 108*a*. A non-cooperative UAV/drone is one that may be operating or flying within the airspace of the superhighway 104 without the, by way of example only but not limited to, appropriate certificates, authorisations, permissions for transiting/flying between one or more superhighway nodes 102*a*-102*n* along the superhighway 104; non-compliant to any approved flight plans by the superhighway controller 108*a* and/or flight management system 108*b*; ignoring any instructions and/or commands issued by the superhighway controller 108*a* and/or flight management system 108*b*; and/or for any other reason such that it poses a danger and/or threat to cooperative and compliant UAVs/drones authorised for using the superhighway 104 and the like.

The functionalities of the superhighway controller 108*a* as described with reference to FIGS. 1*a*-5 and/or as herein described may be implemented, without limitation, for example using distributed computing resources such as, without limitation, for example cloud-based platforms/technologies and/or services. For example, the superhighway controller 108*a* may be optionally located and operated 'on the edge' or in an edge computing manner such that, without limitation, for example, the functionality of the superhighway controller 108*a* is distributed across those superhighway nodes 102*a*-102*n* that have a processing capability or capacity and the like. Similarly, as an option, the flight management system 108*b* may also be implemented using distributed computing resources such as, without limitation, for example cloud-based platforms/technologies and/or services. For example, the flight management system 108*b* may be optionally located and operated 'on the edge' or in an edge computing manner.

In operation, the superhighway controller 108*a*, on receiving a request for authorisation to fly along the superhighway 104 from one or more UAV(s)/drone(s), issues digital certificates to: (i) each drone/UAV (e.g. a drone/UAV digital certificate); and (ii) each individual flight or flight plan that is to be carried out by a UAV/drone (e.g. a flight certificate). In this example, a flight certificate will not be issued to a UAV/drone unless the UAV/drone has a valid UAV/drone certificate. A valid drone/UAV certificate will not be issued unless the superhighway controller 108*a* and the superhighway service it provides is assured that the operator of the drone/UAV has valid login credentials, and that the operator and/or UAV/drone meets the necessary pre-requisites and/or capabilities for operating within the controlled airspace of the superhighway 104. Each flight certificate may be digitally signed and form a digitally signed flight certificate. Each flight certificate for a UAV/drone flight/flight plan may be configured to be time-limited and valid only for the duration of the planned flight, which may include a buffer for starting and ending the flight of the UAV/drone. Each UAV/drone certificate may be valid for, without limitation, for example a predetermined period of time; until the operator/user of the UAV/drone unsubscribes from the superhighway service provided by the superhighway controller 108*a*; the operator/user are non-compliant with the policies, rules and/or regulations of the superhighway service and implemented by the superhighway controller 108*a*; and/or a length of time or a time period as defined by the superhighway controller 108*a*; and/or for any suitable length of time. Should a UAV/drone not be able to complete its planned flight before expiry of the time limit of the flight as indicated by the flight certificate, i.e. if a flight certificate expires whilst the drone/UAV is still in flight, there is an "in-flight renewal" process that can be followed for renewing the flight certificate. That said, any drone/UAV that needs to renew the flight certificate may not be able to fly to another adjacent UAV/drone Spot of another superhighway node and/or pass between superhighway nodes 102*a*-102*n* until the flight certificate is renewed.

The UAV/drone certificates and flight certificates are used by the drone/UAV to transit between each of the superhighway nodes 102*a*-102*n* that it is permitted to transit (as defined by the flight certificate) along its authorised route on the superhighway 104. The UAV/Drone certificate for a UAV/drone may also be required in order to be physically allow the UAV/Drone to establish communications (e.g. Wi-Fi communications) with the superhighway nodes 102*a*-102*n*, and thus, the superhighway controller 108*a*. The superhighway service provided by the superhighway controller 108*a* may be made to be only accessible via a private communication network that is created by the overlapping areas of coverage 103*a*-103*n* of the plurality of superhighway nodes 102*a*-102*n*. Thus, access to this private communications network may (e.g. a private Wi-Fi network) made using a validly issued UAV/drone certificate. For example, a UAV/drone may present or transmit data representative of their UAV/drone certificate to the superhighway controller 108a via a communications link with a superhighway node 102a. Thus, only valid UAV/Drones or UAV/drones with valid UAV/drone certificates may be able to establish a communications link with the superhighway nodes 102a-102n and hence the superhighway controller 108a.

As a UAV/drone passes from one superhighway node 102b to an adjacent superhighway node 102c, it 'associates' itself with the next superhighway node 102c it is travelling towards (once it is in range of that superhighway node 102c) using a digital 'handshake' which requires that both the UAV/drone certificate and that the flight certificate associated with the UAV/drone flight are valid for the flight. During the digital handshake, the next superhighway node 102c may be configured to transmit data representative of, without limitation, for example the UAV certificate details, flight certificate details, location of the UAV and the like to the superhighway controller 108a, which then processes this data to check the validity of the certificates, check whether the UAV/drone is who they say they are, check whether the UAV/drone is being compliant with the flight plan associated with the flight certificate, or whether the flight certificate has expired and the like. The superhighway controller 108a may be configured to notify the superhighway node 102c whether or not to allow the drone/UAV to pass through the UAV/Drone Spot 105c of the superhighway node 102c and the like. For example, the superhighway controller 108a is configured to deny transit if either certificate is invalid, which is communicated via the superhighway node 102c to the UAV/drone wishing to pass through the controlled airspace of the UAV/Drone Spot 105c of superhighway node 102c in relation to their flight plan/flight.

As an option, each flight certificate may also act like virtual 'tokens', where the presentation of a flight certificate by a UAV/drone to a particular superhighway node 102a means that the UAV/drone presenting said flight certificate is known to be within the vicinity (e.g. within a radius R or within the coverage radius of the particular superhighway node 102a) of the particular superhighway node 102a at that particular time. This provides further supplemental assurance that a particular UAV/drone is within the physical proximity to a particular superhighway node 102a at a particular given time. This information may be used by the flight management system 108b and/or superhighway controller 108a to further check and/or clarify its estimate of where the UAV/drone is and how well it is being compliant to the flight plan corresponding to the flight certificate.

Essentially, each UAV/drone is required to be capable of receiving instructions/commands from the superhighway controller 108a via the superhighway nodes 102a-102n. The superhighway controller 108a may be configured to operate flight management system 108b, and/or the flight management system 108b may be configured to operate the superhighway controller 108a. In this manner, the superhighway controller 108a may schedule, authorise and/or instruct/command each of the UAVs/drones using the superhighway 104 accordingly.

As described above, the UAV/drone or operator of the UAV/drone may file a pre-flight plan with the superhighway controller 108a, in which the superhighway controller 108a provides either: a) authorization to the UAV/drone or operator of said UAV/drone; or b) a rejection. The superhighway controller 108a processes the pre-flight plan and the request from the UAV/drone based on information held within the network on whether or not the operation or flight appears to be safe. The flight certificate for the flight based on the pre-flight plan is issued if the flight is valid and appears to be safe using the superhighway 104 of the aircraft superhighway system 100. By this time, the UAV/drone may also have a UAV/drone certificate, otherwise, they will not be able to get a flight certificate for the planned flight (pre-flight plan).

The superhighway controller 108a will monitor the UAV's location during the flight. For example, the UAV's location will be: (i) monitored remotely, using both the surveillance systems on each of the superhighway nodes 102a-102c and/or 110a-110b that the UAV may transit, and also on the UAV's own reported position, which is reported to the superhighway controller 108a via the superhighway node 102b in which UAV/Drone Spot 105b the UAV/drone may be transiting/flying through; and (ii) the airspace/sky surrounding the UAV/drone and out to the operational limit of the corresponding superhighway nodes 102a-102n and/or 110a-110b, which will be monitored for other airspace users including such as, without limitation, for example other UAVs and aircraft that may either expected or unexpected. The superhighway controller 108a receives the data representative of the UAV location from one or more of the superhighway nodes 102a-102n and/or 110a-110b and appropriate action will be relayed by the superhighway controller 108a and/or flight management system 108b to any UAV/drone that is under the influence of the corresponding superhighway nodes 102a-102n (e.g. via Wi-Fi network between UAV/drone and corresponding superhighway node). Alternatively or additionally, appropriate action will be relayed by the superhighway controller 108a and/or flight management system 108b to any UAV/drone operator connected to communication network 106. Alternatively or additionally, appropriate action will be relayed by the superhighway controller 108a and/or flight management system 108b to any UAV/drone via one or more other communication network(s) such as, without limitation, for example cellular and/or satellite communication networks or long-range radio networks and the like.

The superhighway controller 108a may also be adapted to configure/monitor and organise the traffic flow and/or structure of the superhighway 104, portions of the superhighway 104 such as, without limitation, for example one or more UAV/Drone Spots 105a and/or one or more UAV Drone Zones 105a-105d. The traffic flow of UAV/drones along the route 101 of the superhighway 104 may be organised using two or more separated flight lanes in which each flight lane has air traffic all flying/transiting/moving in a particular direction of travel. The superhighway controller 108a may then monitor the compliance of UAV/drones operating and/or using the superhighway 104 to ensure all UAV/drones are in the correct flight lanes and, for each flight lane they are all moving in the same direction of travel. The superhighway controller 108a may be configured, based on analysing the locations, speed of travel, and/or other UAV data associated with said UAV/drones, to send instructions to UAV/drones for remotely controlling their flight paths/routes and/or flight plans to ensure the safe flow of air traffic along the corresponding flight lanes of the superhighway 104.

Figure 1D:
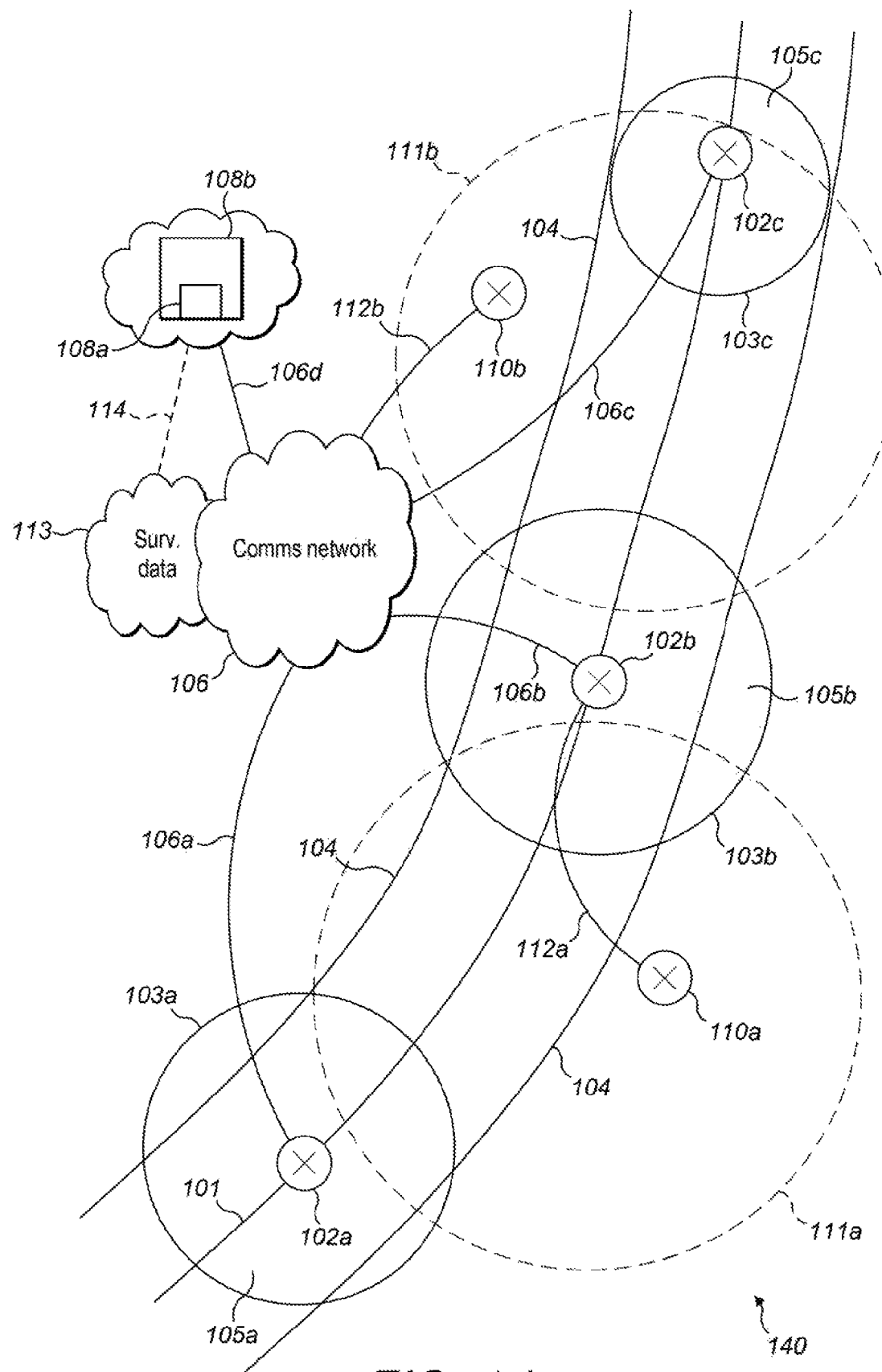
FIG. 1d is a schematic diagram illustrating another example aircraft superhighway system according to some embodiments of the invention.

FIG. 1d is a schematic diagram illustrating another example aircraft superhighway system 140 (e.g. aircraft detection and superhighway transit system) based on aircraft superhighway system 100 as described with reference to FIGS. 1a-1c. In this example the aircraft superhighway system 100 is further modified to space apart the superhighway nodes 102a-102c such that their wireless communication coverage areas 103a-103c do not overlap with each other, but in which the spaced apart superhighway nodes 110a-110b are positioned such that their surveillance coverage areas 111a-111b overlap with at least one or more of the wireless communication coverage areas 103a-103c. For example, wireless communication coverage area 103a hosted by superhighway node 102a overlaps with surveillance coverage area 111a, wireless communication coverage area 103b hosted by superhighway node 102b overlaps with surveillance coverage areas 111a and 111 b and wireless communication coverage area 103c hosted by superhighway node 102c overlaps with surveillance coverage area 111b. Each of the superhighway nodes 102a-102c are connected to communications network 106 via communication links 106a-106c, respectively. In this example, superhighway node 110a is connected to communications network 106 via communication links 112a to superhighway node 102b and communication link 106b. Superhighway node 110b is connected to communications network 106 via communication link 112b, respectively. Thus, the volume of airspace defined by a coverage area based on the overlapping wireless communication coverage areas 103a-103c of the superhighway nodes 102a-102c (with communication node/functionality) and the surveillance coverage areas 111a-111b of the superhighway nodes 110a-110b (with surveillance nodes/functionality) forms an aircraft superhighway 104 or air corridor 104. The superhighway 104 is formed using the plurality of spaced apart superhighway nodes 102a-102b and 110a-110b (e.g. communication nodes and/or surveillance nodes) (e.g. communication/surveillance stations or towers), spaced apart along or alongside a path or route 101.

As described with reference to FIGS. 1a-1c, in FIG. 1c the communication links 106a-106c and 112a-112b may be used to relay any aircraft data/flight data/aircraft surveillance data from superhighway nodes 102a-102c and 110a-110b to the superhighway flight controller 108a (also called superhighway controller). As an option, surveillance data from the superhighway nodes 110a-110b (or superhighway nodes 102a-102c) may be collected via communication network in a cloud-based surveillance data storage 113, which the superhighway controller 108a and/or flight management system 108b may retrieve via communication channels 114 and the like. As described herein the aircraft superhighway system 140 is configured to using cloud based superhighway service 108 including superhighway controller 108a and/or flight management system 108b, without limitation, for example authorise, control and/or monitor one or more aircraft such as, without limitation, for example UAVs and/or a plurality of UAVs permitted to traverse the aircraft superhighway route 101 through the volume of airspace defined by the overlapping wireless communication coverage areas 103a-103c or cells and surveillance coverage areas 111a-111b of the plurality of superhighway nodes 102a-102c and 110a-110b. One or more of the superhighway nodes 102a-102c may further include surveillance functionality and/or one or more of the superhighway nodes 110a-110b may include wireless communications functionality.

Figure 1E:
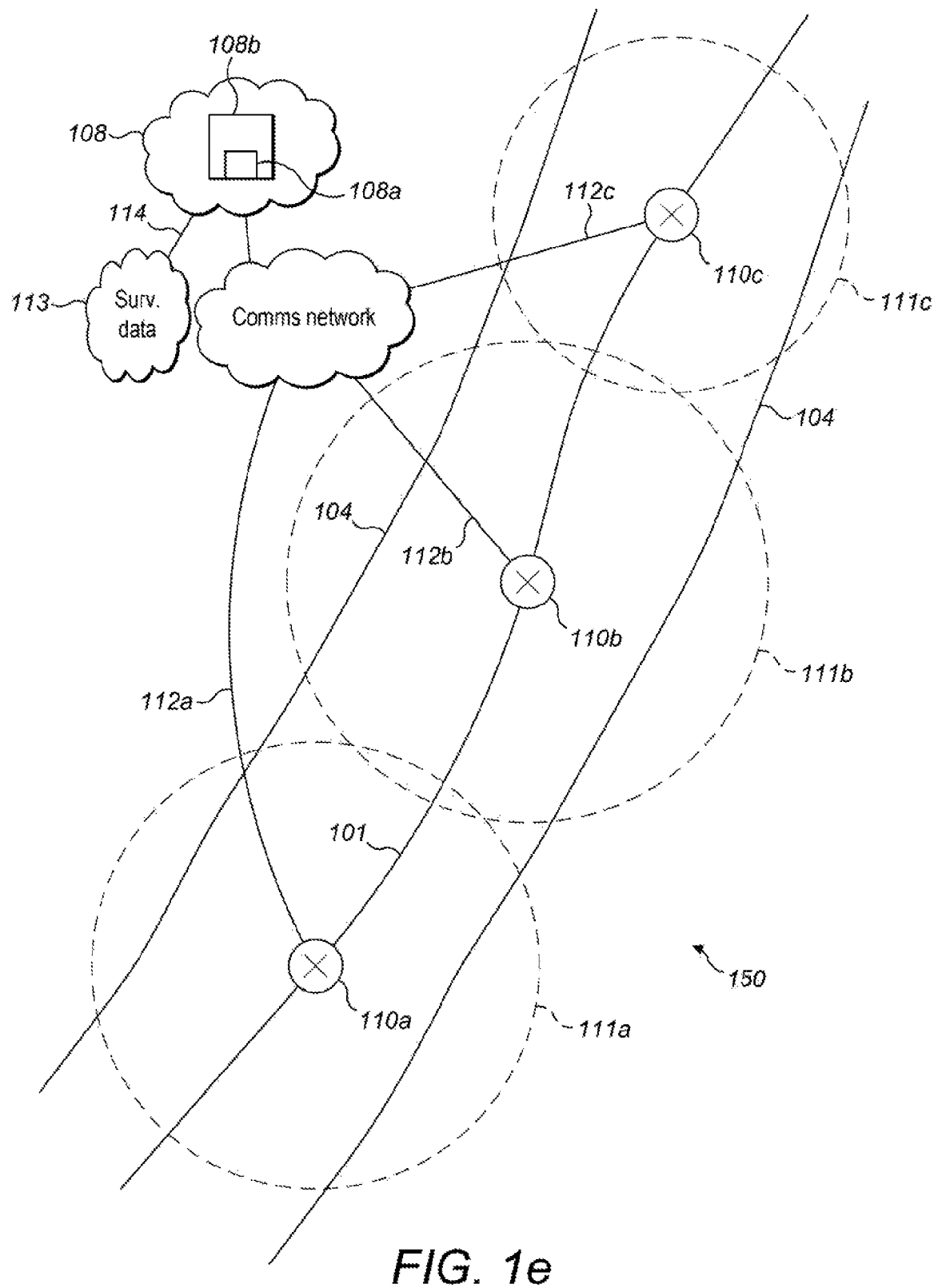
FIG. 1e is a schematic diagram illustrating a further example aircraft superhighway system according to some embodiments of the invention.

FIG. 1e is a schematic diagram illustrating another example aircraft superhighway system 150 (e.g. aircraft detection and superhighway transit system) based on aircraft superhighway system 100 or 140 as described with reference to FIGS. 1a-1d. In this example the aircraft superhighway system 100 or 140 is further modified to only use spaced apart superhighway nodes 110a-110c, each of the superhighway nodes 110a-110c includes aircraft surveillance node/functionality for surveilling/detecting aircraft within a surveillance coverage area 111a-111c, respectively. The spaced apart superhighway nodes 110a-110c are positioned such that their surveillance coverage areas 111a-111c overlap with at least one adjacent superhighway node 110a-110c. For example, surveillance coverage area 111a hosted by superhighway node 110a overlaps with surveillance coverage area 111b, surveillance coverage area 111c hosted by superhighway node 110c overlaps with surveillance coverage area 111b and so on. Each of the superhighway nodes 110a-110c are connected to communications network 106 via communication links 112a-112c, respectively. Thus, the volume of airspace defined by a coverage area based on the overlapping surveillance coverage areas 111a-111c of the superhighway nodes 110a-110c (with surveillance node/functionality) forms an aircraft superhighway 104 or air corridor 104. The superhighway 104 is formed using the plurality of spaced apart superhighway nodes 110a-110c (e.g. aircraft surveillance stations or towers), spaced apart along or alongside a path or route 101.

As described with reference to FIGS. 1a-1d, in FIG. 1e the communication links 112a-112c may be used to relay any aircraft surveillance data from superhighway nodes 110a-110c to the superhighway flight controller 108a (also called superhighway controller). As an option, surveillance data from the superhighway nodes 110a-110c may be collected via communication network in a cloud-based surveillance data storage 113, which the superhighway controller 108a and/or flight management system 108b may retrieve via communication channels 114 and the like. As described herein the aircraft superhighway system 150 is configured to using cloud based superhighway service 108 including superhighway controller 108a and/or flight management system 108b, without limitation, for example authorise, control and/or monitor one or more aircraft such as, without limitation, for example UAVs and/or a plurality of UAVs permitted to traverse the aircraft superhighway route 101 through the superhighway 104 described by the volume of airspace defined by the overlapping surveillance coverage areas 111a-111c of the plurality of superhighway nodes 110a-110c. For example, the superhighway controller 108a receives the aircraft surveillance data from surveillance cloud storage 113 and/or directly from superhighway nodes 110a-110c, which includes data representative of UAV locations of a UAVs using superhighway 104 and/or entering airspace of superhighway 104 and appropriate action will be relayed by the superhighway controller 108a and/or flight management system 108b to any UAV/drone that is registered and authorised to use superhighway 104 via one or more other communication network(s) such as, without limitation, for example cellular and/or satellite communication networks or long-range radio networks and the like. Additionally or alternatively, one or more of the superhighway nodes 110a-110c may further include wireless communication functionality and be used in a similar fashion as a superhighway node 102a as described with reference to FIGS. 1a-1d and/or as described herein. Such a superhighway node 110a with communications functionality may also be used to forward appropriate action will be relayed by the superhighway controller 108a and/or flight management system 108b to any UAV/drone that is registered and authorised to use superhighway 104 and within the wireless communication coverage area of said superhighway node 110a and the like.

Figure 1F:
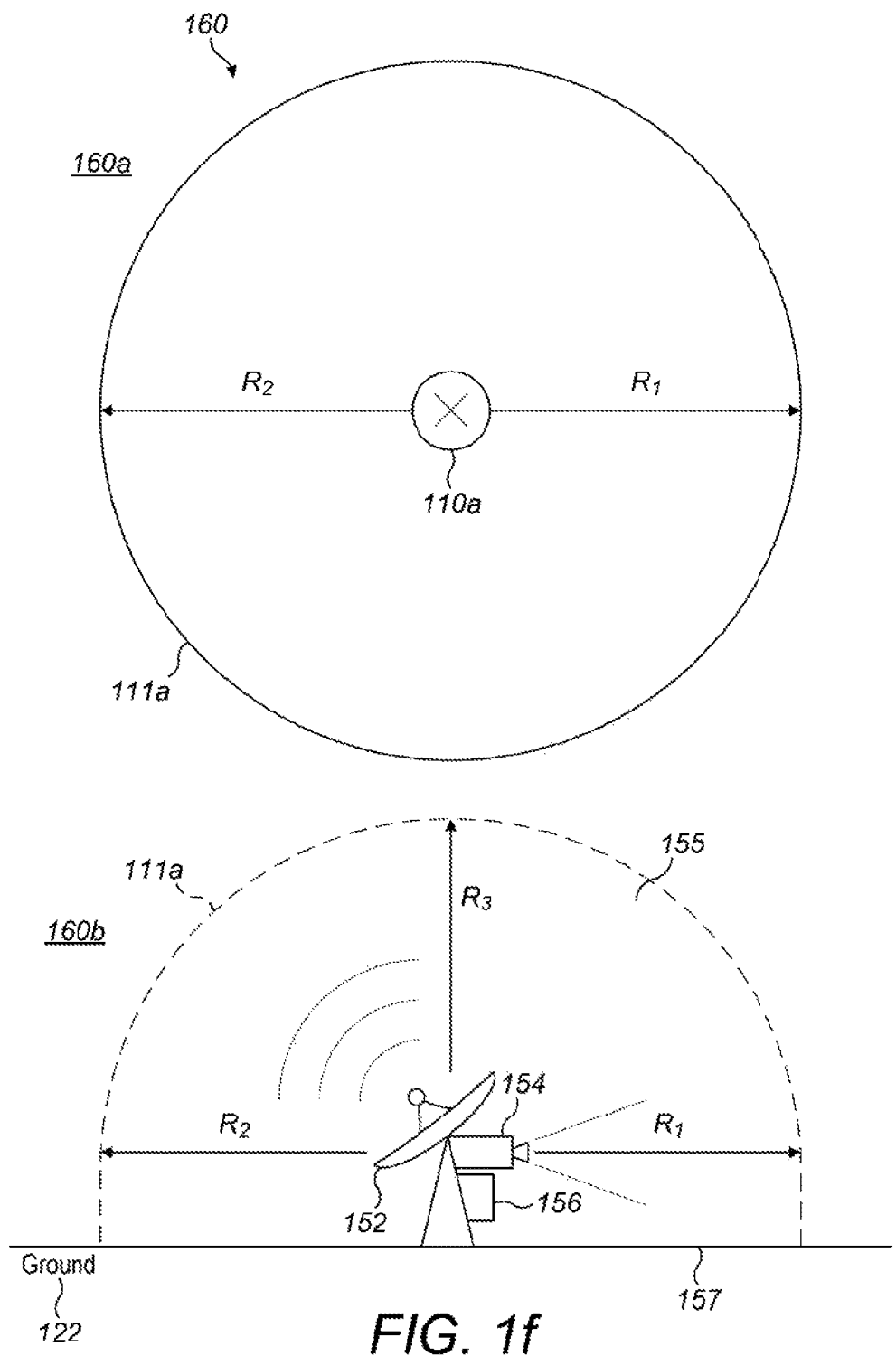
FIG. 1f is a schematic diagram illustrating an example UAV/Drone Zone based on a surveillance superhighway node for use with the example aircraft superhighway systems of FIGS. 1a, 1d and/or 1e according to some embodiments of the invention.

FIG. 1f is a schematic diagram illustrating another example UAV/Drone spot 160 using aircraft surveillance technology for use in the aircraft superhighway systems 100, 140, 150 as described with reference to FIGS. 1a to 1e, modifications thereto and the like. FIG. 1f illustrates a plan elevation 160*a* of an example superhighway node 110*a* and a side elevation 160*b* of the superhighway node 110*a*. As described with reference to FIGS. 1*a*-1*e*, the aircraft superhighway systems 100, 140, 150 may be used, via the superhighway nodes 102*a*-102*n* and/or 110*a*-110*c*, to effectively create 'UAV/Drone Spots or 'UAV/Drone Superhighways/UAV/Drone Zones' depending on how many are configured in a particular physical location and/or over a geographic area. In this example, the superhighway node 110*a* in the plan elevation 160*a* is illustrated as having surveillance node/functionality with, without limitation, for example an aircraft radar system 152, camera surveillance system 154, and/or any other sensor suite and/or system suitable for detecting and/or monitoring aircraft in an airspace and the like. The surveillance node/functionality may combine to provide a surveillance coverage area 111*a* defined, without limitation, for example by radius in x-y plane by R1 and/or R2 and/or in the z-plane or by height R3 and the like. The radii R1, R2, R3 and the like may be based on a distance from the superhighway node 110*a* in which the corresponding surveillance system cannot reliably detect and/or monitor aircraft in the airspace surrounding superhighway node 110*a*. In this example, in the side elevation 160*b* the area of surveillance coverage 111*a* of superhighway node 110*a* forms essentially or substantially a hemispherically shaped volume of airspace 155*a* with a radii R1, R2, R3 with the flat side 157 of the hemispherical shaped volume of airspace 155*a* level with the ground 122 on which the superhighway node 110*a* is located or positioned. The superhighway node 110*a* may be located within the area of surveillance coverage 111*a*/155*a* in the vicinity of the flat side 157 of the hemispherical shaped volume of airspace 155*a*. The volume of airspace 155*a* that covers each surveillance coverage area 111*a* of a superhighway node 110*a* also forms a UAV/Drone Spot 160/115*a* for use in constructing/implementing the superhighway 104 and/or aircraft superhighway system 100, 140, 150 and the like. Although the volume of airspace 155*a* is described as being a hemispherical shaped volume of airspace, this is for simplicity and by way of example only and the invention is not so limited, it is to be appreciated by the skilled person that the volume of airspace 155*a* may be any volumetric shape such as, without limitation, for example cylindrical, cuboid and/or any other volume of airspace defined by the range, beam pattern, viewing range and/or focus and the like of the surveillance system/node/functionality (e.g. radar or camera surveillance systems) used by the superhighway node 110*a* to provide a surveillance coverage area 111*a* that may be designated as a UAV/Drone Spot 155*a* (or aircraft spot or superhighway node zone spot) and the like.

Figure 2A:
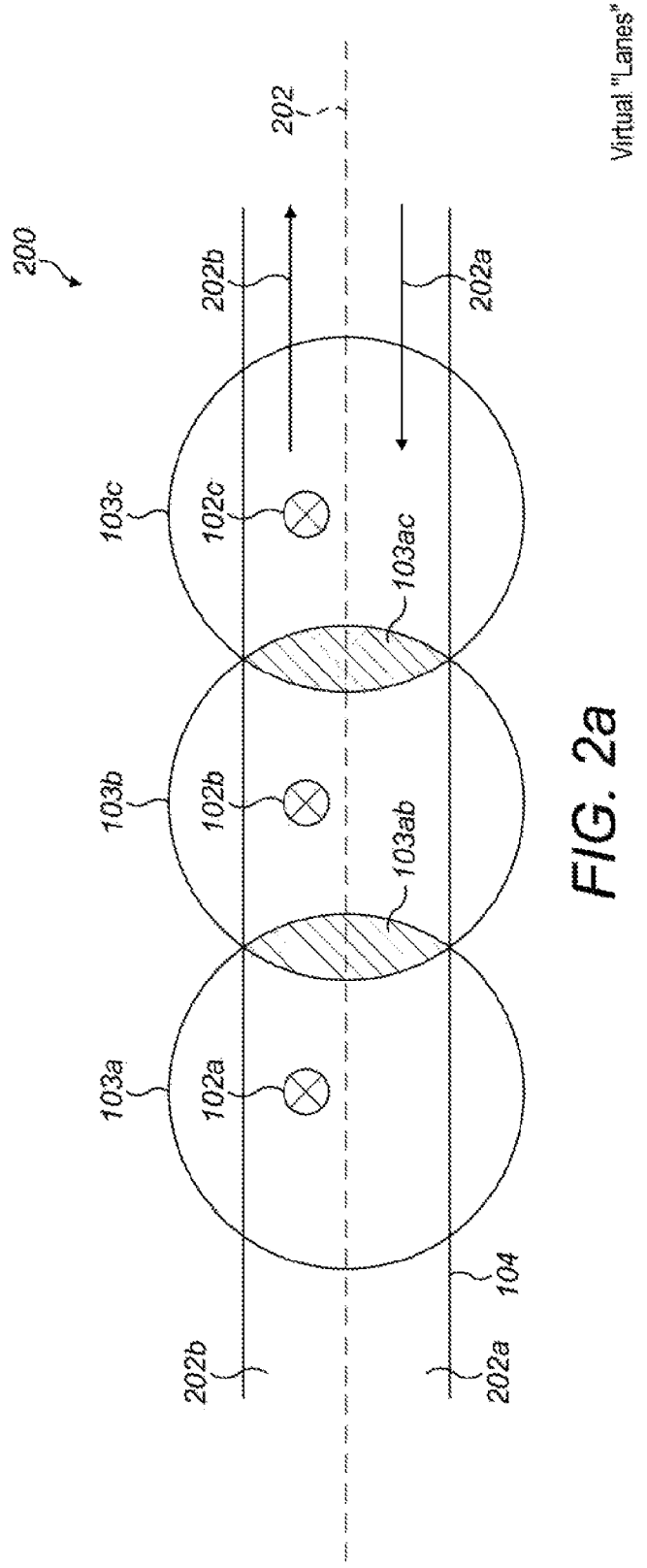
FIG. 2a is a schematic diagram illustrating an example horizontal flight lane arrangement for use with the example aircraft superhighway system of FIG. 1a according to some embodiments of the invention.

FIG. 2*a* is a schematic diagram illustrating an example horizontal flight lane arrangement 200 for use with aircraft superhighway systems 100, 140, or 150 according to the invention, and/or as described with reference to FIGS. 1*a*-1*f* and/or as herein described. In this example, a plurality of superhighway nodes 102*a*-102*c* with overlapping areas of communication coverage 103*a*-103*c* that each define the airspace of UAV/Drone Spots 105*a*-105*c* forms a superhighway 104. The superhighway controller 108*a* has used a horizontal dividing line 202 to horizontally partition the superhighway 104 into two separate horizontal flight lanes 202*a* and 202*b*. The UAVs/drones flying in the first flight lane 202*a* move in a first direction of travel entering UAV/Drone Spot 105*c* and travelling towards UAV/Drone Spots 105*b* then 105*a*. The UAVs/drones flying in the second flight lane 202*b* move in a second direction of travel that is opposite the first direction of travel entering UAV/Drone Spot 105*a* and travelling towards UAV/Drone Spots 105*b* then 105*c* and so on.

Figure 2B:
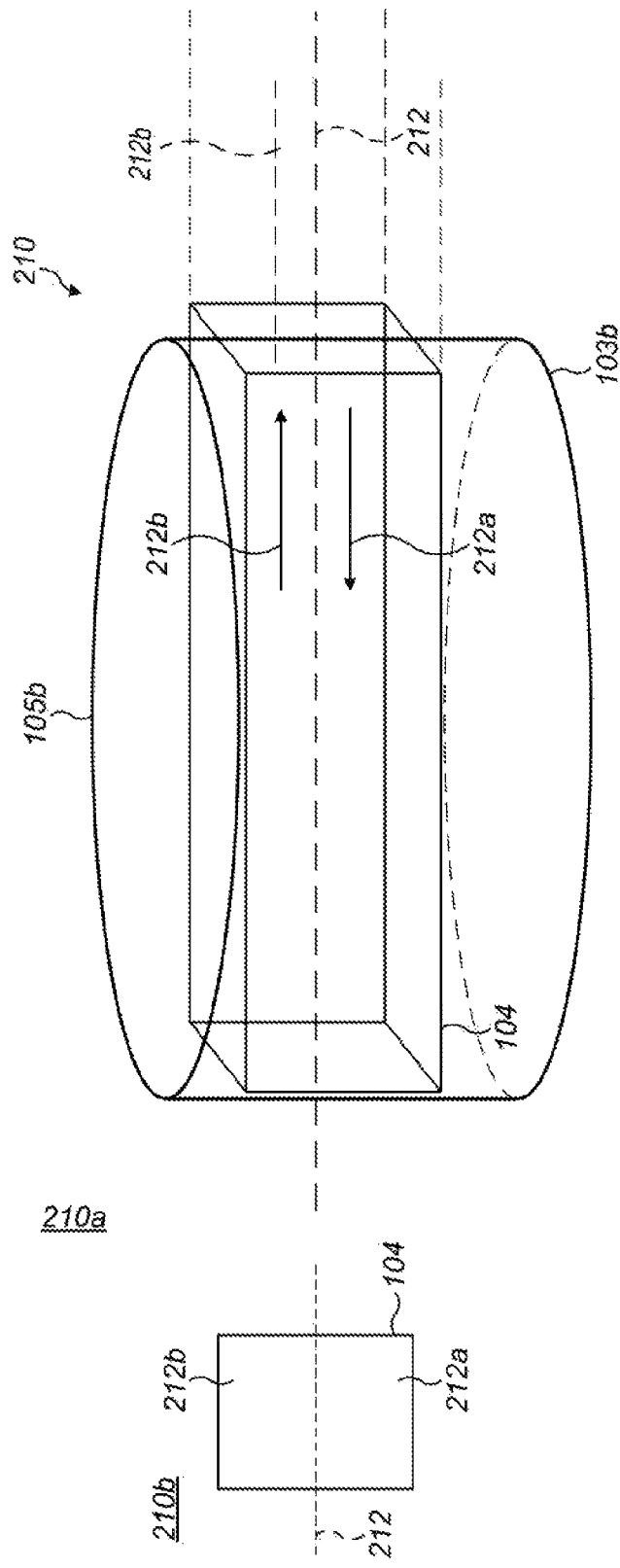
FIG. 2b is a schematic diagram illustrating an example vertical flight lane arrangement for use with the example aircraft superhighway system of FIG. 1a according to some embodiments of the invention.

FIG. 2*b* is a schematic diagram illustrating another example vertical flight lane arrangement 210 for use with aircraft superhighway systems 100, 140 and/or 150 according to the invention, and/or as described with reference to FIGS. 1*a*-1*f* and/or as herein described. A perspective view 210*a* and a plan view 210*b* of the vertical flight lane arrangement 210 are illustrated. In this example, an UAV/Drone Spot 105*b* forming part of superhighway 104 is divided into vertical flight lanes in which a first flight lane 212*a* operates with air traffic travelling in a particular direction at a first range of altitudes and a second flight lane 212*b* operates with air traffic travelling in another direction at a second range of altitudes, where the first and second range of altitudes are mutually exclusive, i.e. they do not intersect. The superhighway controller 108*a* has used a vertical dividing line 212 to vertically partition the superhighway 104 into two separate vertical flight lanes 212*a* and 212*b*. The UAVs/drones flying in the first flight lane 212*a* move in a first direction of travel entering UAV/Drone Spot 105*b*, when facing the page, on the left side of UAV/Drone Spot 105*b* and travelling towards the right side of the UAV/Drone Spot 105*b*. The UAVs/drones flying in the second flight lane 212*b* move in a second direction of travel that is opposite the first direction of travel entering UAV/Drone Spot 105*b* on the, when looking into the page, right side of UAV/Drone Spot 105*b* and travelling towards the left side of UAV/Drone Spot 105*b*.

Figure 2C:
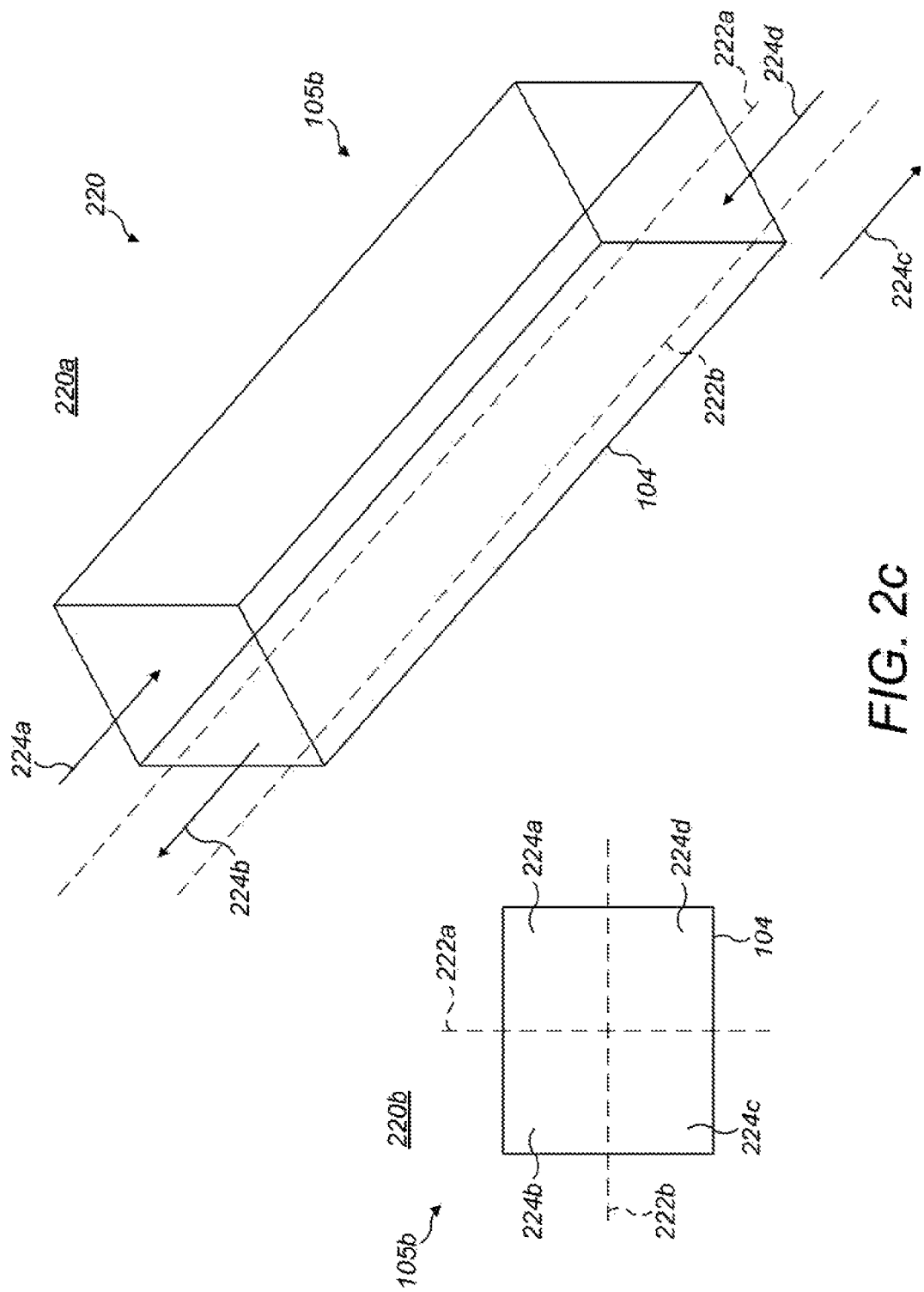
FIG. 2c is a schematic diagram illustrating an example horizontal/vertical flight lane arrangement for use with the example aircraft superhighway system of FIG. 1a according to some embodiments of the invention.

FIG. 2*c* is a schematic diagram illustrating another example horizontal/vertical flight lane arrangement 220 for use with aircraft superhighway system 100, 140, 150 according to the invention, and/or as described with reference to FIGS. 1*a*-1*f* and/or as herein described. A perspective view 220*a* and a plan view 220*b* of the horizontal/vertical flight lane arrangement 220 are illustrated. In this example, an UAV/Drone Spot 105*b* forming part of superhighway 104 is divided using a first partition 222*a* and a second partition 222*b* (orthogonal to the first partition 222*a*) into two pairs of horizontal flight lanes 224*a*-221*b* and 224*c* and 224*d*, in which the first pair of horizontal flight lanes 224*a*-224*b* are vertically separated from the second pair of horizontal flight lanes 224*c*-224*d*. The directions of travel of the air traffic on each pair of horizontal flight lanes 224*a*-224*b* and 224*c*-224*d* may be in different and opposite directions as the application demands.

Figure 3A:
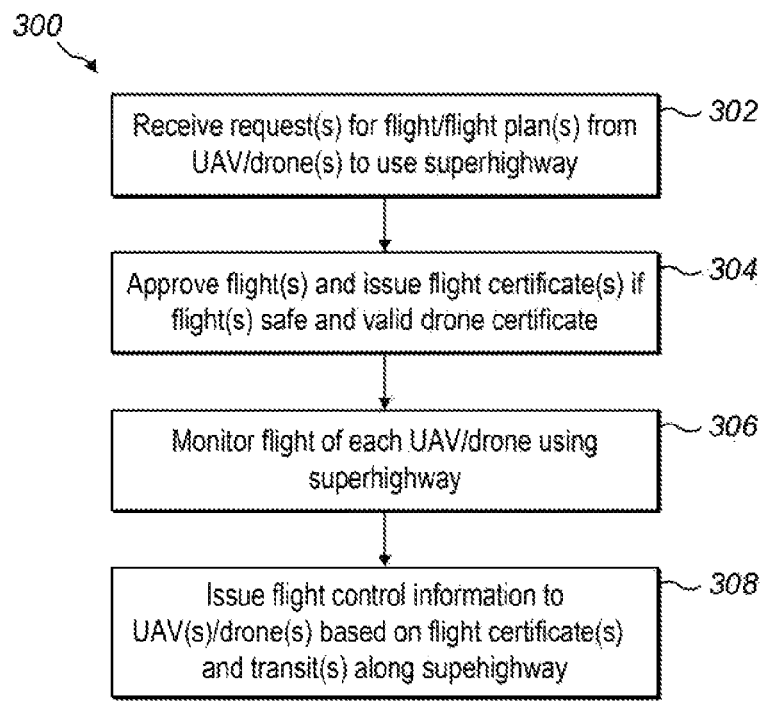
FIG. 3a is a flow diagram illustrating an example superhighway controller process for use with the example aircraft superhighway system of FIG. 1a according to some embodiments of the invention.

FIG. 3*a* is a flow diagram illustrating an example superhighway controller process 300 according to the invention for use with systems 100, 140 and/or 150 as described with reference to FIGS. 1*a*-1*f* and/or as herein described. For simplicity, reference numerals of FIGS. 1*a* to 1*f* may be reused for similar or the same components. In this example, the operator of a drone/UAV and/or a drone/UAV wishes to operate or fly in controlled airspace of the superhighway 104. The superhighway controller process 300 may include one or more of the following steps of:

In step 302, receiving request(s) for flight(s) from UAV(s)/Drone(s). For each received request for flights of a flight plan/pre-flight plan using said superhighway 104 by a UAV/drone and/or UAV/drone operator, the superhighway controller 108*a* may issue digital certificates for each (i) UAV/drone and (ii) individual flight carried out by a UAV/drone. A flight certificate will not be issued without a valid drone certificate, so the superhighway controller process 300 may check whether a valid drone/UAV certificate exists in relation to the request. A valid drone certificate will not be issued unless the superhighway controller 108a is assured that the customer's login credentials are valid, they have met the necessary pre-requisites and paid any appropriate fees. Drone/UAV certificates are valid only for a maximum period as defined by the superhighway service and/or superhighway controller 108a. The UAV/drone or UAV/drone operator may file a pre-flight plan with the request, and so the superhighway controller 108a may be configured to provide either authorisation or a rejection based on information held within the network and/or flight management system 108b on whether or not the flight and/or operation of the UAV/drone appears to be safe. This authorisation/rejection is by way of issuing a valid flight certificate to the UAV/drone (i.e. one is only issued if the flight is valid). The flight certificates can be configured to be valid for transit only between specific superhighway nodes, or specific set of consecutive superhighway nodes defining a route for instance according to the flight plan/flight, and not for other superhighway nodes that are not on the approved route of the flight plan/flight. Additionally and/or alternatively, step 302 may be performed concurrently with one or more of the other steps 304-308 as requests for flights using the aircraft superhighway 104 may be received at any time. Alternatively or additionally, these requests could be buffered such that other steps 304-308 may be performed accordingly as and when appropriate.

In step 304, the superhighway controller process 300 may approve the flight(s) requested by determining, for each UAV/drone, said each UAV/drone has a valid drone certificate and that the requested flight and use of the superhighway 104 is safe for the UAV/drone, so may issue the UAV/Drone with a flight certificate associated with the requested flight or flight plan using the superhighway 104. The issued flight certificate may be valid only for the duration of the planned flight, plus a buffer at the start and end. Additionally and/or alternatively, again, step 304 may be performed concurrently with one or more of the other steps 302 and/or 306-308 as approval of flights using the aircraft superhighway 104 may be received at any time. Alternatively or additionally, the determination and approval in relation to the requests of step 302 could also be buffered such that other steps 302, 306-308 may be performed accordingly as and when appropriate.

In step 306, monitoring the flight of each UAV/drone using the superhighway 104. This may be achieved by receiving, without limitation, for example data representative of positional information, velocity, speed, heading, attitude, altitude, location and the like reported by each of the UAVs/drones via the corresponding superhighway nodes that host UAV/Drone Spots through which the UAV/drone is transiting and/or flying through. Additionally and/or alternatively, this may be achieved by receiving UAV data, without limitation, for example data representative of positional information, velocity, speed, heading, attitude, altitude, location and the like sensed and/or detected by corresponding equipment/hardware of the superhighway node and reported by the superhighway node to the superhighway controller 108a. The monitoring may also include performing analysis on the compliance of each UAV/drone using the superhighway 104, analysis on any potential conflicts between each UAV/drone and other UAVs/drones using the superhighway 104 and/or one or more other aircraft, unmanned aircraft external to the superhighway 104 and the like. During a flight, each UAV's location will be (i) monitored remotely, using both the surveillance systems on the superhighway node(s) and the UAV's own reported position, and (ii) the airspace/sky surrounding the UAV/drone and out to the operational limit of the superhighway nodes will be monitored for other airspace users, including other UAVs, that are either expected or unexpected. The UAV location information and other airspace users and the like are relayed by the superhighway nodes to the superhighway controller 108a, which processes this data or sends this data for processing by flight management system 108b, and appropriate action may be relayed by the superhighway controller 108a to any UAV/drone that is under the supervision/influence of the superhighway node.

Additionally and/or alternatively, again, step 306 may be performed concurrently with one or more of the other steps 302-304 and/or 308 as monitoring/analysis of UAV/drones using the aircraft superhighway 104 may be required to be performed in real-time. Alternatively or additionally, the monitoring/analysis in relation to the UAVs/drones using the superhighway 104 may be buffered and processed in batches at such a frequency to seem like real-time monitoring and/or analysis of the UAVs/drones and the like, and such that other steps 302-304, and/or 308 may be performed accordingly as and when appropriate. Additionally or alternatively, the monitoring/analysis may be outsourced and/or sent to another system or cloud-based system such as, without limitation, for example flight management system 108b, which may be configured to be performed concurrently to the process 300 of the superhighway controller 108a. In which case, monitoring may simply be sending any received UAV data to the flight management system 108b for analysis, conflict detection, conflict resolution, collision avoidance and resolutions, commands/instructions for avoiding conflicts/collisions and the like.

In step 308, based on the analysis/monitoring of the UAV/drones using the superhighway 104, the process 300 may receive flight control information for one or more UAVs/drones using the superhighway 104, the flight control information including, without limitation, data representative of instructions, commands, actions that corresponding UAV/drone should take for complying with the operation of the superhighway 104. In step 308, issuing said flight control information to each corresponding UAV/drone using said superhighway 104 based on the flight certificates and transit(s) along the superhighway 104. Additionally and/or alternatively, step 308 may be performed concurrently with one or more of the other steps 302-306 as flight control information may be received and required to be actioned by UAV/drones using the aircraft superhighway 104 in real-time. Alternatively or additionally, these requests could be buffered such that other steps 302-306 may be performed accordingly as and when appropriate, and a batch of received instructions/flight command data may be issued at such a frequency or manner that step 308 may be performed in a seeming real-time fashion and the like as the application demands.

Figure 3B:
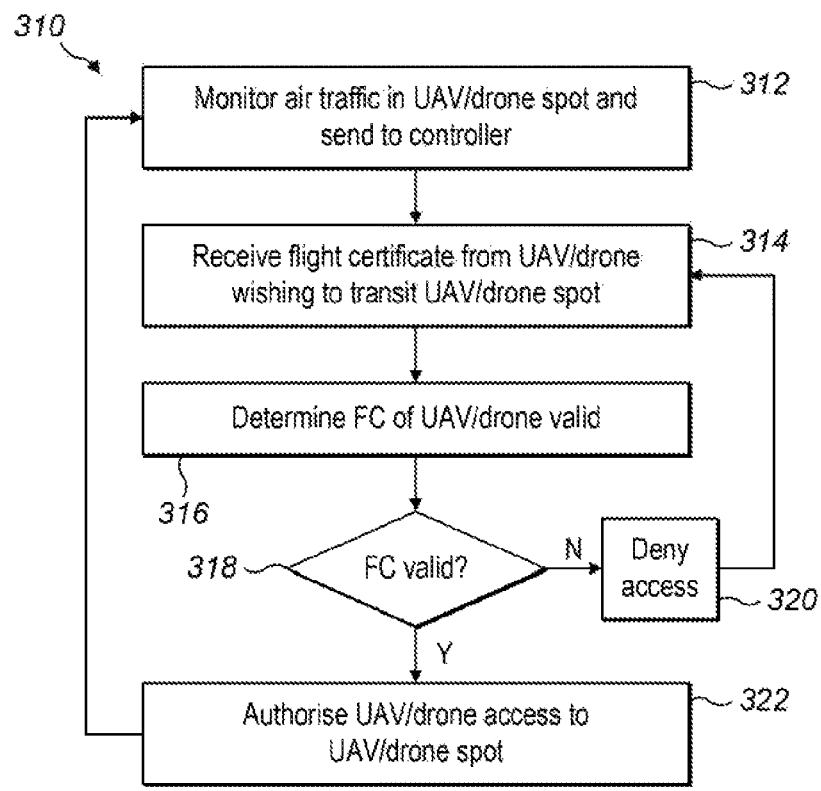
FIG. 3b is a flow diagram illustrating an example superhighway node process for use with the example aircraft superhighway system of FIG. 1a according to some embodiments of the invention.

FIG. 3b flow diagram illustrating an example superhighway node process 310 for operating a superhighway node in the aircraft superhighway system 100, 140, 150 according to the invention, and/or for use with systems 100, 140 and/or 150 as described with reference to FIGS. 1a-1f and/or as herein described. The superhighway node process 310, performed by a superhighway node of the aircraft superhighway system 100, may include the following steps of: In step 312, monitoring air traffic in UAV/Drone Spot and sending any UAV traffic data to superhighway controller 108a. The UAV traffic data may include, without limitation, for example, data representative of UAV positional data, locations, speed, velocity, heading, attitude of UAV and the like. The UAV traffic data may be detected using sensors and the like on the superhighway node, and/or received from UAV's reporting their positional information and other UAV data to the superhighway node. The monitoring step 312 may be looped and performed continuously and/or concurrently along with the following steps 314-322 of superhighway node process 310.

In step 314, receiving data representative of a flight certificate from a UAV/Drone requesting or wishing to gain access and transit UAV/Drone Spot hosted by the superhighway node. As a UAV/drone passes from one UAV/drone Spot 105a hosted by a superhighway node 102a to an adjacent UAV/drone Spot 105b hosted by an adjacent superhighway node 102b, the UAV/drone 'associates' itself with the next superhighway node 102b. This association step includes a digital 'handshake', which requires that the drone and/or flight certificates are valid for the flight, where transit through the next UAV/drone Spot 105b is denied if the certificate is invalid.

In step 316, determining whether the flight certificate of the UAV/drone is valid. This may be achieved by the superhighway node sending data representative of the UAV/drone request to gain access for transiting the UAV/Drone Spot hosted by the superhighway node and/or the and/or received flight certificate to the superhighway controller 108a, which may then authorise and/or deny access based on the validity of the flight certificate, validity of the UAV/drone certificate, positional information associated with the UAV/drone and whether the UAV/drone is complying with the approved flight plan/flight in accordance with the flight certificate. In step 318, receiving a response to determining whether the flight certificate of the UAV/drone is valid. If the flight certificate of the UAV/drone is valid (e.g. Y), then proceeding to strep 322, otherwise, if not valid (e.g. N), proceeding to step 320.

In step 320, the superhighway node issues or sends a response to the UAV/drone denying access to the UAV/Drone Spot hosted by the superhighway node. The operator of the UAV/drone may have to end the flight and/or request a renewal, and/or a further flight certificate/drone certificate from the superhighway controller 108a in order to continue legitimately using the superhighway 104 and continuing the flight.

In step 322, the superhighway node issues or sends a response to the UAV/drone authorising the UAV/drone may gain access and transit the UAV/Drone Spot hosted by the superhighway node. Thus, the UAV/drone may continue on its flight and transit the UAV/Drone Spot before entering the next adjacent UAV/Drone Spot hosted by the adjacent superhighway node, where it may provide its flight certificate and request access for transiting the adjacent UAV Drone Spot and the like.

Figure 3C:
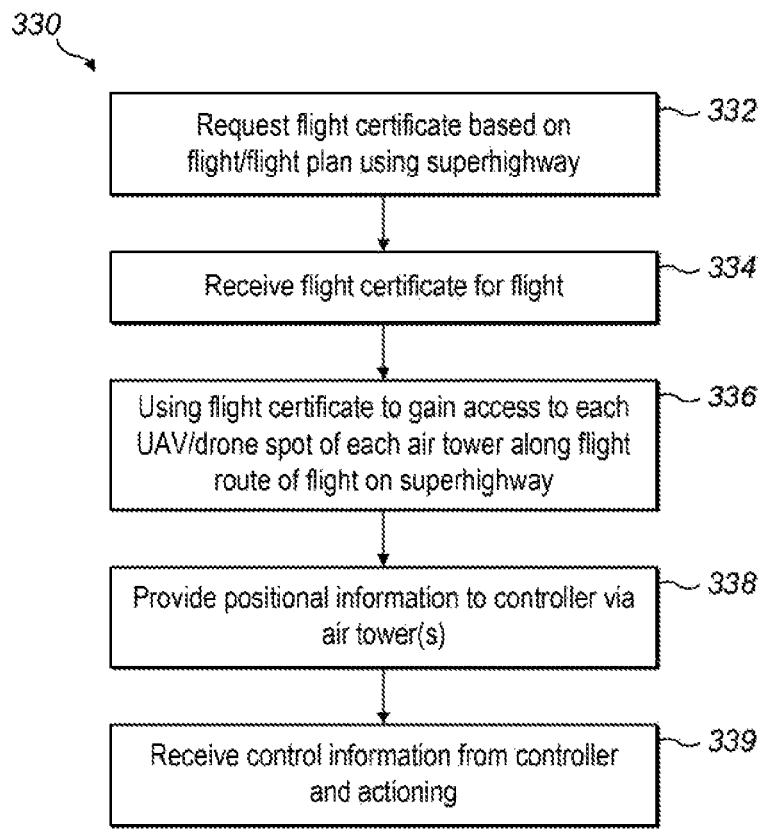
FIG. 3c is a flow diagram illustrating an example UAV/drone process for use with the example aircraft superhighway system(s) of FIGS. 1a to 1e according to some embodiments of the invention.

FIG. 3c flow diagram illustrating an example a superhighway UAV/drone process 330 for operating a UAV/drone in the aircraft superhighway systems 100, 140, 150 according to the invention, and/or for use with systems 100, 140 and/or 150 as described with reference to FIGS. 1a-1f and/or as herein described. The superhighway UAV/drone process 330, performed by a UAV/drone, may include the following steps of: In step 332, sending data representative of an access request for a flight certificate based on a flight or flight plan using superhighway 104 of the aircraft superhighway system 100. In order to use the superhighway 104, the UAV/drone should file a pre-flight plan with the superhighway controller 108a, where the superhighway controller 108a provides either authorization or a rejection based on information held within the network on whether or not the flight/operation requested appears to be safe. This authorisation is provided by way of a validly issued flight certificate (i.e. one is only issued if the flight is valid).

In step 334, receiving a flight certificate for the flight and/or flight plan. In step 336, using the flight certificate to gain access to each UAV/Drone Spot 105b hosted by each superhighway node 102b along the flight route of the UAV/drone's flight or flight plan using the superhighway 104.

In step 338, during flight of the UAV/drone using superhighway 104, providing data representative of positional information of said UAV/drone to the superhighway node 102b associated with the UAV/Drone Spot 105b the UAV/drone has gained access to and is transiting to a superhighway controller 108a controlling access to and operations of the aircraft superhighway 104. The UAV/drone must provide, without limitation, for example at least its own position data to the superhighway controller 108a via the superhighway node hosting the UAV/drone Spot hosted by said superhighway node. As an example, the UAV/drone may be capable of doing so either (i) via a ground station relay, proprietary to the manufacturer, (ii) via the Wi-Fi hardware on board a tower, requiring the UAV to have a simple Wi-Fi chip, or (iii) via cellular and/or satellite communications and the like. During the flight, the UAV's location will be (i) monitored remotely, using both the surveillance systems on the superhighway node hosting the UAV/drone Spot the UAV is transiting and the UAV's own reported position information and/or other flight data, and (ii) the airspace/sky surrounding the UAV/drone and out to the operational limit of the superhighway nodes may be monitored for other airspace users, including other UAVs, that are either expected or unexpected. Appropriate action will be relayed, see step 339, by the superhighway controller 108a to any UAV/drone that is under the supervision of an arrow tower and/or the superhighway controller 108a.

In step 339, during flight of the UAV/drone through an UAV/Drone Spot 105b, receiving data representative of instructions or commands from the corresponding superhighway node 102b, the instructions or commands issued by the superhighway controller 108a for relay by the superhighway node 102b in relation to the UAV/drone using the superhighway 104 and/or the positional information previously sent by the UAV/drone, and actioning the instructions and/or commands accordingly. For example, as a UAV/drone passes from one UAV/drone Spot 105a hosted by an superhighway node 102a to an adjacent UAV/drone Spot 105b hosted by an adjacent superhighway node 102b, the UAV/drone 'associates' itself with the next superhighway node 102b. This association step includes a digital 'handshake', which requires that the drone and/or flight certificates of the UAV/drone are valid for the flight, where the superhighway controller 108a may deny transit through the next UAV/drone Spot 105b if the certificate is invalid. Thus, the UAV/drone needs to action this by requesting another flight certificate/drone certificate and the like, i.e. the process 330 may proceed to step 332.

Figure 3D:
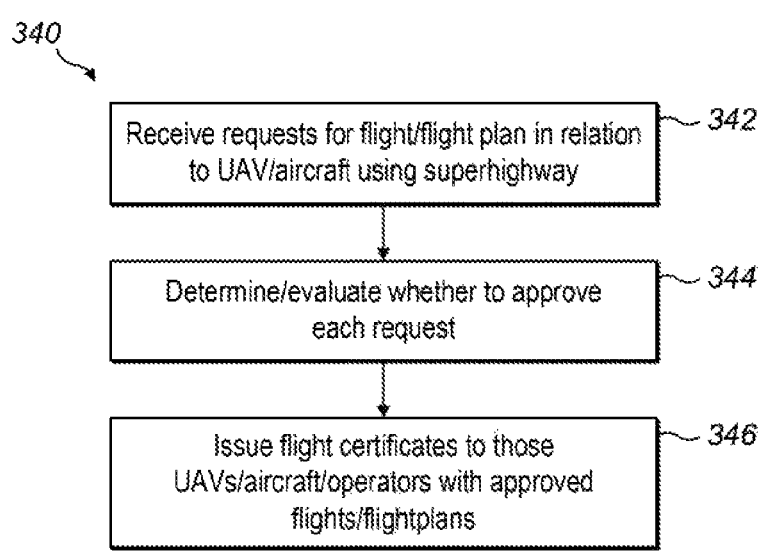
FIG. 3d is a flow diagram illustrating an example superhighway controller process for use with any of the example aircraft superhighway system(s), apparatus and/or process(es) of any of FIGS. 1a to 5 according to some embodiments of the invention.

FIG. 3d is a flow diagram illustrating an example superhighway controller process 340 according to the invention for use with systems 100, 140 and/or 150 and/or process(es) as described with reference to FIGS. 1a-3c and/or as herein described. In this example, the operator of a drone/UAV and/or a drone/UAV wishes to operate or fly in controlled airspace of the superhighway 104. The superhighway controller process 340 may include one or more of the following steps of: In step 342, receiving one or more requests for flights or flight plans of aircraft using the aircraft superhighway. In step 344, determining/evaluating whether the flights or flight plans of said aircraft should be approved. For example, this may involve, approving those flights or flight plans by using a flight check or evaluation process of the requested flight or flight plans for a desired route based on verifying the flight plan and evaluating flight conditions and route associated with weather forecast and other authorised flight plans/routes of other aircraft. Additionally or alternatively, step 344 may include receiving approval for those flights or flight plans from a flight management system configured to perform a flight check or evaluation process of the requested flight or flight plans over the desired route based on: verifying the flight plan; evaluating the flight or flight plans in relation to one or more from the group of: flight conditions; any flight conflicts with other aircraft and/or flight plans/routes of other aircraft; weather forecasts and other authorised or approved flight plans/routes of other aircraft.

In step 346, issuing flight certificates to those aircraft/UAVs/operators with approved flights/flight plans for using the aircraft superhighway. Each flight certificate may be digitally signed. As an option, the flight certificates may be sent via the superhighway node that hosts a coverage area in which the aircraft may be about to transit. As another option, the flight certificates may be sent via the superhighway node that hosts a coverage area in which the aircraft may be about to transit. As a further option, the flight certificates may be sent to the operator of the aircraft via a communication network and/or operator control station and the like. The flight certificates may be sent via a communication network to the aircraft prior to the flight.

Figure 3E:
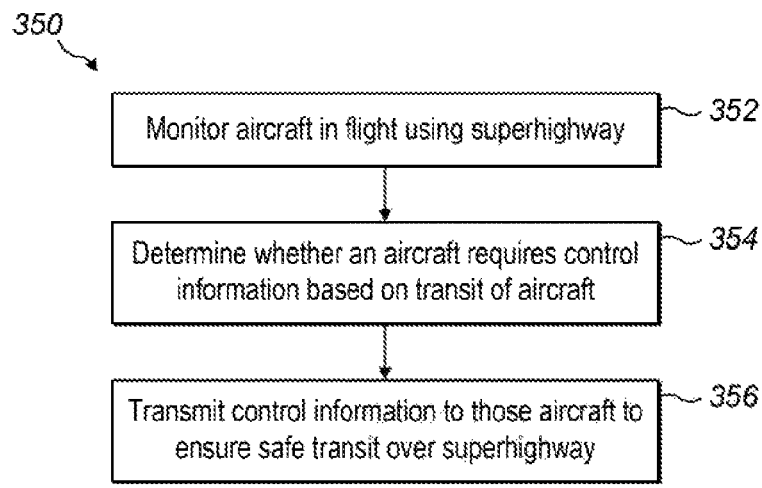
FIG. 3e is a flow diagram illustrating another example superhighway controller process for use with any of the example aircraft superhighway system(s), apparatus and/or process(es) of any of FIGS. 1a to 5 according to some embodiments of the invention.

FIG. 3*e* is a flow diagram illustrating another example superhighway controller process 350 according to the invention for use with systems 100, 140 and/or 150 and/or process(es) as described with reference to FIGS. 1*a*-3*d* and/or as herein described. In this example, the operator of a drone/UAV and/or a drone/UAV wishes to operate or fly in controlled airspace of the superhighway 104. The superhighway controller process 350 may include one or more of the following steps of: In step 352, monitoring aircraft in-flight using the airspace of the aircraft superhighway. For example, this may include monitoring aircraft in-flight within the airspace of the aircraft superhighway, airspace of the coverage area of corresponding superhighway nodes, or an airspace superhighway zone spot of corresponding superhighway nodes. In step 354, determining and/or receiving whether aircraft requires control information associated with the transit of one or more aircraft based on said monitoring.

In step 356, transmitting control information to said one or more aircraft via said superhighway nodes using the airspace of the aircraft superhighway to ensure safe transit of air traffic within airspace of the aircraft superhighway. This may further include transmitting control information to said one or more aircraft and/or one or more operators of said aircraft transiting the airspace of the aircraft superhighway to ensure safe transit of air traffic within airspace of the aircraft superhighway. Additionally or optionally, step 356 may further include transmitting flight information of at least air traffic within the aircraft superhighway on regular aviation frequencies to manned aircraft operating within the vicinity of the aircraft superhighway.

Figure 3F:
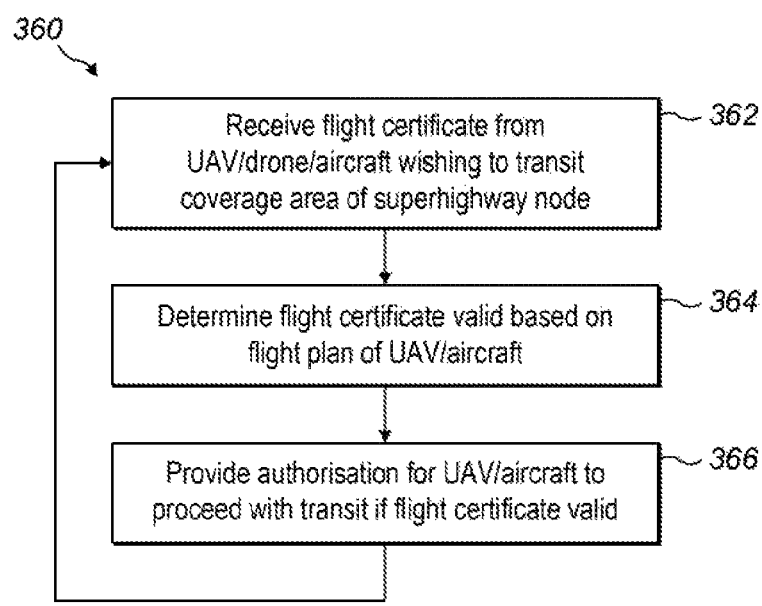
FIG. 3f is a flow diagram illustrating a further example superhighway controller process for use with any of the example aircraft superhighway system(s), apparatus and/or process(es) of any of FIGS. 1a to 5 according to some embodiments of the invention.

FIG. 3*f* is a flow diagram illustrating another example superhighway controller process 360 according to the invention for use with systems 100, 140 and/or 150 and/or process(es) as described with reference to FIGS. 1*a*-3*e* and/or as herein described. In this example, the operator of a drone/UAV and/or a drone/UAV wishes to operate or fly in controlled airspace of the superhighway 104. The superhighway controller process 360 may include one or more of the following steps of: In step 362, receiving data representative of one or more flight certificate(s) from corresponding one or more aircraft requesting to gain access and transit the airspace associated with a coverage area of a superhighway node. In step 364, determining whether the flight certificate(s) of the corresponding aircraft are valid in relation to transiting the airspace associated with the superhighway node. In step 366, providing authorisation for those aircraft with a valid flight certificate to access and transit the airspace defined by the coverage area of said each superhighway node. The process 360 may proceed to step 362 for further receipt of further flight certificates from aircraft.

Figure 3G:
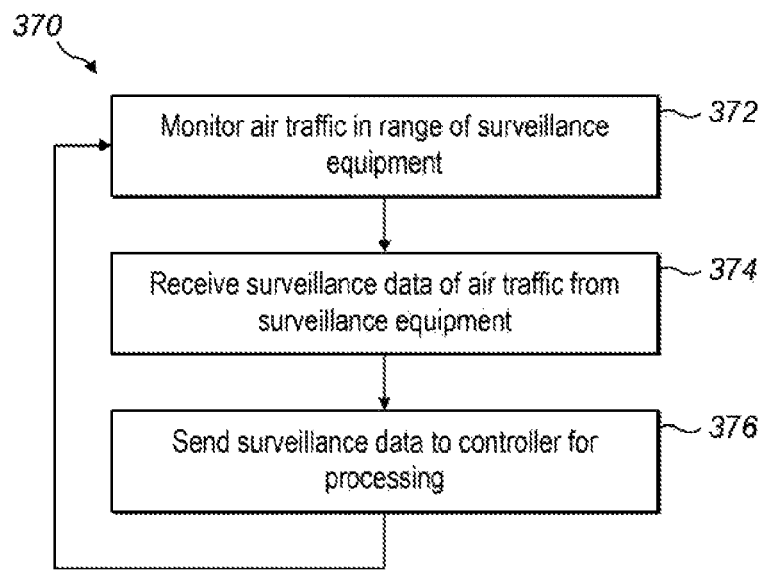
FIG. 3g is a flow diagram illustrating an example superhighway node process for use with any of the example aircraft superhighway system(s), apparatus and/or process(es) of any of FIGS. 1a to 5 according to some embodiments of the invention.

FIG. 3*g* is a flow diagram illustrating an example superhighway node process 370 for operating an superhighway node in the aircraft superhighway system 100, 140, 150 according to the invention, and/or for use with systems 100, 140 and/or 150 and/or process(es) as described with reference to FIGS. 1*a*-3*f* and/or as herein described. This process may be performed by a superhighway node with a surveillance node and a surveillance coverage area. The superhighway node process 370, performed by the superhighway node, may include the following steps of: In step 372, monitoring air traffic in range of the airspace defined by the area of surveillance coverage of said superhighway node. In step 374, receiving surveillance data of air traffic detected by surveillance functionality, equipment, systems of the superhighway node. In step 376, sending data representative of the monitored air traffic to the superhighway controller for processing. The data may include surveillance data of detected aircraft based on the type of surveillance system/functionality of the superhighway node.

Figure 3H:
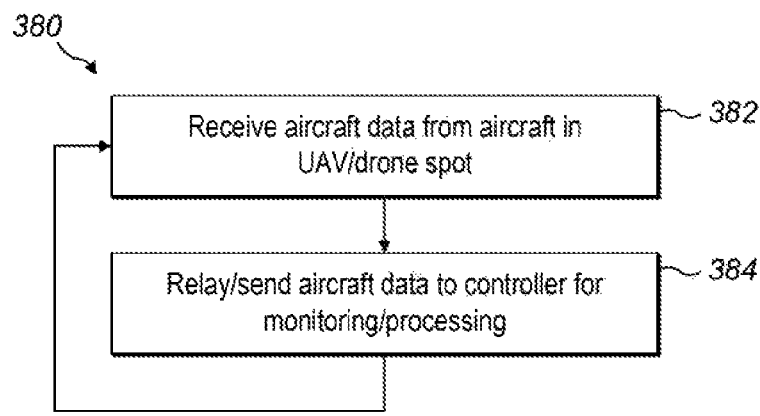
FIG. 3h is a flow diagram illustrating another example superhighway node process for use with any of the example aircraft superhighway system(s), apparatus and/or process(es) of any of FIGS. 1a to 5 according to some embodiments of the invention.

FIG. 3*h* is a flow diagram illustrating an example superhighway node process 380 for operating a superhighway node in the aircraft superhighway system 100, 140, 150 according to the invention, and/or for use with systems 100, 140 and/or 150 and/or process(es) as described with reference to FIGS. 1*a*-3*g* and/or as herein described. The superhighway node further includes a communication node/functionality with a wireless communication coverage area. The superhighway node process 380, performed by the superhighway node, may include the following steps of: In step 382, receiving aircraft data from air traffic in the airspace defined by the area of communication coverage of said superhighway node (e.g. UAV/Drone Spot). In step 384, relaying/sending data representative of the received aircraft data to the superhighway controller for monitoring/processing as outlined and/or described with reference to FIGS. 1*a*-3*e* and/or as herein described. The process 380 may proceed to step 382 on further receipt of further aircraft data and the like.

Figure 3I:
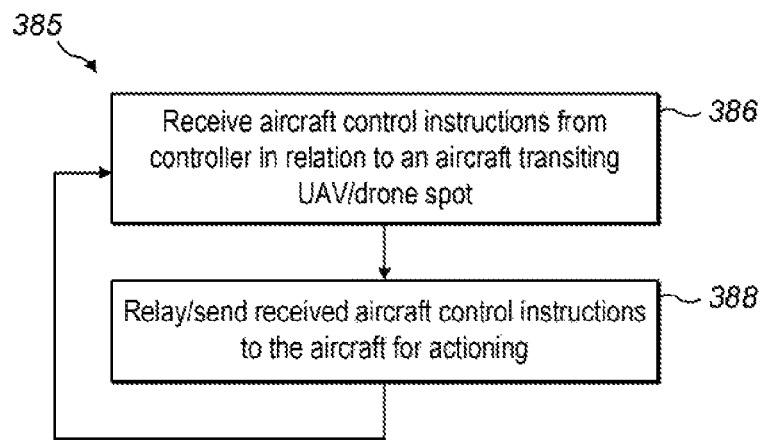
FIG. 3i is a flow diagram illustrating a further example superhighway node process for use with any of the example aircraft superhighway system(s), apparatus and/or process(es) of any of FIGS. 1a to 5 according to some embodiments of the invention.

FIG. 3*i* is a flow diagram illustrating an example superhighway node process 385 for operating a superhighway node in the aircraft superhighway system 100, 140, 150 according to the invention, and/or for use with systems 100, 140 and/or 150 and/or process(es) as described with reference to FIGS. 1*a*-3*h* and/or as herein described. The superhighway node further includes a communication node/functionality with a wireless communication coverage area. The superhighway node process 380, performed by the superhighway node, may include the following steps of: In step 386, receiving, from the superhighway controller, commands and/or instructions associated with an aircraft in transit in the airspace defined by the area of communication coverage of said superhighway node (e.g. UAV/Drone Spot). In step 388, relaying/sending data representative of the received commands and/or instructions to said aircraft over wireless communication for actioning during transit in said airspace (e.g. UAV/Drone Spot) of said superhighway node. The process 385 may proceed to step 386 for further receipt of further commands/instructions and the like.

Figure 3J:
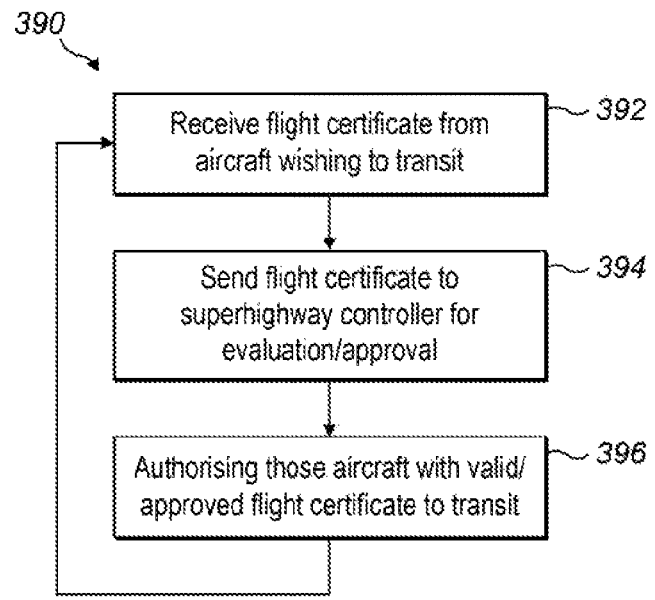
FIG. 3j is a flow diagram illustrating an example superhighway node process for use with any of the example aircraft superhighway system(s), apparatus and/or process(es) of any of FIGS. 1a to 5 according to some embodiments of the invention.

FIG. 3*j* is a flow diagram illustrating an example superhighway node process 390 for operating a superhighway node in the aircraft superhighway system 100, 140, 150 according to the invention, and/or for use with systems 100, 140 and/or 150 and/or process(es) as described with reference to FIGS. 1*a*-3*i* and/or as herein described. The superhighway node further includes a communication node/functionality with a wireless communication coverage area. The superhighway node process 390, performed by the superhighway node, may include the following steps of: In step 392, receiving one or more flight certificate(s) from corresponding one or more aircraft requesting to gain access and transit the airspace defined by the area of wireless communication coverage of said each superhighway node. In step 394, sending said flight certificates to the superhighway controller for determining whether the flight certificate(s) of the corresponding aircraft are valid. Superhighway controller uses reciprocal process 360 and/or the functions/steps as described with reference to FIGS. 1*a* to 5 in relation to determining whether a flight certificate is valid. The superhighway controller sends a response indicating whether the flight certificate is valid/approved or not based on flight plan associated with flight certificate. In step 396, authorising those aircraft with a valid/approved flight certificate access for transiting the airspace defined by the area of wireless communication coverage of said each superhighway node. The process 390 may proceed to step 392 for further receipt of further flight certificates for transiting coverage area of said superhighway node (e.g. UAV/Drone Spot).

Figure 3K:
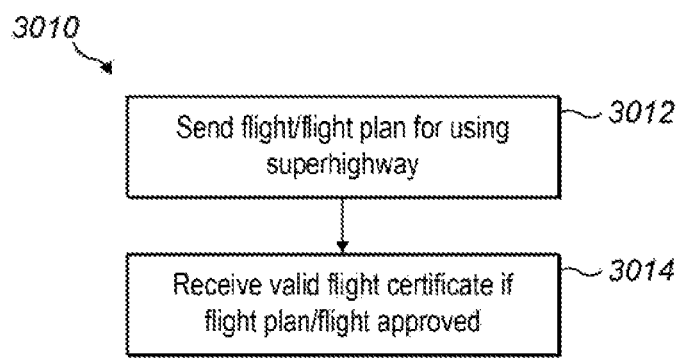
FIG. 3k is a flow diagram illustrating an example superhighway aircraft or UAV/drone process for use with any of the example aircraft superhighway system(s), apparatus and/or process(es) of any of FIGS. 1a to 5 according to some embodiments of the invention.

FIG. 3*k* is a flow diagram illustrating an example a superhighway aircraft or UAV/drone process 3010 for operating an aircraft/UAV/drone in the aircraft superhighway systems 100, 140, 150 according to the invention, and/or for use with systems 100, 140 and/or 150 and/or process(es) as described with reference to FIGS. 1*a*-3*j* and/or as herein described. The superhighway UAV/drone process 3010, performed by an aircraft/UAV/drone, may include the following steps of: In step 3012, sending flight/flight plan for using superhighway. This may include sending, to the superhighway controller, data representative of an access request for a flight certificate based on a flight or flight plan using the aircraft superhighway. In step 3014, receiving, from the superhighway controller, data representative of a valid flight certificate authorising use of the aircraft superhighway in accordance with the flight or flight plan. If the flight or flight plan is refused, the operator may change the flight/flight plan and the process may proceed to step 3012 with the updated/new flight/flight plan using the superhighway.

Figure 3L:
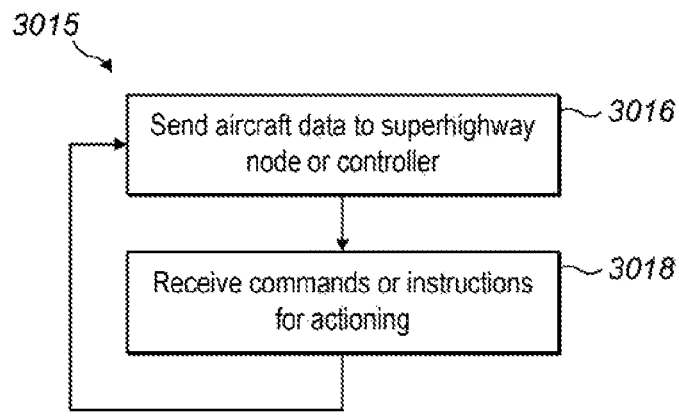
FIG. 3*l* is a flow diagram illustrating another example superhighway aircraft or UAV/drone process for use with any of the example aircraft superhighway system(s), apparatus and/or process(es) of any of FIGS. 1*a* to 5 according to some embodiments of the invention.

FIG. 3*l* is a flow diagram illustrating another example superhighway aircraft or UAV/drone process 3015 for operating an aircraft/UAV/drone in the aircraft superhighway systems 100, 140, 150 according to the invention, and/or for use with systems 100, 140 and/or 150 and/or process(es) as described with reference to FIGS. 1*a*-3*k* and/or as herein described. The process 3015 may be performed by the aircraft/UAV/drone during flight of the aircraft using the aircraft superhighway by transiting an airspace defined by the coverage area of a superhighway node with a communication node and the corresponding coverage area including a wireless communication coverage area associated with the communication node. The superhighway UAV/drone process 3015, performed by an aircraft/UAV/drone, may include the following steps of: In step 3016, sending aircraft data representative of positional information of the aircraft to the superhighway controller via the superhighway node. In step 3018, receiving commands and/or instructions from the superhighway controller based on said aircraft data and actioning said received commands and/or instructions. If commands/instructions are not received, the process may repeat and proceed to step 3016 for sending updated aircraft data and/or updated positional information and the like.

Figure 3M:
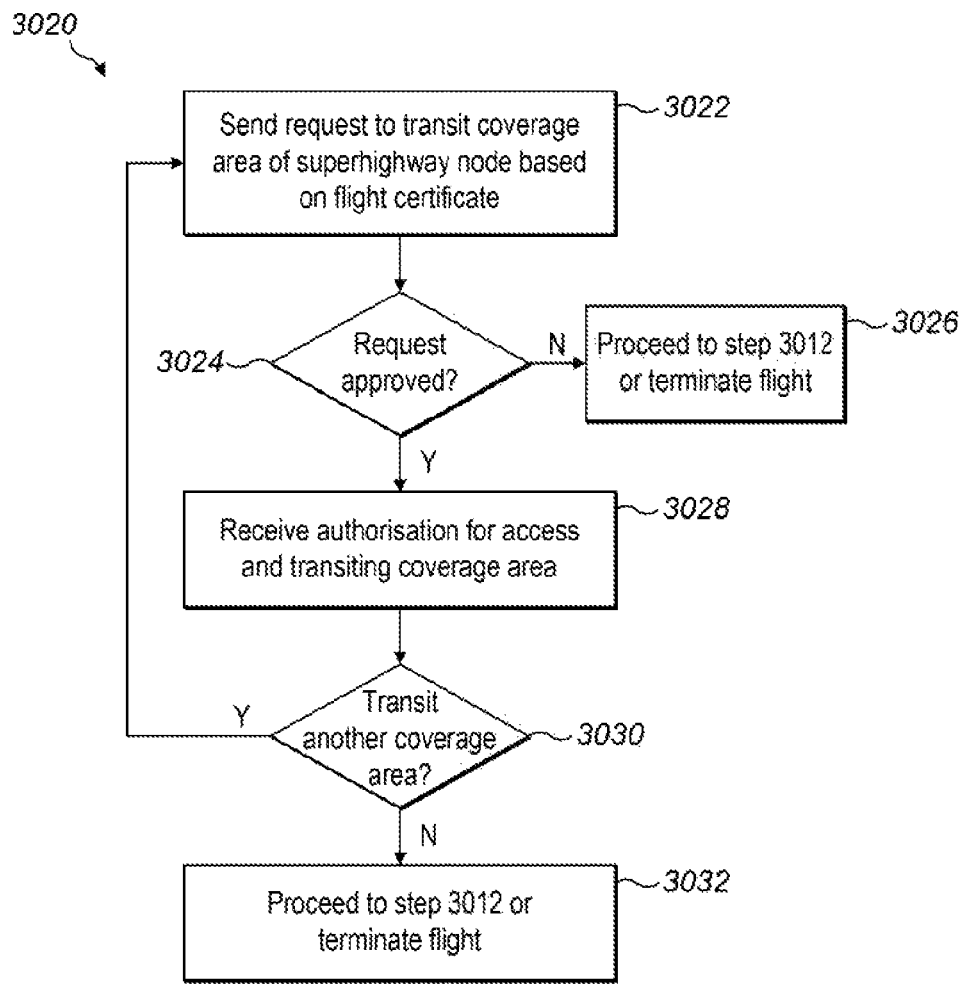
FIG. 3*m* is a flow diagram illustrating a further example superhighway aircraft or UAV/drone process for use with any of the example aircraft superhighway system(s), apparatus and/or process(es) of any of FIGS. 1*a* to 5 according to some embodiments of the invention.

FIG. 3*m* is a flow diagram illustrating another example superhighway aircraft or UAV/drone process 3020 for operating an aircraft/UAV/drone in the aircraft superhighway systems 100, 140, 150 according to the invention, and/or for use with systems 100, 140 and/or 150 and/or process(es) as described with reference to FIGS. 1*a*-3*l* and/or as herein described. The process 3020 may be performed by the aircraft/UAV/drone during flight of the aircraft using the aircraft superhighway by transiting an airspace defined by the coverage area of a superhighway node with a communication node and the corresponding coverage area including a wireless communication coverage area associated with the communication node. The superhighway UAV/drone process 3020, performed by an aircraft/UAV/drone, may include the following steps of: In step 3022, sending a request to transit coverage area of superhighway node based on flight certificate. This may include sending a request to gain authorisation to transit the airspace defined by the area of wireless communication coverage of another superhighway node adjacent to said superhighway node according to the flight certificate or flight plan. The other superhighway node includes a communication node with another wireless communication coverage area and the wireless communication coverage areas of the superhighway nodes overlap each other. In step 3024, checking that the request is approved or not. If the request is not approved (e.g. N), process 3020 proceeds to step 3026, otherwise (e.g. Y) the process 3020 proceeds to step 3028. In step 3026, the operator/aircraft may proceed to request a new flight certificate for the transit and proceed to step 3012 of process 3010, alternatively, the aircraft flight through or transit using the superhighway may be terminated, e.g. aircraft lands or flies into other airspace external to the superhighway. In step 3028, receiving authorisation, based on the flight certificate being valid, access for transiting the coverage area, i.e. transiting the airspace defined by the wireless communication coverage area of said other superhighway node. In step 3030, once transit through the coverage area of the superhighway node is completed, then checking whether a further coverage area of a further superhighway node should be transited. If a further coverage area is meant to be transited (e.g. Y), then proceeding to step 3022 for requesting authorisation based on flight certificate associated with flight plan. If a further coverage area is not meant to be transited (e.g. N), then proceeding to step 3012 for requesting another flight certificate to perform the transit or terminating transit/flight through the superhighway, e.g. aircraft lands or flies into other airspace external to the superhighway.

Figure 4:
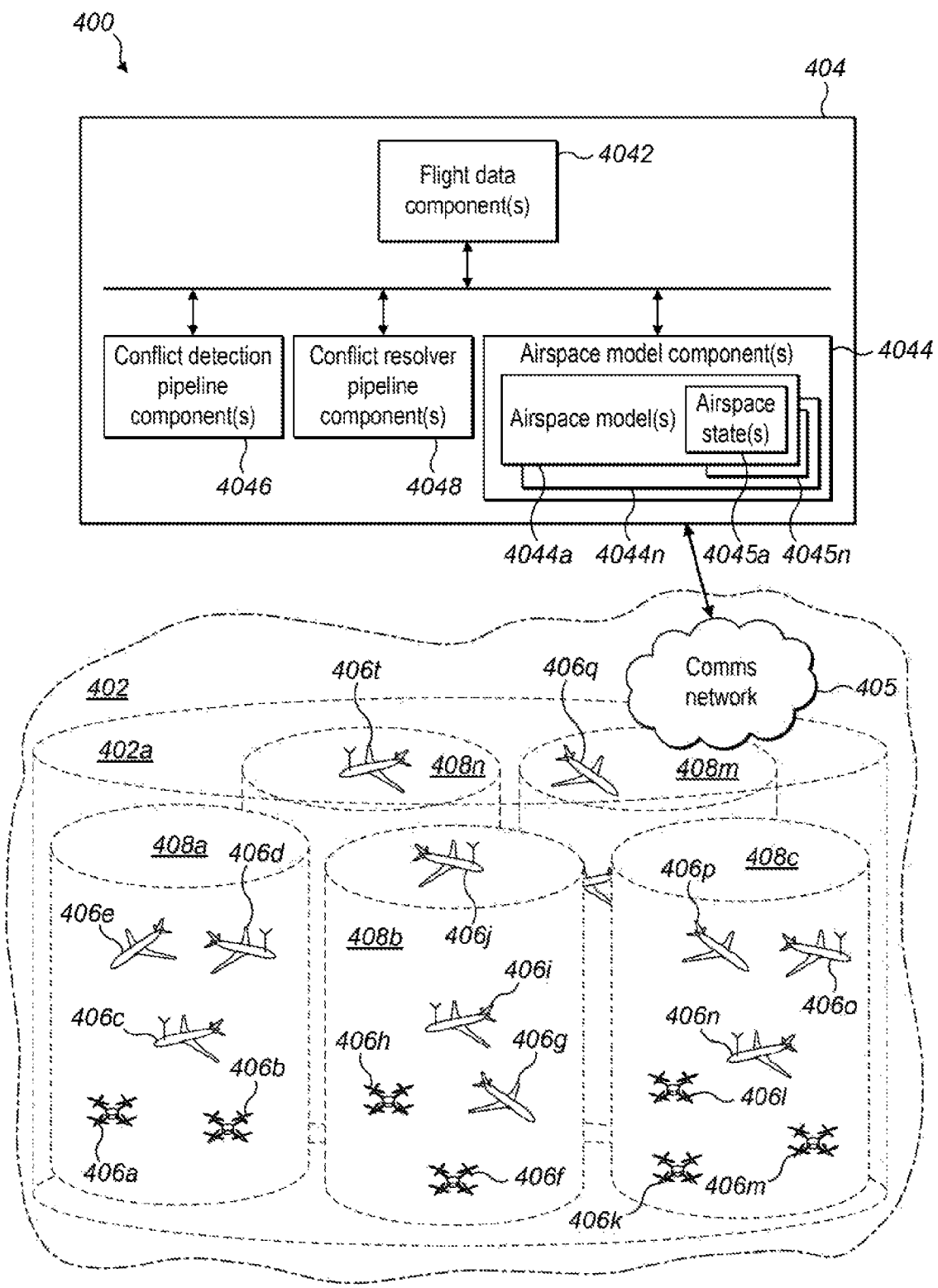
FIG. 4 is a schematic diagram illustrating an example flight management system for use with the example aircraft superhighway system(s) of any of FIGS. 1*a* to 5 according to some embodiments of the invention.

FIG. 4 is a schematic diagram illustrating an example flight management system 400 for use with the aircraft superhighway system(s), apparatus and/or process(es) as described with reference to any of FIGS. 1*a* to 5, combinations thereof, modifications thereto, and/or as described herein. The flight management system 400 is an example of a scalable and secure flight management system 400 for controlling air traffic within an airspace region 402*a* of an airspace 402 via a flight management platform 404 and communication network(s) 405, the air traffic including a plurality of unmanned and/or manned aircraft 406*a*-406*t* in-flight within one or more airspace zones 408a-408m of airspace region 402a of the airspace 402. The flight management system 400 may be also connected to the aircraft superhighway system 100 as described with reference to FIGS. 1a to 3d, combinations thereof, modifications thereto and/or as herein described.

In this example, the airspace 402 may include one or more airspace region(s) 402a, where each airspace region 402a includes a plurality of airspace zones 408a-408n. The airspace 402, airspace regions 402a, and/or airspace zones 408a-408n may be controlled and/or uncontrolled airspace. The airspace 402 may include one or more aircraft superhighways (not shown) of one or more aircraft superhighway systems (not shown), apparatus and/or process(es) as described with reference to FIGS. 1a to 5. For example, there may be multiple aircraft superhighways in each airspace region 402a and/or in each airspace zone 408a-408n, and/or multiple interconnected aircraft superhighways connected together to form an aircraft superhighway network and the like. These aircraft superhighway systems may be connected to the flight management platform 404 for feeding flight data and/or airspace data and/or other data associated with UAVs/drones and/or unmanned aircraft using said aircraft superhighway systems.

The flight management platform 404 includes one or more flight data component(s) 4042, one or more airspace modelling component(s) 4044, one or more conflict detection component(s) 4046 and one or more conflict resolver component(s) 4048. The flight data component(s) 4042 connected to corresponding airspace modelling component(s) 4044, conflict detection component(s) 4046 and conflict resolver component(s) 4048. For example, as illustrated in FIG. 1a, a flight data component 4042 is configured to receive at least flight data associated with the plurality of aircraft 406a-406t in-flight within each of the airspace zones 408a-408n from one or more communication network(s) 405. The airspace modelling component 4044 is configured to model air traffic within each of the airspace zones 408a-408n using a corresponding plurality of airspace model(s) 4044a-4044n, wherein each airspace zone 404a represented by data representative of a corresponding airspace zone state 4045a of a plurality of airzone states 4045a-4045n. Each airzone state 4045a representing at least air traffic 406a-406e in-flight within said each airspace zone 408a based on received flight data associated with said aircraft 406a-406e in-flight within said each airspace zone 408a. For each airspace zone 408a of the plurality of airspace zones 408a-408n, the conflict detection component 1046 is configured to detect any flight conflicts in relation to at least one or more aircraft 406a-406e in-flight within said each airspace zone 408a based on the airspace zone state 4045a of said each airspace zone 408a. The conflict resolver component 4048 is configured to resolve any detected flight conflicts by the conflict detection component 4046 in relation to said at least one or more of the plurality of aircraft 406a-406t. The flight data component 4042 is further configured to send over the communication network(s) 405 flight control information in relation to any detected and/or resolved conflicts by the conflict resolver component 4048 associated with said at least one or more of the plurality of aircraft 406a-406t.

For simplicity, each airspace region 402a and corresponding airspace zones 408a-408n are illustrated as, without limitation, for example three-dimensional (3D) volumetric cylinders that each describe a particular volume or volumetric portion of the airspace, each of which has an extent in, without limitation, for example in x, y and z-space and/or any other type of 3 dimensional coordinate system (e.g. polar coordinate system) the like. For example, airspace region 402a may be defined by or based on data representing a 3D volume of a portion of airspace that has an x-y extent that covers an area of ground or land and a z-extent describing a volume up to a particular height or altitude or a z-extent range defining a volume of the airspace between a first altitude and a second altitude (e.g. between ground level up to a maximum altitude or specified altitude, or from a first altitude to a second altitude specified by an operator and the like). The airspace region 402a shape and size and/or volume may be specified by an operator of the flight management system 400 or by the flight management platform 404 itself when allocating one or more airspace regions 402a and/or airspace zones 408a-408n to cover certain portions of airspace 402 and the like. Similarly, each of the airspace zones 408a-408n may also be defined or based data representative of 3D volumes or volumetric shapes and the like in a similar manner in which each airspace zone 408a-408n may describe or represent a 3D volume of a portion of a corresponding airspace region 402a and the like. Although each airspace region 402a and corresponding airspace zones 408a-408n are described in this example as 3D cylinders, this is for simplicity and by way of example only and the invention is not so limited, it is to be appreciated by the skilled person that each airspace 402, each of the airspace region 402a, and each of the corresponding airspace zones 408a-408n may be represented by any 3D geometry, 3D shape and/or 3D volumetric shape and the like as the application demands.

An airspace 402 may cover an area of a geographic area and volume up to a certain range of altitudes and/or or a predefined altitude, which may be changeable, in which the geographic area of said airspace 402 is of a size such as, without limitation, for example an area the size of one or more states of a country, one or more countries, one or more oceans, multiple countries, one or more continents and/or the whole globe and the like. An airspace region 402a may cover a smaller portion of the geographic area and volume covered by said airspace 402 such as, without limitation, for example when the airspace is configured to cover a country (e.g. the United Kingdom), an airspace region may cover a region of said country (e.g. Scotland, Wales, England, and Northern Ireland); when the airspace is configured to cover the globe an airspace region may cover one or more separate countries and/or regions of multiple countries (e.g. United Kingdom, Europe, North Africa, North America, South America, Asia, Australasia, Pacific and the like); and/or any other portion of the airspace 402 depending on the processing load and/or amount of air traffic 406a-406t experienced by said airspace region 408a such as, without limitation for example, the number of aircraft traversing and/or in-flight within said airspace region 402a and the like. Each airspace region 402a may be divided into a plurality of airspace zones 408a-408n, where an airspace zone 408a of the plurality of airspace zones 408a-408n is configured to cover a smaller portion of the geographic area and volume of an airspace region 402a, which may be dependent on the processing load for processing the airspace model 4044a and airspace state 4045a of said airspace zone 408a and/or based on the amount of air traffic 406a-406e experienced by said airspace zone 408a such as, without limitation, for example the number of aircraft 406a-406e or average number of aircraft 406a-406e in flight within said airspace zone 408a and the like.

Flight data or flight data information associated with an aircraft 406a (e.g. manned aircraft or unmanned aircraft such as, without limitation, for example UAVs, drones and the like) may comprise or represent data representative of any type of frequently or rapidly changing data associated with an aircraft 406a in flight within an airspace 402, airspace region 402a and/or airspace zone 408a such as, without limitation, for example the positional information of the aircraft 406a; aircraft position updates from the aircraft 406a and/or one or more flight data source(s) monitoring/detecting said aircraft 406a; flight telemetry data of the aircraft 406a; flight telemetry data of the aircraft 406a received from other aircraft 406b-406t; flight data of the aircraft 406a from flight data sources such as, without limitation for example, one or more superhighway nodes of one or more aircraft superhighway systems; monitored surveillance (e.g. radar, ADSB, superhighway nodes of a superhighway, etc.); incoming aircraft or pilot messages, e.g. command acknowledgements; motion data associated with the aircraft 406a such as, without limitation, for example position, speed, velocity, attitude, heading and the like; and/or any other flight data associated with the aircraft 406a for use in determining, forecasting and/or predicting where the aircraft 406a is within the airspace 402, airspace region 402a and/or airspace zone 408a. Flight data associated with each aircraft 406a may be received over a communication network 405 by the flight data component 4042 for processing and/or routing to the associated airspace modelling component 4044 and/or airspace model 4044a that is modelling the airspace state 4045a of the airspace zone 408a that the aircraft 406a is determined to be traversing in flight.

Airspace data, airspace condition data and/or non-flight data may comprise or represent data representative of the airspace environment and/or changes thereof of an airspace 402, airspace region 402a, airspace zone(s) 408a-408n and the like such as, without limitation, for example airspace definitions from airspace/aeronautical information provider(s) (AIPs); airspace definitions and/or updates via notice to airmen messages (NOTAMs); weather information; planned flights or flight plans; restricted airspace; and/or any other airspace information associated with and/or defining the environment, structure and/or geometry of the airspace 402, airspace region 402a and/or airspace zone(s) 408a-408n for use in defining the airspace state. Airspace data, airspace condition data and/or non-flight data may be generated and/or provided by one or more data services or airspace data sources that the flight management system 400 may connect to over a communication network 405. For example, the airspace modelling component 4044 or an airspace management component may connect directly to these data services/sources and request the airspace data/airspace condition data/non-flight data for the airspace region 402a and/or airspace zone(s) 408a-408n it is controlling and/or modelling. This data may be loaded into the corresponding airspace state 4045a of the airspace zone 408a that is being modelled by the corresponding airspace modelling component 4044. This may be performed on initialisation of the airspace modelling component 4044/airspace management component during start-up. The airspace modelling component 4044 may then monitor these data services/sources for changes to the airspace 402, airspace region 402a and/or airspace zone(s) 408a-408n and apply these changes in said airspace data to the corresponding modelled internal airspace state associated with said airspace zone.

The flight management system 400 may be further configured to enhance the scalability of the flight management platform 404 to cover wider airspace(s) 402, airspace region(s) 402a, and/or more airspace zones 408a-408n (e.g. airspace coverage over one or more states/counties with in a country, one or more countries, globally etc.). This may be achieved using a scalable flight management architecture including a flight orchestration layer and airspace management layer for managing air traffic 406a-406t within airspace 402. The flight orchestration layer operates to split the airspace 402 into a plurality of airspace regions 402a-402n, the airspace management layer operates to split each airspace region 402a into a plurality of airspace zones 408a-408m. The flight orchestration layer may include one or more flight data component(s) 4042 that operates to act as a flight and/or airspace data 'sink' for any aircraft 406a-406t that is able to be detected from, without limitation, for example ground based infrastructure or flight data sources and/or location 'broadcasts' of the aircraft 406a-406t to the flight orchestration layer. For example, the flight and/or airspace data of the aircraft 406a-406t in the airspace 402 may be transmitted over a communications network 405 such as, without limitation, for example the Internet or other type of communications network(s) and the like. The flight data for each aircraft 406a of the plurality of aircraft 406a-406t may be received over the communication network 405 by the flight orchestration layer from multiple disparate flight data sources and/or the aircraft 406a itself. The flight data is generally very time sensitive data associated with the positions, speed and/or velocity, heading, altitudes and any other positional information of an aircraft in-flight, which means the flight orchestration layer and/or the flight data component(s) are specifically configured to receive this type of data.

The airspace data or airspace condition data (also referred to as non-flight data) associated with an airspace 402, airspace region(s) 402a and/or airspace zone(s) 408a-408n may also be received over the communication network(s) 405 by the airspace management layer from multiple disparate airspace data sources and/or services. As described, airspace data or airspace condition data includes more static data associated with the airspace, airspace region(s), and/or airspace zone(s) such as without limitation, for example, airspace definitions, weather info, NOTAM etc., which can be monitored by and loaded by the corresponding airspace model component 4044 (or airspace region managers) and/or airspace model(s) 4044a-4044n in relation to the airspace region 402a and/or airspace zones 408a-408n, respectively, into their respective airspace states 4045a-4045n. For example, this may be performed either via an internal message queue/buffer associated with each airspace model 4044a-4044n or directly into airspace state 4045a-4045n in between conflict processing intervals. The airspace data and/or airspace condition data is less time sensitive, such that each airspace layer and/or other components of the flight management platform 404 such as, without limitation, for example airspace model component(s) 4044 may receive the airspace data/airspace condition data of the corresponding airspace regions 402a/airspace zones 408a-408n. Alternatively of additionally, the airspace data for an airspace 402, airspace region 402a and/or airspace zone 408a-408n may also be received over the communication network(s) 405 by the flight orchestration layer from multiple disparate airspace data sources and/or services. The airspace 402, airspace regions 402a, and/or airspace zones 408a-408n may be controlled and/or uncontrolled airspace.

Frequently changing data and/or messages such as the flight data and/or messages containing flight data that includes, without limitation, for example position of aircraft, velocity and/or speed, altitude, attitude, heading, and/or any aircraft communication messages and the like are sent via the corresponding flight data component(s) 4042 in the flight orchestration layer. These data and/or messages may include data representative of a geo-spatial data field within them that enables the corresponding flight data component(s) 4042 to identify which airspace region and/or which airspace zone this data pertains to and/or originates from within and routes each portion of flight data and/or messages including flight data to the corresponding airspace modelling component 4044. For example, these messages associated with each aircraft 406a may be routed using geo-spatial routing to the correct airspace modelling component 4044 dealing with the airspace model 4044a and corresponding airspace state 4045a of the airspace zone 408a that the flight data of said each aircraft 406a that is associated with it. Less frequently changing data and/or messages including airspace data and/or airspace condition data such as, without limitation, data representative of weather data, flight plan data, airspace data (e.g. airfields, restricted airspace, etc.) and/or terrestrial objects/obstacles and/or airspace hazards, NOTAMs, and the like may be requested and/or received for a specific airspace zone of each of the airspace zones 408a-408n from one or more data services by the corresponding airspace modelling component(s) 4044, where the corresponding airspace models 4044a-4045n and associated airspace states 4045a-4045n are updated. This is used by the airspace modelling component(s) 4044 for updating the airspace state 4045a of each specific airspace zone 408a such that as many aircraft 406a-406e and objects within each airspace zone 408a are appropriately modelled. Given this, the flight data associated with the plurality of aircraft 406a-406t is separated and prioritised from the airspace/airspace condition data because the flight data information, which changes rapidly in real-time when aircraft are in-flight, will typically update within short time intervals/timeframes at a frequency, without limitation, for example, in the range of milliseconds to seconds whereas airspace data/airspace condition data typically updates within longer time intervals/time frames at frequencies, without limitation, for example in the range of minutes, hours and/or days. Thus, the flight data and airspace data (or airspace condition data) are arrange to be received by different components of the flight management platform 404, which in this example may be the flight data component(s) 4042 and airspace model component(s) 4044, respectively.

Once the flight data is received, the flight orchestration layer via the corresponding flight data component(s) 4042 resolves and standardises the flight data associated with each aircraft and communicates the resolved flight data to the corresponding airspace zones of the airspace management layer. The airspace management layer is configured to evaluate the received flight and airspace data against all other received flight data associated with aircraft 406a-406t within each airspace zone 408a-408n, including, without limitation, for example: 1) the positions of other unmanned aircraft; 2) the positions of other manned aircraft; 3) the known extents (in 3 dimensions, with time added) of volumes of restricted/controlled airspace (e.g. NOTAMS); 4) forecast data about weather systems; 5) any known flight plans of other unmanned aircraft; 6) any known flight plans of other manned aircraft; and 7) any other flight data/airspace data and the like associated with aircraft 406a-406t and/or airspace zones 408a-408n in the airspace 402 covered by the flight orchestration layer. The airspace management layer operates to act on the received flight and airspace data to model the detected air traffic of aircraft 406a-406t within each airspace zone 408a-408n, model the airspace state and/or airspace infrastructure (e.g. controlled/restricted airspace around airfields and other restricted geographic locations such as, without limitation, for example cities, military bases, power plants, highways, power and the like) and other airspace features (e.g. weather systems), and perform collision avoidance via issuance of resolution messages including data representative of direct/indirect actions/instructions to those aircraft 406a-406e in the airspace zone 406a that the flight management platform 404/system 400 is capable of communicating with via communications network 405.

The flight management system 400 is configured to be aware what aircraft (e.g. manned/unmanned aircraft, UAVs, drones and the like) it is sensing via the received flight data, what aircraft the system is able to communicate with (e.g. 'talk to' either directly to, without limitation, for example the flight controller/microcontroller, operator, pilot and/or remote flight control unit/station associated with the aircraft for communicating resolution messages including data representative of direct and/or indirect action in relation to collision avoidance and the like. The flight management system 400 is also configured to be aware of those aircraft detected within the received flight data that it cannot communicate with. For example, manned aircraft whose location has been 'detected' but the flight management system is unable to communicate with. Thus, the flight management system 400 may assist in adjusting the courses of the aircraft that it can communicate with via resolution messages including data representative of direct or indirect actions for avoiding collisions with all aircraft detected within the airspace.

The airspace management layer of the flight management system 400 is configured to, before formulating what resolution messages to dispatch to those aircraft it can communicate with in each of the airspace zones 408a-408n, evaluate, without limitation, for example the following: 1) aircraft priority (including its payload); 2) The latency of the communication connection with the aircraft; 3) what are the rules of the air in the vicinity of the airspace region being detected; 4) aircraft type such as, without limitation, for example is it fixed-wing or is it a rotary-wing and the like, which is important for resolving a conflict (e.g. a rotary-wing unmanned aircraft/UAV may be able to 'hover' to avoid a conflict, or a fixed-wing aircraft/UAV will need to veer off course in, for example, a long-sweeping arc due to the way the vehicle achieves flight); 5) aircraft flight data such as, without limitation, for example vehicle course, speed, heading; 6) aircraft intended flight plan/destination; 7) nearby airspace hazards and/or obstacles; 8) the effect of making a suggested change on the aircraft and other nearby aircraft and the like; and/or 9) any other information associated with each of the aircraft suitable for determining one or more conflicts associated with the aircraft and whether a collision with another aircraft is imminent and the like.

After evaluating all of these variables and scenarios, the airspace management layer of the flight management system 400 may issue resolution messages including direct/indirect actions and/or instructions to those aircraft with detected conflicts that it can communicate with to assist in avoiding collisions and/or conflicts, and to monitor said aircraft for compliance with said resolution messages sent thereto. The flight orchestration layer via, for example, flight data component 4042 forwards any issued resolution messages to each aircraft.

The flight management system 400 may be designed to be extensible and scalable and is configured to split the processing of flight data of aircraft 406a-406t to within each airspace zone 408a-408n into stages in which each airspace zone 408a may be covered by a conflict detection pipeline component 4046 and conflict resolution pipeline component 4048. For example, each conflict detection pipeline component 4046 associated with an airspace zone 408a may include a plurality of conflict detectors and each conflict resolution pipeline component 4048 associated with the airspace zone 408a may include a plurality of conflict resolvers. Each of the conflict detectors may use the modelled airspace state 4045a of the corresponding airspace zone 408a to detect a different type of conflict associated with each aircraft 406a-406e within the corresponding airspace zone 408a. Each of the conflict resolvers may also determine a different type of resolution based on the modelled airspace state 4045a of the corresponding airspace zone 408a in relation to one or more detected conflicts relating to one or more of the aircraft 406a-406e within the corresponding airspace zone 408a. The conflicts and/or resolutions may be evaluated to determine the best resolution that may be performed in relation to avoiding one or more determined/detected conflicts of those affected aircraft 406a-406e.

Conflict detectors may be specific to a type of conflict between aircraft and may be 'trained' to identify particular conflicts. Multiple conflict detectors might 'fire' or output a potential conflict associated with the same physical aircraft. For example, conflicts associated with "unmanned aircraft to manned aircraft", "unmanned aircraft to unmanned aircraft", "unmanned aircraft to "static" airspace objects", "manned aircraft to "static" airspace objects" such as, without limitation, for example "drone to drone", or "drone to manned aircraft", or "drone to restricted airspace", or "drone to weather system" and the like. The conflict detectors are modular and can be adapted or added at any time when new capabilities or flight data becomes available.

Conflict resolvers are also configured to be expandable, and are geography and regulation aware. Conflict resolvers can each ingest multiple 'conflict detections' from the conflict detectors for each physical aircraft, but have the task of ensuring only one (i.e. the most appropriate) resolution with avoiding action is issued, and that the appropriate action is given based on the various flight and aircraft variables given.

Due to improvements in aircraft technologies and its applications, both manned and unmanned air traffic is continuing to increase. Mass adoption of unmanned air traffic for, without limitation, for example inspections of public/private infrastructure, surveillance and security, passenger transport, and deliveries within uncontrolled and controlled airspace is increasing. Thus, there needs to be a scalable air traffic control capability with the ability to perform command and control of the plethora of manned and unmanned air traffic that current conventional human air traffic controllers may not be able to safely analyse, control and/or issue voice instructions and/or appropriate permissions for all manned and unmanned aircraft wishing to operating in uncontrolled and/or controlled airspace.

The flight management system 400 of the present invention as described herein provides such a scalable solution and defines a common standard for both aircraft and software manufacturers to choose the most appropriate communication mechanism (e.g. Cellular, satellite, wired) to establish a connection to manned and unmanned air traffic control services provided by the flight management system. As an option, the flight management system may be configured to be centrally managed and updates to it are in real-time, which means that the system is reconfigurable, adaptable should airspace or flight regulations change, or an urgent notification of airspace changes takes place, all aircraft in communication with the flight management system will receive such changes immediately.

The flight management system 400 and/or as herein described defines a standard system that enables aircraft without specialist collision avoidance equipment/services (e.g. TCAS/ADS-B and the like) to safely coexist within the same air traffic control system. The flight management system 400 and/or as herein described overcomes this issue by performing collision detection and resolution of a modelled airspace state and providing flight control information/commands/instructions to said aircraft over a communication network. Although the flight management system 400 may be applicable for all aircraft within an airspace, it is particularly useful for those aircraft such as, without limitation, for example light aircraft; unmanned aircraft, drones or UAVs with an operator and/or flight controller or autopilot system; or any other aircraft that do not typically have access to the required specialist devices (e.g. TCAS/ADS-B) and the like because it enables these aircraft to safely coexist within the same air traffic control system along with other commercial and/or military aircraft and the like. All that is required is access by the operator, pilot and/or flight controller/microcontroller/autopilot system of the aircraft to a communication network for providing at least one of flight data and/or for receiving flight control information and the like from said flight management system 400. The flight management system 400 and/or as herein described with reference to FIGS. 1a to 5 provides for a robust, scalable, secure and cost effective approach for improving air traffic safety between manned and/or unmanned aircraft and the like.

Furthermore, although the flight management system 400 is described herein as performing conflict detection and/or conflict resolution and the like, this is by way of example only and the invention is not so limited, it is to be appreciated that the person skilled in the art may connect and/or pair the flight management system 400 with the aircraft superhighway system 100 as described with reference to FIGS. 1a to 5, and/or that the flight management system 400 may be further configured for operating and/or including the functionalities of the aircraft superhighway system 100, aircraft superhighway controller and the like as described with reference to FIGS. 1a to 5, combinations thereof, modifications thereto, as herein described and/or as the application demands.

Figure 5:
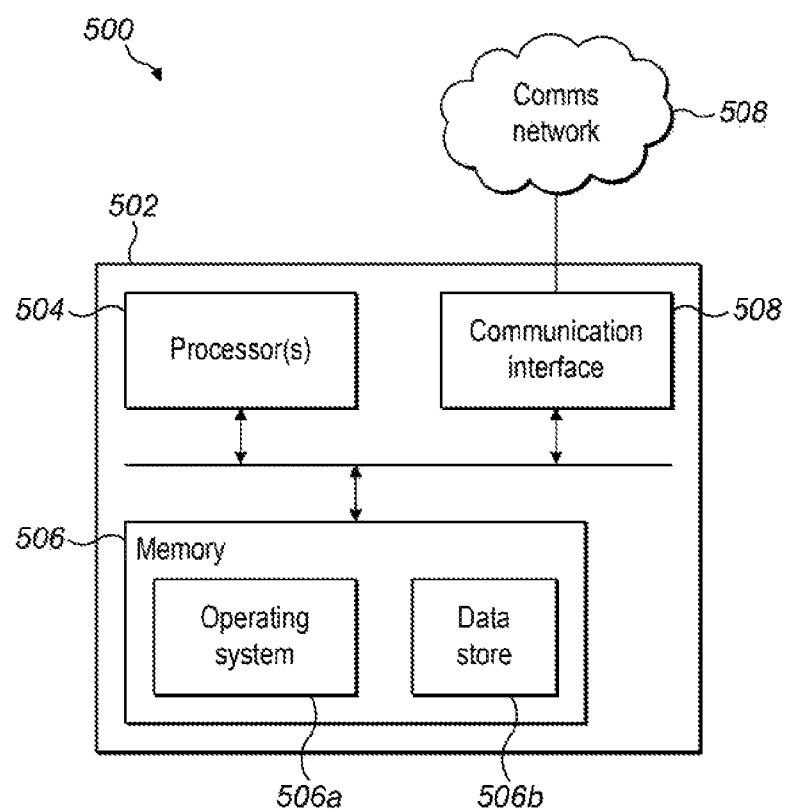
FIG. 5 is a schematic diagram illustrating an example computing system, device or apparatus according to some embodiments of the invention.

FIG. 5 is a schematic diagram of an example computing system 500 for use in implementing and/or performing a aircraft superhighway system, an superhighway node/apparatus, an superhighway controller/apparatus, UAV superhighway controller/apparatus, and/or method(s)/process(es) according to aspects of the invention. Computing system 500 may be used to implement one or more aspects of the systems, apparatus, methods, process(es), device(s) and/or use cases as described with reference to FIGS. 1a-4, combinations thereof, modifications thereto, as herein described and/or as the application demands. Computing system 500 includes a computing device or apparatus 502 (e.g. sender, receiver, sender device or receiver device etc.). The computing device or apparatus includes one or more processor unit(s) 504, memory unit 506 and a communication interface 508. The one or more processor unit(s) 504 are connected to the memory unit 506, the communication interface 508. The communications interface 508 may connect the computing device or apparatus 502 with one or more other computing devices and/or apparatus/flight management systems via one or more communications network(s) 510. The memory unit 506 may store one or more program instructions, code or components such as, by way of example only but not limited to, an operating system 506a for operating computing device

502, and a data store 506*b* for storing computer program instructions, executable code, code and/or components associated with implementing the functionality and/or one or more function(s) or functionality associated with one or more aircraft superhighway systems, aircraft superhighway controller(s), superhighway node(s) and/or process(es)/apparatus according to the invention, system(s)/platforms, combinations thereof, modifications there to, and/or as described herein with reference to at least any one of figure(s) 1*a* to 4.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Application-Program-specific Integrated Circuits (ASICs), Application-Program-specific Standard Products (ASSPs), System-on-a-chip systems (SOCs), Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. An aircraft superhighway system configured to operate as a controlled airspace for pluralities of aircraft transiting the superhighway system comprising: a plurality of spaced apart superhighway nodes, wherein each superhighway node has a coverage area that overlaps with a coverage area of another adjacent superhighway node such that the airspace of each of the areas of coverage form a continuous airspace corridor or aircraft superhighway; and a superhighway controller in communication over a communication network with at least one of the superhighway nodes; and a flight management system configured to be aware of what aircraft it is sensing via received flight data; wherein one or more of the superhighway nodes further comprises a surveillance node with aircraft surveillance and/or detection functionality configured to perform monitoring of air traffic within a surveillance coverage area or cell, wherein the coverage area of said one or more superhighway nodes is the surveillance coverage area of said surveillance node, wherein said one or more superhighway node(s) are configured to relay any air traffic surveillance data of the air traffic over a communication connection to the superhighway controller; and wherein the superhighway controller is configured to use the superhighway nodes and the air traffic surveillance data of said air traffic for authorising, monitoring and/or controlling air traffic transiting airspace of the airspace corridor or aircraft superhighway, and wherein the flight management system is configured to be aware what aircraft it is able to communicate with and which aircraft it is not able to communicate with, and to assist in adjusting courses of the aircraft it can communicate with via resolution messages including data representative of direct or indirect actions for avoiding collisions with all aircraft detected within the airspace.

2. The aircraft superhighway system according to claim 1, wherein one or more of the superhighway node(s) further comprises a communication node with wireless communication functionality configured for wireless communication over a wireless communication coverage area or cell, wherein the coverage area of each of the one or more superhighway node(s) is the wireless communication coverage area of said communication node.

3. The aircraft superhighway system as claimed in claim 1, wherein:
each of the one or more superhighway node(s) are further configured to wirelessly receive aircraft positional information or data from air traffic transiting the coverage area of said each superhighway node, and relay any received aircraft positional information or data to the superhighway controller; and
the superhighway controller further configured to use the received aircraft positional information or data of said air traffic for authorising, monitoring and/or controlling air traffic transiting airspace of the airspace corridor or aircraft superhighway.

4. The aircraft superhighway system as claimed in claim 1, wherein said surveillance comprises one or more from the group of: detecting manned aircraft; detecting unmanned aircraft, unmanned aerial vehicles and/or drones; detecting other air hazards and/or obstacles; and/or detecting any other hazard, objects or obstacles that may affect the safe transit of aircraft via the aircraft superhighway.

5. The aircraft superhighway system as claimed in claim 1, further comprising a superhighway node including a surveillance node communicatively connected to a superhighway node including a communication node or to the superhighway controller.

6. The aircraft superhighway system according to claim 2, wherein the superhighway controller is configured to use the superhighway nodes with communication node functionality for authorising, monitoring and/or controlling air traffic permitted to transit a flight path within one or more portions of the airspace corridor or aircraft superhighway, wherein, for each superhighway node with communication node functionality, the volume airspace of the communication coverage area provided by said communication node functionality forms an airspace superhighway zone spot; or wherein, for each superhighway node with surveillance node functionality, the volume airspace of the surveillance coverage area provided by said surveillance node functionality forms an airspace superhighway zone spot.

7. The aircraft superhighway system as claimed in claim 6, wherein at least a portion of the aircraft superhighway comprises multiple consecutive airspace superhighway zone spots forming an airspace superhighway zone.

8. The aircraft superhighway system according to claim 1, wherein the superhighway controller is further configured to:
receive one or more requests for flights or flight plans of aircraft using the aircraft superhighway;
approve those flights or flight plans using the aircraft superhighway ensuring safe transit of air traffic; and
issuing flight certificates to those aircraft with approved flights or flight plans for using the aircraft superhighway, wherein the aircraft uses said flight certificates for gaining authorisation for transiting the airspace of one or more coverage areas of corresponding superhighway nodes, one or more airspace superhighway zone spots of corresponding superhighway nodes, or one or more airspace superhighway zones of corresponding superhighway nodes.

9. The aircraft superhighway system according to claim 1, wherein the superhighway controller is further configured to:
monitor aircraft in-flight within the airspace of the aircraft superhighway, airspace of the coverage area of corresponding superhighway nodes, or an airspace superhighway zone spot of corresponding superhighway nodes;
determine control information associated with the transit of said one or more of the aircraft based on said monitoring; and
transmit control information to said one or more aircraft and/or one or more operators of said aircraft transiting the airspace of the aircraft superhighway to ensure safe transit of air traffic within airspace of the aircraft superhighway.

10. The aircraft superhighway system according to claim 1, wherein the superhighway controller is further configured to transmit flight information of at least air traffic within the aircraft superhighway on regular aviation frequencies to manned aircraft operating within the vicinity of the aircraft superhighway.

11. The aircraft superhighway system according to claim 1, wherein the superhighway controller is further configured to:
receive data representative of one or more flight certificate(s) from corresponding one or more aircraft requesting to gain access and transit the airspace associated with a coverage area of a superhighway node;
determine whether the flight certificate(s) of the corresponding aircraft are valid in relation to transiting the airspace associated with the superhighway node; and
providing authorisation for those aircraft with a valid flight certificate to access and transit the airspace defined by the coverage area of said each superhighway node.

12. The aircraft superhighway system according to claim 1, wherein each superhighway node of the plurality of superhighway nodes with a surveillance node and corresponding coverage area including a surveillance coverage area is further configured to:
detect and monitor air traffic in the airspace defined by the surveillance coverage area of said each superhighway node; and
send surveillance data representative of the detected and/or monitored air traffic to the superhighway controller.

13. The aircraft superhighway system according to claim 1, wherein each superhighway node of the plurality of superhighway nodes with a communication node and corresponding coverage area including a wireless communication coverage area associated with the communication node is further configured to:
receive aircraft data from air traffic in communication with said each superhighway node, wherein said air traffic is transiting the airspace defined by the wireless communication coverage area of said each superhighway node; and
send the received aircraft data to the superhighway controller.

14. The aircraft superhighway system according to claim 1, wherein each superhighway node of the plurality of superhighway nodes with a communication node and corresponding coverage area including a wireless communication coverage area associated with the communication node is further configured to:
receive one or more flight certificate(s) from corresponding one or more aircraft requesting to gain access and transit the airspace defined by the wireless communication coverage area of said each superhighway node;
send said flight certificates to the superhighway controller for determining whether the flight certificate(s) of the corresponding aircraft are valid; and
authorise those aircraft with a valid flight certificate to access and transit the airspace defined by the wireless communication coverage area of said each superhighway node.

15. The aircraft superhighway system according to claim 1, wherein each aircraft using the aircraft superhighway system is further configured to:
send, to the superhighway controller, data representative of an access request for a flight certificate based on a flight or flight plan using the aircraft superhighway;
receive, from the superhighway controller, data representative of a valid flight certificate authorising use of the aircraft superhighway in accordance with the flight or flight plan.

16. The aircraft superhighway system according to claim 1, wherein during flight of the aircraft using the aircraft superhighway by transiting an airspace defined by the coverage area of a superhighway node with a communication node and the corresponding coverage area including a wireless communication coverage area associated with the communication node, the aircraft is further configured to:
send aircraft data representative of positional information of the aircraft to the superhighway controller via the superhighway node; and
receive commands and/or instructions from the superhighway controller based on said aircraft data and actioning said received commands and/or instructions; and/or
wherein during flight of the aircraft using the aircraft superhighway by transiting an airspace defined by the coverage area of a superhighway node with a surveillance node and the corresponding coverage area including a surveillance communication coverage area associated with the surveillance node, the aircraft is further configured to:
send aircraft data representative of positional information of the aircraft to the superhighway controller; and
receive commands and/or instructions from the superhighway controller based on said aircraft data and actioning said received commands and/or instructions.

17. A computer-implemented method of operating an superhighway node of an aircraft superhighway system according to claim 1, the method, performed by the superhighway node with a surveillance node and a surveillance coverage area, comprising:
- monitoring air traffic in the airspace defined by the area of surveillance coverage of said superhighway node; and
- sending data representative of the monitored air traffic to the superhighway controller,
- wherein the superhighway node further includes a communication node with a wireless communication coverage area, the method further comprising:
- receiving aircraft data from air traffic in the airspace defined by the area of communication coverage of said superhighway node; and
- sending data representative of the received aircraft data to the superhighway controller.

18. A computer-implemented method of operating an superhighway node of an aircraft superhighway system according to any of claim 1, the method, performed by the superhighway node with a surveillance node and a surveillance coverage area, comprising:
- monitoring air traffic in the airspace defined by the area of surveillance coverage of said superhighway node; and
- data representative of the monitored air traffic to the superhighway controller,
- wherein superhighway node further includes a surveillance node with a surveillance coverage area, comprising:
- monitoring air traffic in the airspace defined by the area of surveillance coverage of said superhighway node; and
- sending data representative of the monitored air traffic to the superhighway controller,
- wherein the superhighway node includes a communication node with a wireless communication coverage area, the method further comprising:
- receiving, from the superhighway controller, commands and/or instructions associated with an aircraft in transit in the airspace defined by the area of communication coverage of said superhighway node; and
- sending data representative of the received commanded and/or instructions to said aircraft for actioning during transit in said airspace, the method further comprising:
- receiving one or more flight certificate(s) from corresponding one or more aircraft requesting to gain access and transit the airspace defined by the area of wireless communication coverage of said each superhighway node;
- sending said flight certificates to the superhighway controller for determining whether the flight certificate(s) of the corresponding aircraft are valid; and
- authorising those aircraft with a valid flight certificate access for transiting the airspace defined by the area of wireless communication coverage of said each superhighway node.

19. A computer-implemented method of operating an aircraft in an aircraft superhighway system according to claim 1, the method, performed by the aircraft, comprising:
- sending, to the superhighway controller, data representative of an access request for a flight certificate based on a flight or flight plan using the aircraft superhighway; and
- receiving, from the superhighway controller, data representative of a valid flight certificate authorising use of the aircraft superhighway in accordance with the flight or flight plan,
- wherein the method, performed by the aircraft during flight of the aircraft using the aircraft superhighway by transiting an airspace defined by the coverage area of a superhighway node with a communication node and the corresponding coverage area including a wireless communication coverage area associated with the communication node, further comprising:
- sending aircraft data representative of positional information of the aircraft to the superhighway controller via the superhighway node; and
- receiving commands and/or instructions from the superhighway controller based on said aircraft data and actioning said received commands and/or instructions.

20. A computer-implemented method of operating an aircraft in a aircraft superhighway system according to claim 1, the method, performed by the aircraft during flight of the aircraft using the aircraft superhighway by transiting an airspace defined by the coverage area of a superhighway node with a communication node and the corresponding coverage area including a wireless communication coverage area associated with the communication node, further comprising:
- sending aircraft data representative of positional information of the aircraft to the superhighway controller via the superhighway node; and
- receiving commands and/or instructions from the superhighway controller based on said aircraft data and actioning said received commands and/or instructions, wherein the method, during flight of the aircraft using the aircraft superhighway by transiting an airspace defined by the coverage area of a superhighway node with a surveillance node and the corresponding coverage area including a surveillance communication coverage area associated with the surveillance node, further comprising:
- sending aircraft data representative of positional information of the aircraft to the superhighway controller; and
- receiving commands and/or instructions from the superhighway controller based on said aircraft data and actioning said received commands and/or instructions.

* * * * *